(12) United States Patent
Kim et al.

(10) Patent No.: US 12,498,814 B2
(45) Date of Patent: Dec. 16, 2025

(54) TOUCH INPUT DEVICE

(71) Applicant: HiDeep Inc., Seongnam-si (KR)

(72) Inventors: Bonkee Kim, Seongnam-si (KR);
Seyeob Kim, Seongnam-si (KR)

(73) Assignee: HiDeep Inc. (KR)

( * ) Notice: Subject to any disclaimer, the term of this patent is extended or adjusted under 35 U.S.C. 154(b) by 15 days.

(21) Appl. No.: 18/518,061

(22) Filed: Nov. 22, 2023

(65) Prior Publication Data

US 2024/0168583 A1 May 23, 2024

(30) Foreign Application Priority Data

Nov. 23, 2022 (KR) .......... 10-2022-0158571
May 31, 2023 (KR) .......... 10-2023-0070109

(51) Int. Cl.
*G06F 3/041* (2006.01)
*G06F 3/044* (2006.01)

(52) U.S. Cl.
CPC .......... *G06F 3/0416* (2013.01); *G06F 3/0442* (2019.05); *G06F 3/0445* (2019.05); *G06F 3/0446* (2019.05)

(58) Field of Classification Search
CPC .... G06F 3/0416; G06F 3/0445; G06F 3/0442; G06F 3/0446
See application file for complete search history.

(56) References Cited

U.S. PATENT DOCUMENTS

| | | | |
|---|---|---|---|
| 10,296,137 B2 * | 5/2019 | Yang .................. | G06F 3/04182 |
| 2014/0009428 A1 | 1/2014 | Coulson et al. | |
| 2014/0152621 A1 | 6/2014 | Okayama et al. | |
| 2019/0163312 A1 * | 5/2019 | Chen .................. | G06F 3/047 |

FOREIGN PATENT DOCUMENTS

| | | |
|---|---|---|
| CN | 115268702 A | 11/2022 |
| KR | 20150006228 A | 1/2015 |
| KR | 20200038758 A | 4/2020 |
| KR | 102186184 B1 | 12/2020 |
| KR | 20220113197 A | 8/2022 |
| KR | 20220139285 A | 10/2022 |

OTHER PUBLICATIONS

European Search Report 23211537.8, Issued Apr. 18, 2024.
Korean Office Action 10-2022-0158571, Issued on Aug. 30, 2024.
Korean Office Action 10-2023-0070109, Issued on Mar. 24, 2025.

* cited by examiner

*Primary Examiner* — Sardis F Azongha
(74) *Attorney, Agent, or Firm* — The Belles Group, P.C.

(57) ABSTRACT

A touch input device includes a touch sensor; and a control unit that controls the touch sensor, wherein the touch sensor includes a plurality of first electrodes and a plurality of second electrodes, the first electrode is disposed along a first direction, and the second electrode is disposed along a second direction different from the first direction, a 2a electrode pattern disposed immediately adjacent to the first electrode, and a 2b electrode pattern disposed at a distance apart by an interval from the first electrode and not immediately adjacent to the first electrode. The control unit controls different driving signals to be applied simultaneously to two second electrodes, wherein the driving signal applied to the 2b electrode pattern is applied to the 2a electrode pattern. The control unit detects the touch position of the object located on the touch sensor based on the signals received from the first electrodes.

20 Claims, 29 Drawing Sheets

(a)

(b)

TOUCH INPUT DEVICE

CROSS-REFERENCE TO RELATED APPLICATIONS

This U.S. non-provisional patent application claims priority under 35 USC § 119 of Korean Patent Application No. 10-2022-0158571, filed on Nov. 23, 2022, and Korean Patent Application No. 10-2023-0070109, filed on May 31, 2023, the entire contents of all of which are hereby incorporated by reference herein, for all purposes.

BACKGROUND

Embodiments of the present invention relate to a touch input device. More specifically, it prevents flickering on the display panel due to the operation of the touch sensor, reduces the operation time of the touch sensor, reduces power consumption of the touch input device, and drives an external stylus pen or detects a pen signal from the external stylus pen.

Various types of input devices are used to operate computing systems. For example, input devices such as buttons, keys, joysticks, and touch screens are used. Due to the easy and simple operation of the touch screen, the use of the touch screen when operating computing systems is increasing.

A touch sensor is a type of information input device and can be provided and used in a display panel. For example, the touch sensor may be attached to one side of the display panel or may be manufactured and used integrally with the display panel. The user can input information by touching the touch sensor while viewing the image displayed on the screen of the display panel.

FIG. 1 is a diagram schematically showing a conventional octa-type stacked structure.

As a type of touch screen panel technology, OCTA stands for On Cell Touch AMOLED. As shown in FIG. 1, OCTA is a type of TSP (Touch Screen Panel) in which a touch sensor is deposited directly on an AMOLED display cell. In other words, it is a technology that internalizes the smartphone or tablet touch screen function into the OLED panel. Since there is no tempered glass between the cell and the touch sensor, clarity is improved compared to the conventional general TSP.

Y-OCTA is a touch screen panel in which a touch sensor is directly deposited on a cell. Y-OCTA is named by attaching Y which come from 'YOUM' of Samsung Display's flexible OLED brand name to 'OCTA'. Y-OCTA technology is applied to the Thin Film Encapsulation (TFE) process during an OLED manufacturing process. A touch screen is implemented by patterning an aluminum metal mesh sensor used as a touch sensor between an organic material for thin film encapsulation and a polarizer. According to Y-OCTA, by attaching a polarizer closely to a cover window, a visibility problem occurring at a curved edge may be solved. In addition, by removing a support film, the panel thickness may be reduced. Since a laminating process may be omitted, the price may be reduced.

A conventional touch input device having a Y-OCTA touch screen panel has a problem in a Low Ground Mass (LGM) situation. An LGM problem is that in case a driving electrode and a receiving electrode are implemented as a single layer or a double layer in a touch sensor, when a certain touch occurs in a state where an user does not hold a touch input device equipped with the touch sensor by hand (so called 'floating state'), a signal to be detected normally disappears from the point of view of the touch input device, otherwise a signal to be detected normally is split and detected as if being touched at two or more points.

Additionally, a touch input device equipped with a conventional Y-OCTA touch screen panel has a flicker problem in the display panel due to the driving of the touch sensor. Conventionally, to achieve this flicker problem, dithering is used for each frame, or the driving voltage of the touch sensor is lowered. Alternatively, there have been attempts to receive frame rate information from the display driving chip (DDI) during VRR (Variable Refresh Rate) operation and change the frequency of the driving signal of the touch sensor accordingly. However, these attempts do not completely solve the flicker problem.

In the end, the touch input device equipped with the conventional Y-OCTA touch screen panel is unable to solve the problem of malfunction and flicker in the LGM situation.

The problem to be achieved by the present invention is to provide a touch input device that can prevent flicker from occurring on a display panel due to driving of a touch sensor.

Additionally, a touch input device can provide a shorten the touch operation time and reduce power consumption.

Additionally, when the touch input device is in the LGM state, it is provided that a touch input device capable of removing noise signals caused by the LGM.

Additionally, a touch input device provides to prevent flicker from occurring on a display screen due to multi-operation of touch sensors.

Additionally, it is provided that a touch input device capable of driving an external stylus pen or detecting a pen signal from a stylus pen.

Additionally, when the touch input device is in the LGM state, it is provided that a touch input device that can prevent touch malfunction in the LGM state.

A touch input device according to an embodiment of the present invention includes a touch input device comprising: a touch sensor; and a control unit which controls the touch sensor, wherein the touch sensor comprises a plurality of first electrodes and a plurality of second electrodes, wherein the first electrodes are disposed along a first direction, wherein the second electrodes are configured to: be disposed along a second direction different from the first direction, and include a 2a electrode pattern disposed immediately adjacent to the first electrode and a 2b electrode pattern disposed not immediately adjacent to the first electrode but spaced apart by a predetermined distance, wherein the control unit is configured to control such that: different driving signals to be applied simultaneously to at least two second electrodes among the plurality of second electrodes; a driving signal to be applied to the 2b electrode pattern; and the driving signal is a signal of a phase which is reversed by 180 degrees from a driving signal applied to the 2a electrode pattern, and wherein the control unit is configured to detect a touch position of an object located on the touch sensor based on signals received from the plurality of first electrodes.

Another embodiment of the present invention provides a touch input device comprising: a touch sensor; and a control unit which controls the touch sensor, wherein the touch sensor comprises a plurality of first electrodes and a plurality of second electrodes, wherein the first electrodes are disposed along a first direction, wherein the second electrodes are configured to: be disposed along a second direction different from the first direction, and include a 2a electrode pattern forming a mutual capacitance with the first electrode, and a 2b electrode pattern which does not form mutual capacitance with the first electrode, wherein the control unit is configured to control such that: different driving signals to be applied simultaneously to at least two second electrodes among the plurality of second electrodes; a driving signal to be applied to the 2b electrode pattern; and the driving signal is a signal of a phase which is reversed by 180 degrees from a driving signal applied to the 2a electrode pattern, and wherein the control unit is configured to detect a touch position of an object located on the touch sensor based on signals received from the plurality of first electrodes.

Here, the control unit is configured to: output differential signals subtracted two received signals among the received signals and detect the touch position of the object based on the differential signals.

Here, the control unit comprises: an integrator which restores the received signals by integrating the differential signals; and a processing unit which converts sign of electrostatic capacity change value from negative (−) to positive (+), among the restored received signals.

Here, the control unit comprises a baseline adjustment unit to reduce baseline of the differential signals by half.

Here, the control unit is configured to control different driving signals to be input simultaneously for all of the plurality of second electrodes.

Here, at least a portion of another first electrode disposed adjacent to the first electrode is disposed between the 2b electrode pattern and the first electrode.

Here, Each of the plurality of first electrodes has a shape extending in a first direction and has a plurality of openings disposed along the first direction. the 2a electrode patterns of the plurality of second electrodes are disposed within a plurality of openings of odd-numbered first electrodes along the second direction. The 2b electrode patterns of the plurality of second electrodes are disposed within a plurality of openings of first electrodes located at even numbers along the second direction. The touch input device further comprises: first connection patterns electrically connecting the 2a electrode patterns disposed along the second direction; and second connection patterns electrically connecting the 2b electrode patterns disposed along the second direction.

Here, the touch sensor further comprises an opening formed in each of the 2a and 2b electrode patterns, and a dummy pattern disposed within the opening of each of the 2a and 2b electrode patterns.

Here, the touch sensor further comprises an opening formed in each of the 2a and 2b electrode patterns, and a dummy pattern disposed within the opening of each of the 2a and 2b electrode patterns.

Here, the first connection pattern is disposed so as not to overlap the 2b electrode pattern disposed between two 2a electrode patterns connected by the first connection pattern.

Here, Each of the plurality of first electrodes has a shape extending in a first direction and has a plurality of openings disposed along the first direction. The 2a electrode patterns of the plurality of second electrodes are disposed in the plurality of openings of the first electrodes located at odd numbers along the second direction. The 2b electrode patterns of the plurality of second electrodes are disposed in the plurality of openings of the first electrodes located at even numbers along the second direction. A portion of the 2a electrode pattern is disposed in one of the two adjacent openings of the odd-numbered first electrode and remainder is disposed in another one of the two openings. A portion of the 2b electrode pattern is disposed in one of the two adjacent openings of the even-numbered first electrode and remainder is disposed in another one of the two openings. The touch input device further comprises first connection patterns electrically connecting the 2a receiving electrode patterns disposed along the second direction and second connection patterns electrically connecting the 2b electrode patterns disposed along the second direction.

Here, Each of the plurality of first electrodes has a shape extending in a first direction and has a plurality of openings disposed along the first direction. The 2a electrode patterns of the plurality of second electrodes are disposed in the plurality of openings of the first electrodes located at odd numbers along the second direction. The 2b electrode patterns of the plurality of second electrodes are disposed in the plurality of openings of the first electrodes located at even numbers along the second direction. A portion of the 2a electrode pattern is disposed in one of the two adjacent openings of the odd-numbered first electrode and remainder is disposed in another one of the two openings. A portion of the 2b electrode pattern is disposed in one of the two adjacent openings of the even-numbered first electrode and remainder is disposed in another one of the two openings. The touch input device further comprises first connection patterns electrically connecting the 2a receiving electrode patterns disposed along the second direction and second connection patterns electrically connecting the 2b electrode patterns disposed along the second direction.

Another embodiment of the present invention provides a touch input device comprising: a touch sensor comprising: a plurality of first touch electrodes, a plurality of second touch electrodes disposed to intersect with the plurality of first touch electrodes; a plurality of first pen electrodes each of which is disposed adjacent to each of the first touch electrodes; and a plurality of second pen electrodes each of which is disposed adjacent to each of the second touch electrodes, and a control unit which is configured to control the touch sensor: which is electrically connected to the plurality of first and second touch electrodes, and which is electrically connected to the plurality of first pen electrodes or the second pen electrodes. Each of the first touch electrodes includes: a pair of electrode portions, and wherein a first electrode portion of the pair of electrode portions is disposed adjacent to a partial touch electrode of at least one of the plurality of second touch electrodes. A second electrode portion of the pair of electrode portions is disposed adjacent to remaining touch electrode of at least one of the plurality of second touch electrodes. One ends of the plurality of first pen electrodes is electrically connected to each other and one end of the plurality of second pen electrodes is electrically connected to each other. The control unit is configured to control such that: a first drive signal is simultaneously applied to a first electrode portion of the first touch electrode, and a second drive signal is simultaneously applied to a second electrode portion of the first touch electrode. The second driving signal is a signal of a phase which is shifted phase of the first driving signal by 180 degrees.

Here, The first electrode portion of the first touch electrode and the second electrode portion of the first touch electrode is disposed alternately along one direction. The plurality of first electrode portions disposed along the one direction are electrically connected to each other and connected to the control unit. The plurality of second electrodes disposed along the one direction are electrically connected to each other and connected to the control unit.

Here, The first electrode portion of the first touch electrode is disposed to surround at least part or all of one of the first pen electrodes. The second electrode portion of the first touch electrode is disposed to surround at least part or all of the first pen electrodes. The second touch electrode is disposed to surround at least part or all of one of the second pen electrodes.

Here, The plurality of first touch electrodes is disposed on different layers from the plurality of second touch electrodes.

Here, The first electrode portion and the second electrode portion include a first pattern portion, a second pattern portion, and a connection pattern portion disposed between the first and second pattern portions. The first pattern portion has an inverted triangle shape. The second pattern portion has a triangular shape. The connection pattern portion has a square shape.

Here, The second touch electrode includes a plurality of patterns disposed in one direction. The first touch electrode is disposed between the plurality of patterns.

Here, The plurality of first touch electrodes is disposed on a same layer as the plurality of second touch electrodes.

Here, The first electrode portion of the first touch electrode and the second electrode portion of the first touch electrode are disposed alternately along one direction. The touch input device further comprises: connection pattern portions which electrically connect the plurality of first electrode portions disposed along one direction to each other. The connection pattern portions are disposed so as not to overlap the second touch electrode.

Here, The second touch electrode is disposed to surround at least part or all of the first pen electrode.

Here, The first electrode portion of the first touch electrode and the second electrode portion of the first touch electrode are disposed alternately along one direction. The second touch electrode is disposed to surround the first electrode portions or second electrode portions of the plurality of first touch electrodes disposed along another direction perpendicular to the one direction.

Here, the touch input device further comprises a connection pattern portion which is electrically connected to a plurality of first electrode disposed along the one direction to each other. The connection pattern portion is disposed not to overlap the plurality of second electrode disposed along the one direction.

Here, the touch input device further comprises a display panel including the touch sensor disposed inside.

Another embodiment of the present invention provides a touch input device, wherein the control unit is configured to operate as one of: a touch driving/sensing mode for sensing whether the touch sensor is touched and/or the touch position of the object, a pen driving mode for driving a stylus pen, and a stylus sensing mode for sensing the touch position of the stylus pen, In the touch driving/sensing mode, the control unit is configured to: apply the first and second driving signals to at least one first touch electrode among the plurality of first touch electrodes, and receive a sensing signal from the plurality of second touch electrodes. In the pen driving mode, the control unit is configured to: apply a pen driving signal for driving the stylus pen to at least one type of electrode among the plurality of first touch electrodes, the plurality of first pen electrodes, the plurality of second touch electrodes and the plurality of second pen electrodes. In the stylus sensing mode, the control unit is configured to: receive a pen sensing signal emitted from the stylus pen, through one type of electrodes among the plurality of first touch electrodes, the plurality of first pen electrodes and a combination of any one type of electrodes among the plurality of second touch electrodes and the plurality of second pen electrodes.

Figure 2:
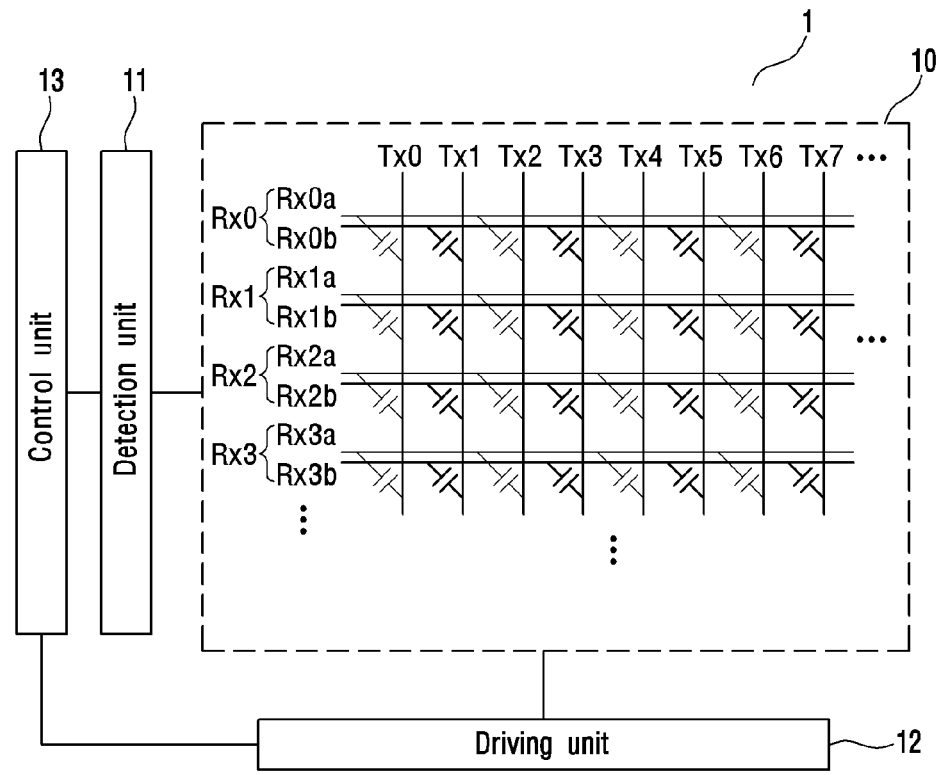
FIG. 2 is a schematic diagram of a touch input device according to an embodiment of the present invention.
Figure 14:
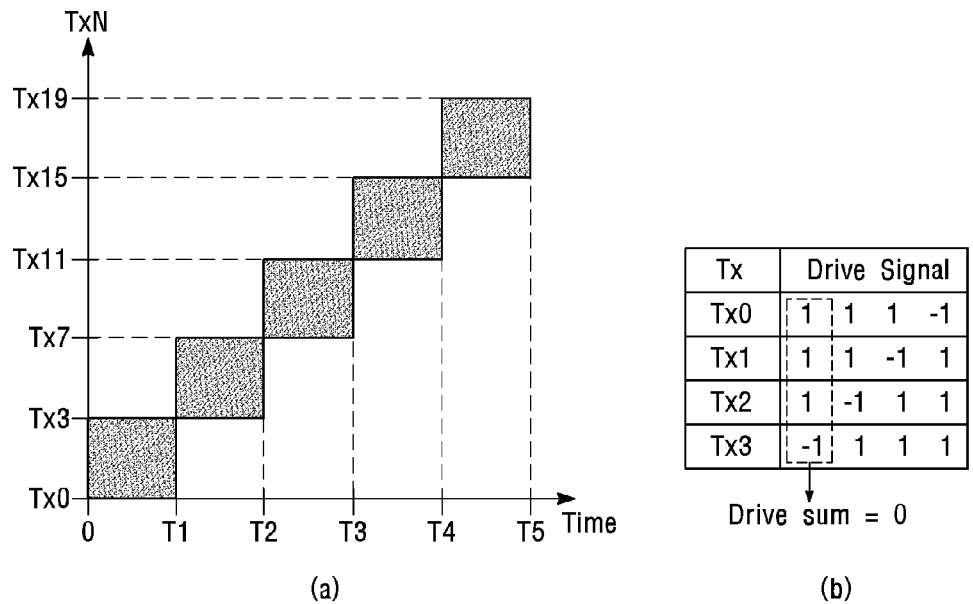

The element (a) of FIG. 14 is a schematic diagram for a graph showing multi-driving for each of the four driving electrodes in the touch input device shown in FIG. 2. The element (b) of FIG. 14 is a schematic diagram for a graph showing multi-driving in the element (a) of FIG. 14. This is an example of a driving signal (or driving code) applied to four driving electrodes (Tx0, Tx1, Tx2, Tx3) which are driven simultaneously.

Figure 13:
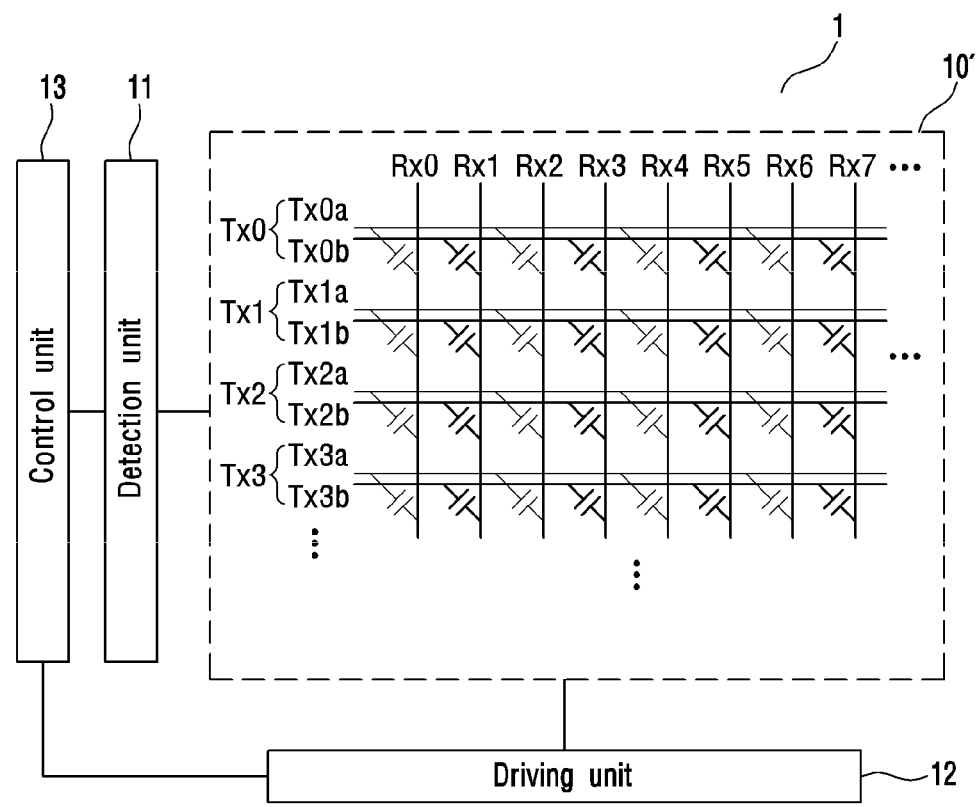
FIG. 13 is a schematic diagram for a touch input device according to another embodiment of the present invention.
Figure 15:
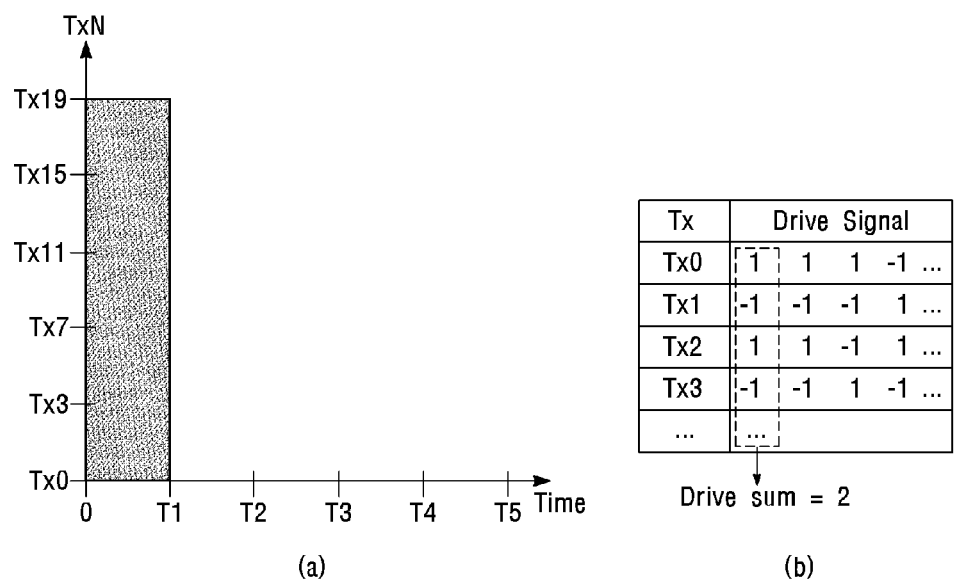

The (a) of FIG. 15 is a schematic diagram for a graph showing all driving electrodes being multi-driven in the touch input device shown in FIG. 13, and (b) of FIG. 15 is a schematic diagram for a graph showing simultaneous driving during multi-driving in the element (a) of FIG. 15. This is an example of a driving signal (or driving code) applied to all driving electrodes (Tx0, Tx1, Tx2, Tx3, ... ).

Figure 16:
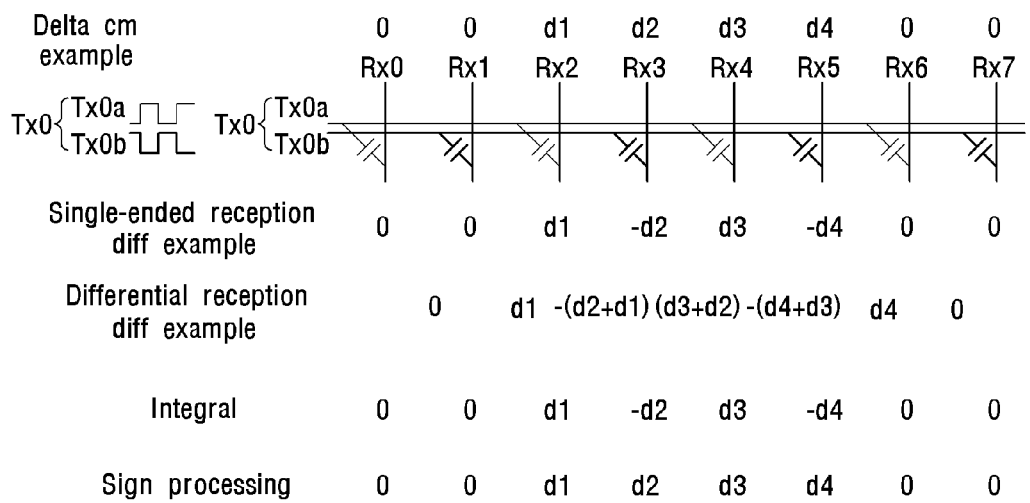

FIG. 16 is a schematic diagram to explain a process by which the control unit 13 of the touch input device shown in FIG. 13 processes signals received from the touch sensor 10'.

Figure 17:
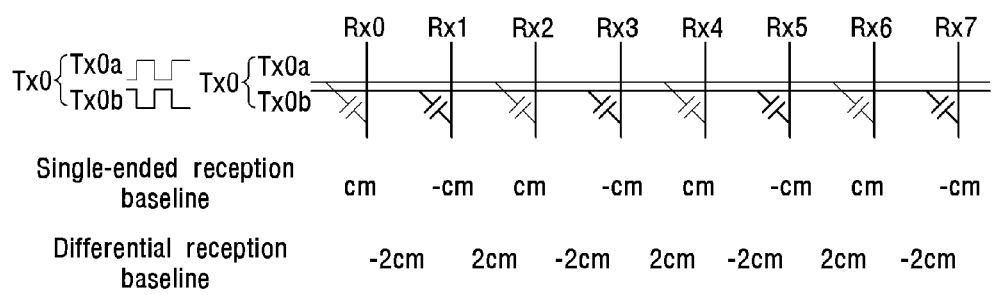

FIG. 17 is a schematic diagram to explain baseline settings in the control unit 13 of the touch input device shown in FIG. 13.

Figure 18:
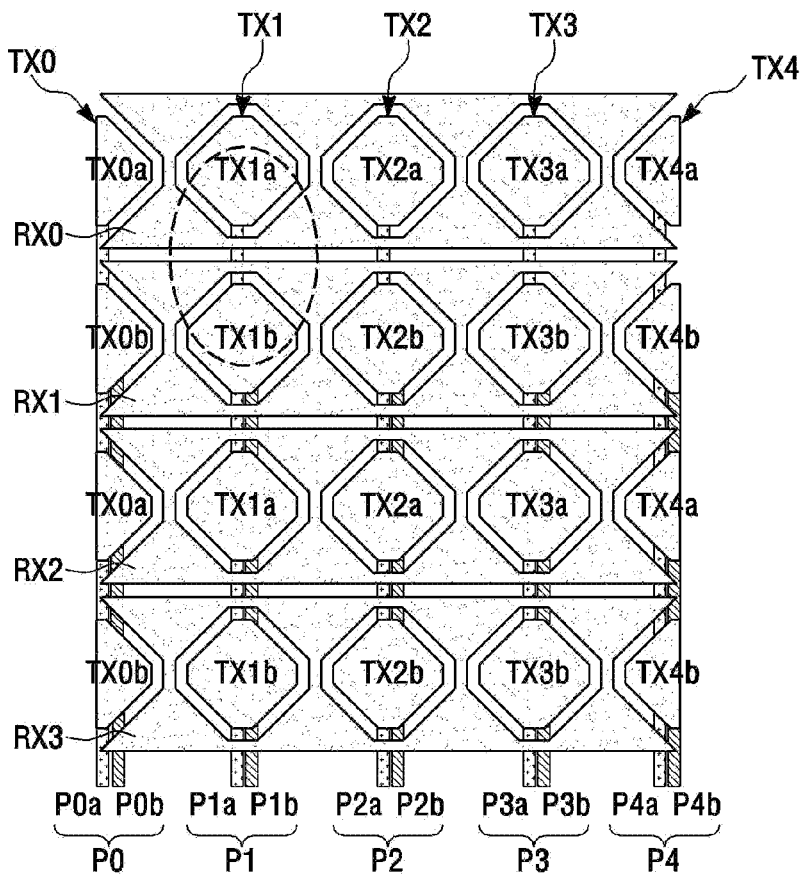

FIG. 18 is a schematic diagram for a partial plan view of an embodiment of the touch sensor 10' shown in FIG. 13.

Figure 19:
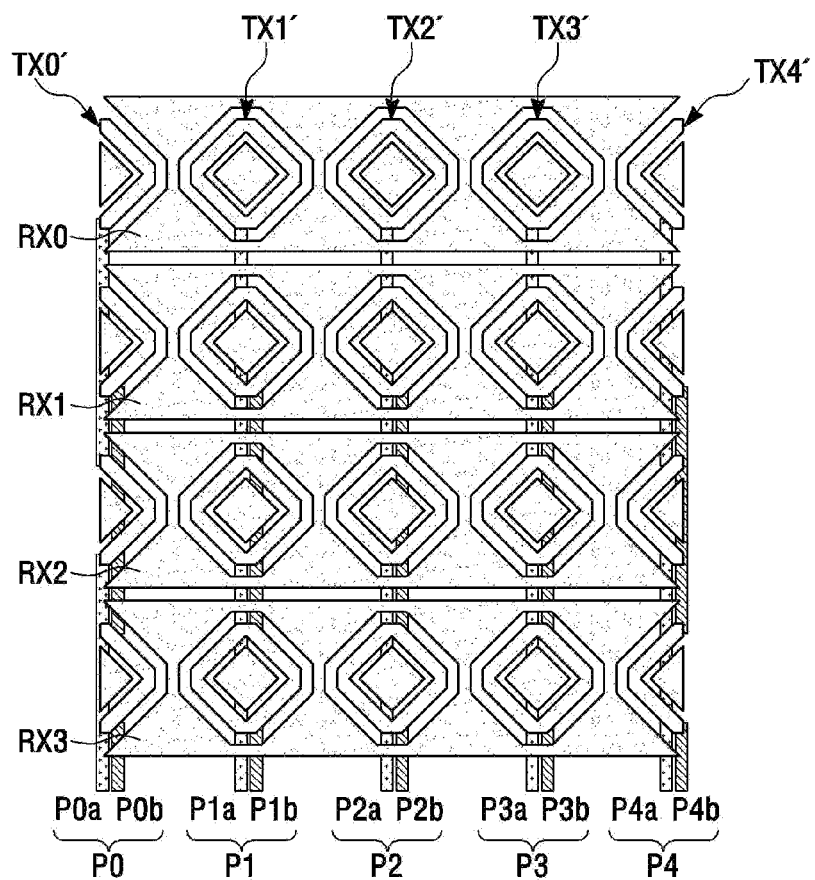

FIG. 19 is a schematic diagram for a partial plan view of another embodiment of the touch sensor 10' shown in FIG. 13.

Figure 20:
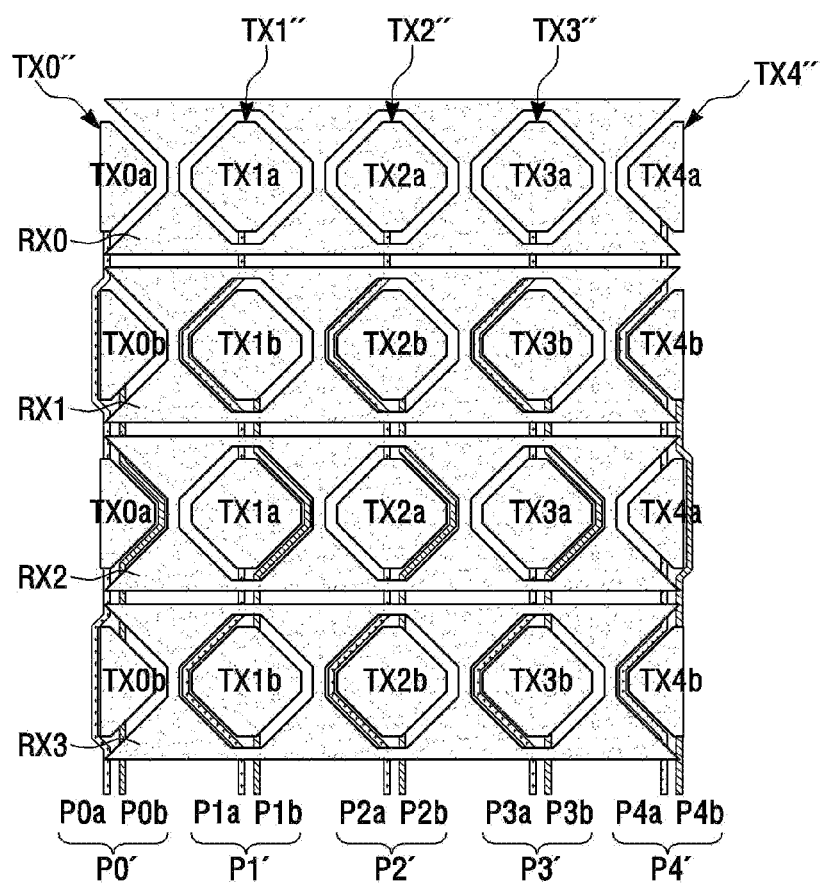

FIG. 20 is a schematic diagram for a partial plan view of another embodiment of the touch sensor 10' shown in FIG. 13.

Figure 21:
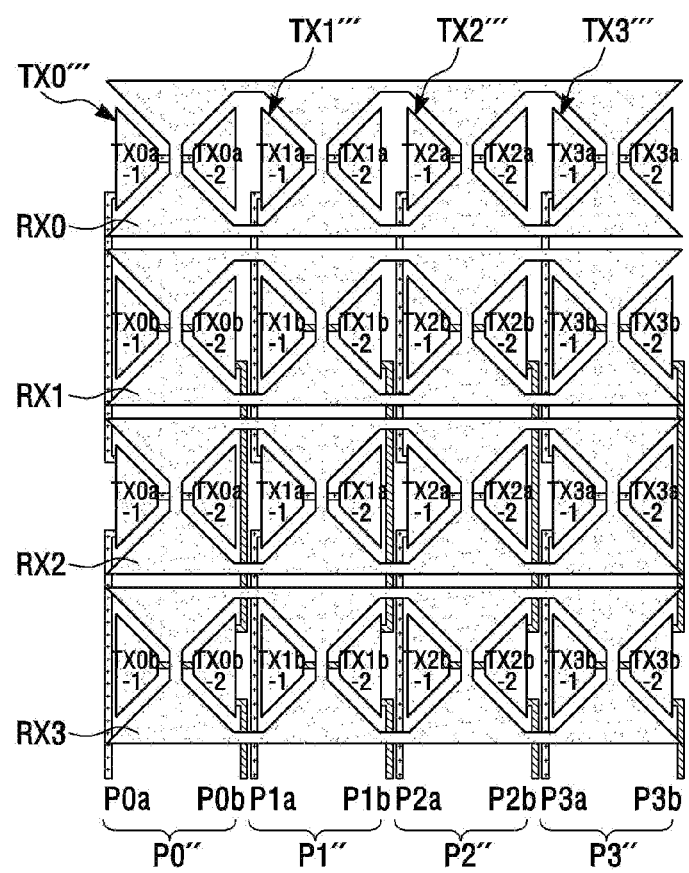

FIG. 21 is a schematic diagram for a partial plan view of another embodiment of the touch sensor 10' shown in FIG. 13.

Figure 22:
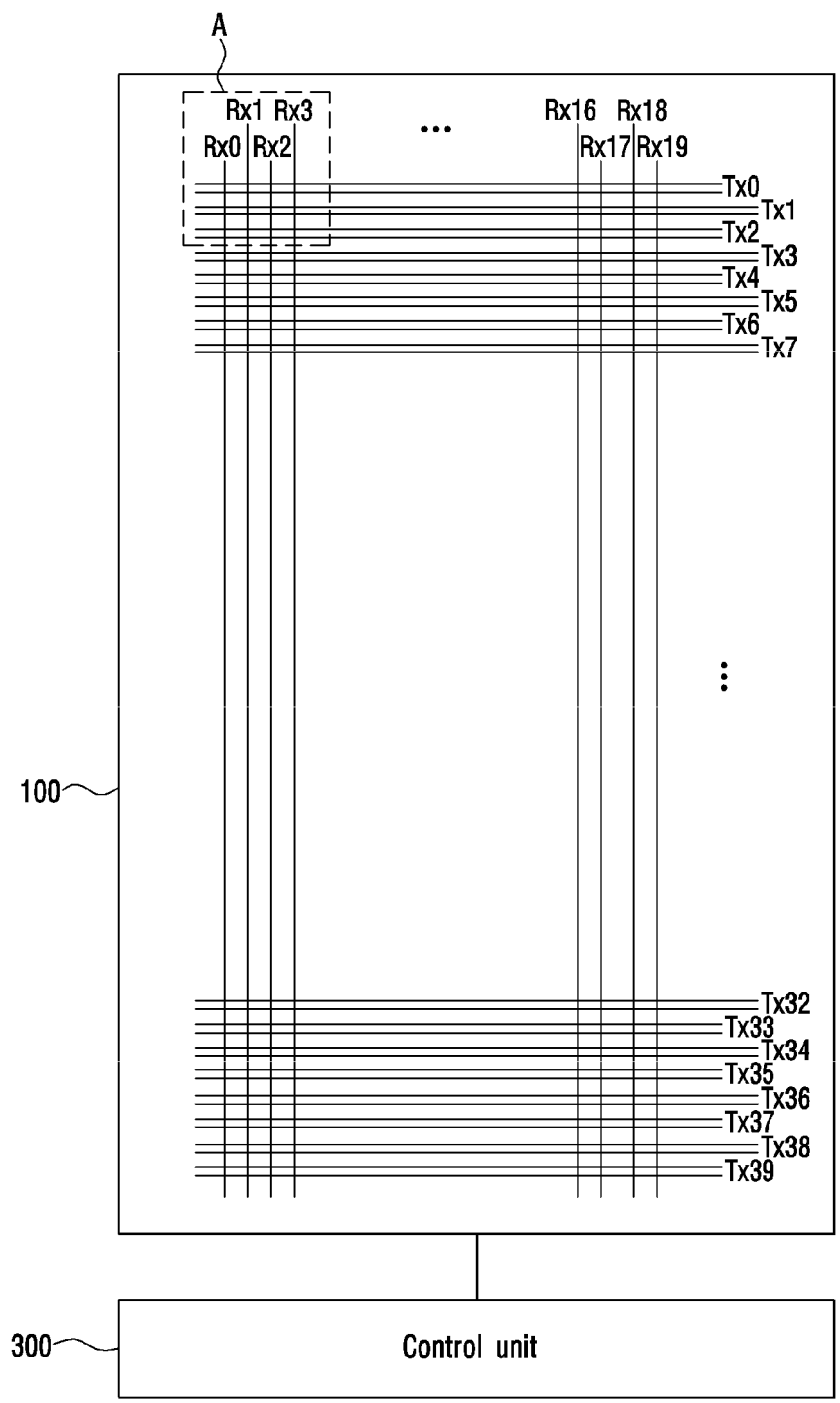

FIG. 22 is a schematic diagram for a touch input device according to another embodiment of the present invention.

Figure 23:
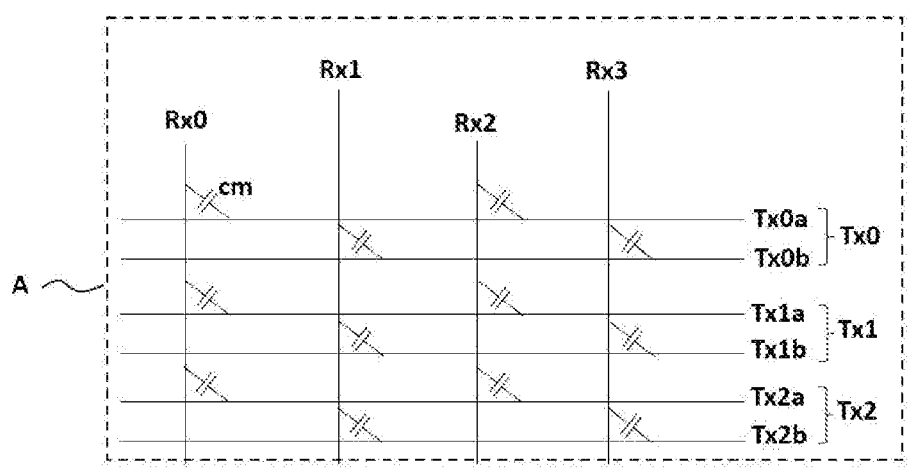

FIG. 23 is a schematic diagram for an enlarged view of A portion, shown in FIG. 22.

Figure 24:
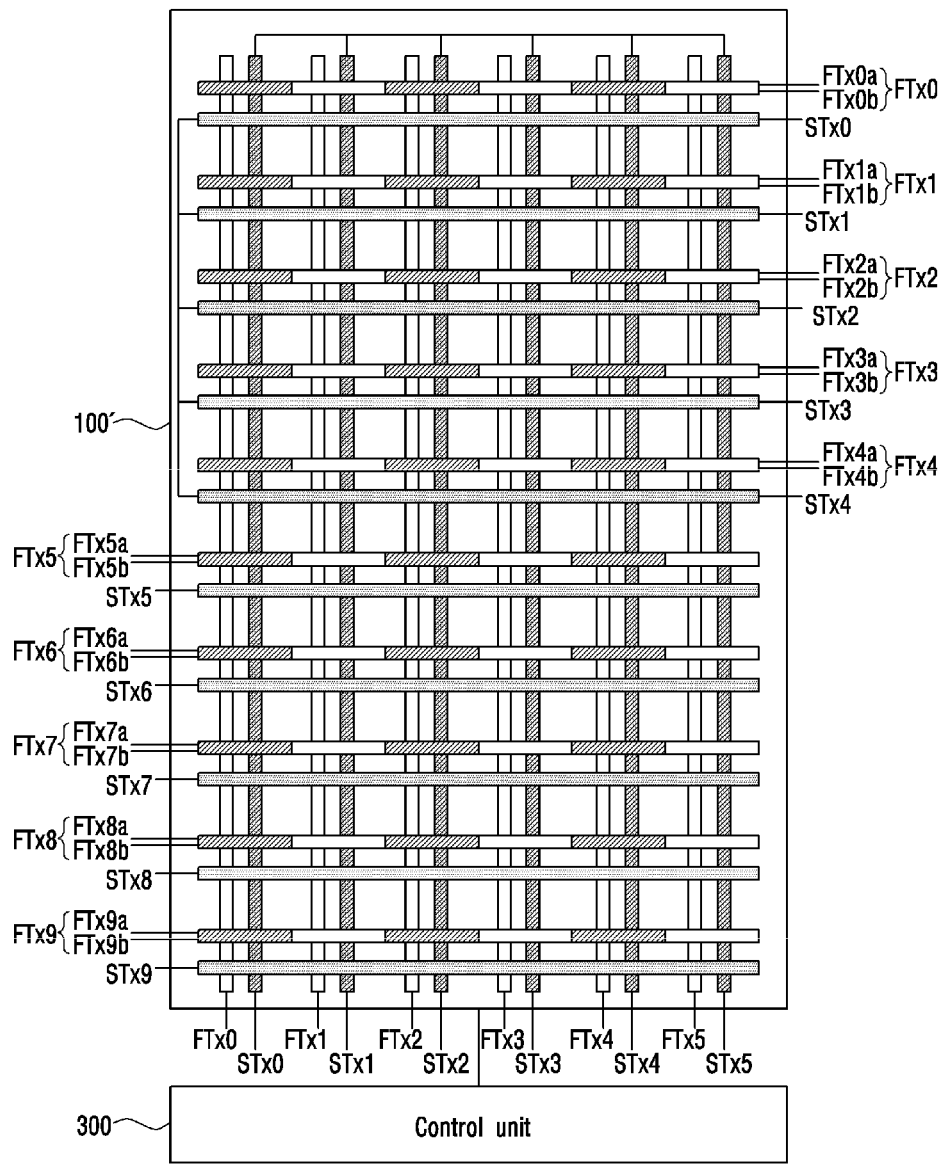

FIG. 24 is a schematic diagram for a touch input device according to another embodiment of the present invention.

Figure 25:
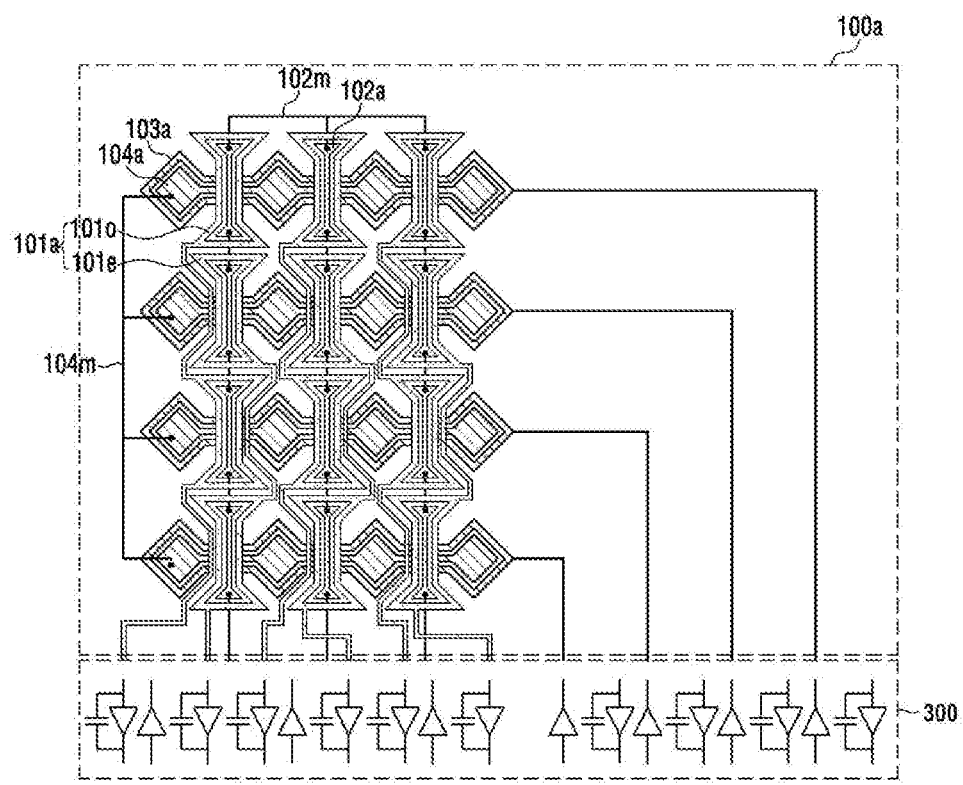

FIG. 25 is a schematic diagram for a first embodiment of the touch input device shown in FIG. 24.

Figure 26:
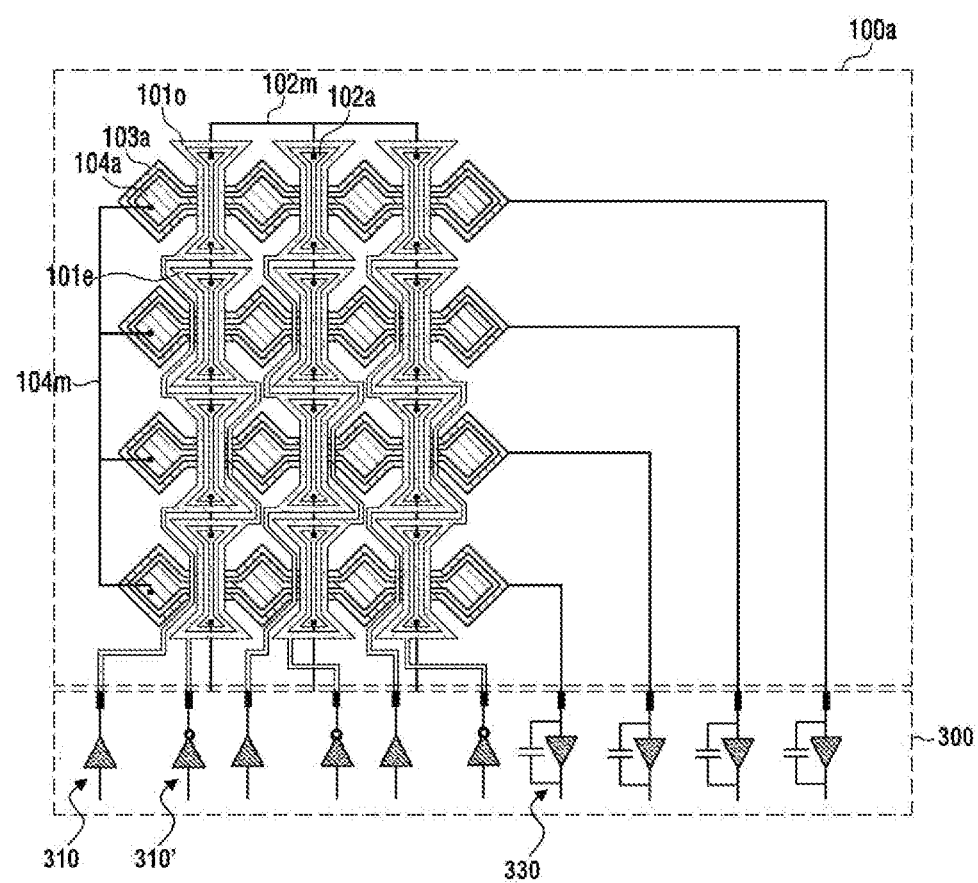
Figure 27:
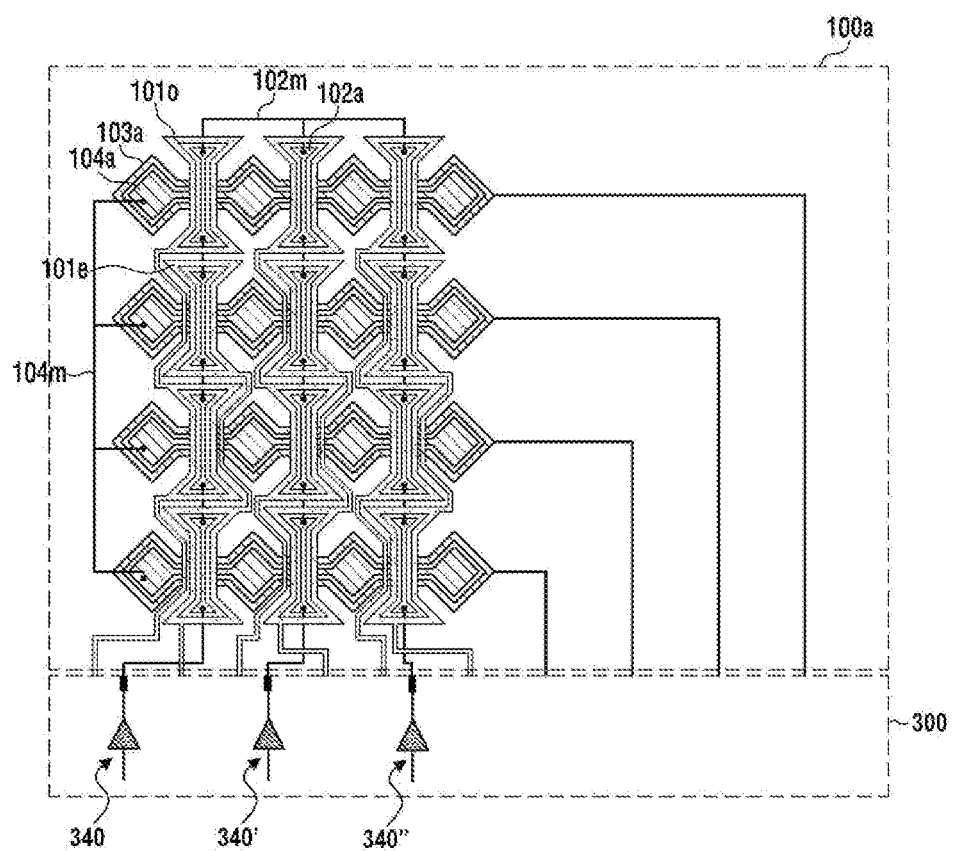
Figure 28:
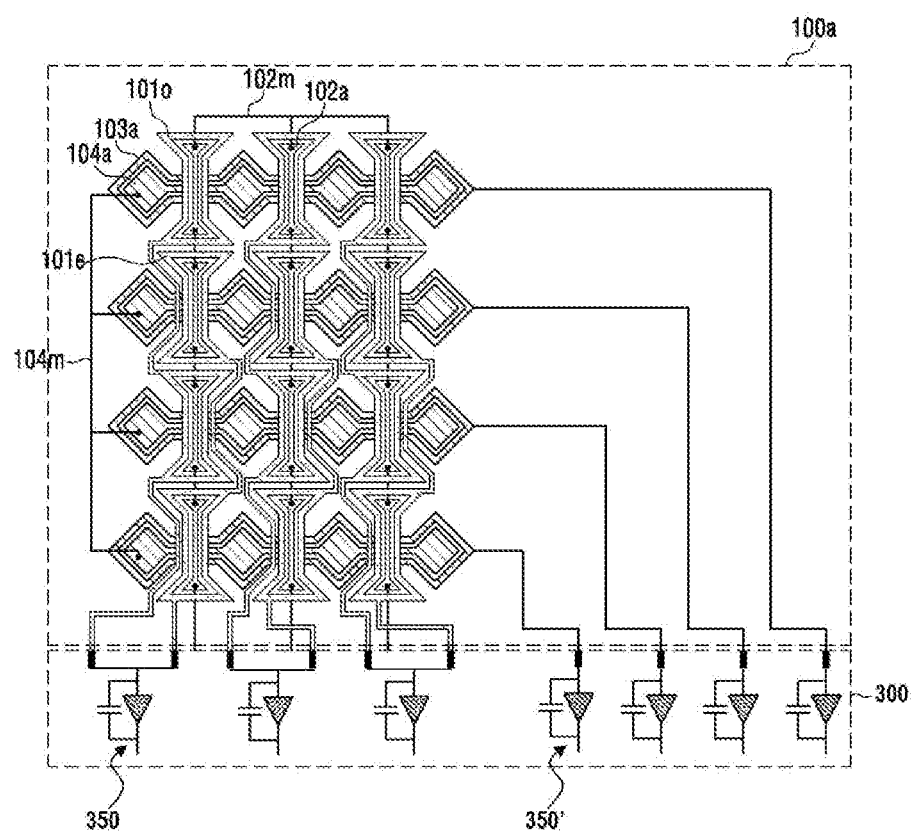

FIGS. 26 to 28 are schematic diagrams for explaining the use of the touch sensor 100a shown in FIG. 25 as No. 1 in Table 1 above.

Figure 29:
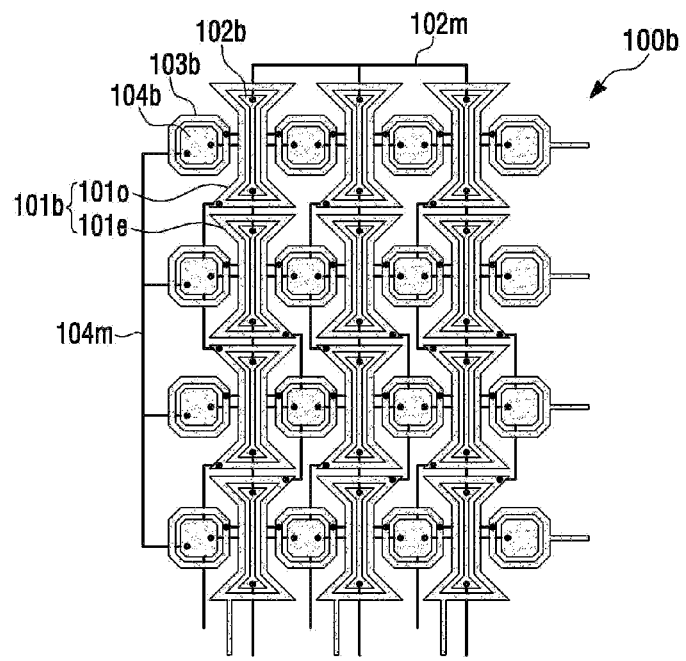

FIG. 29 is a schematic diagram for a second embodiment of the touch sensor 100' of the touch input device shown in FIG. 24.

Figure 30:
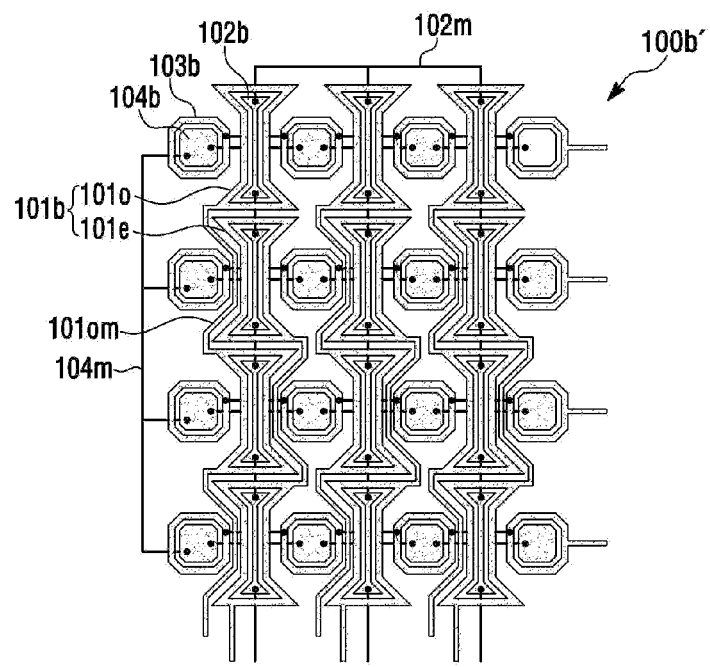

FIG. 30 is a schematic diagram for a third embodiment of the touch sensor 100' of the touch input device shown in FIG. 24.

Figure 31:
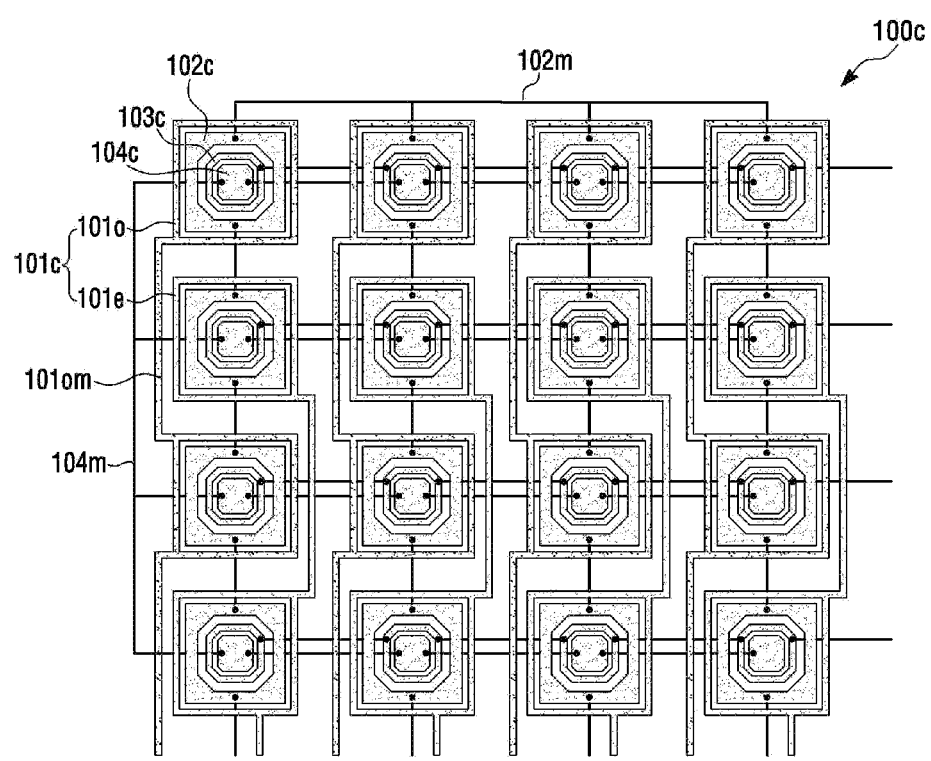

FIG. 31 is a schematic diagram for a fourth embodiment of the touch sensor 100' of the touch input device shown in FIG. 24.

Figure 32:
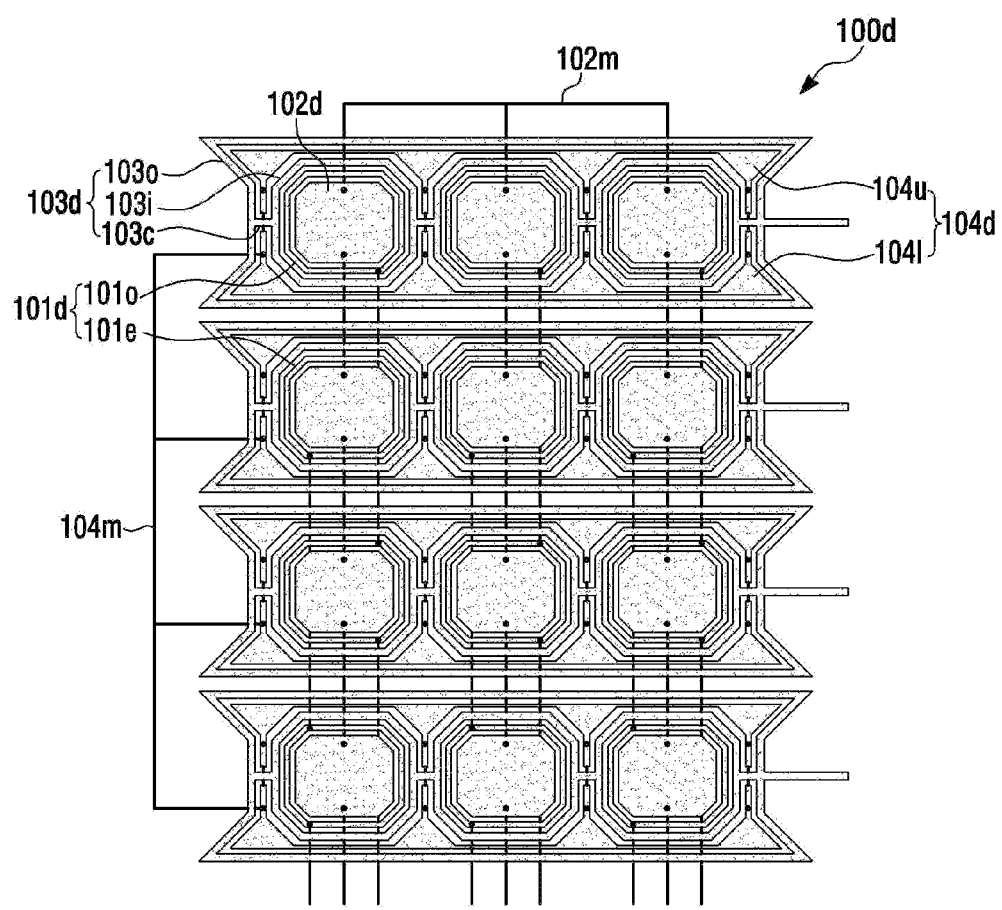

FIG. 32 is a schematic diagram for a fifth embodiment of the touch sensor 100' of the touch input device shown in FIG. 24.

Figure 33:
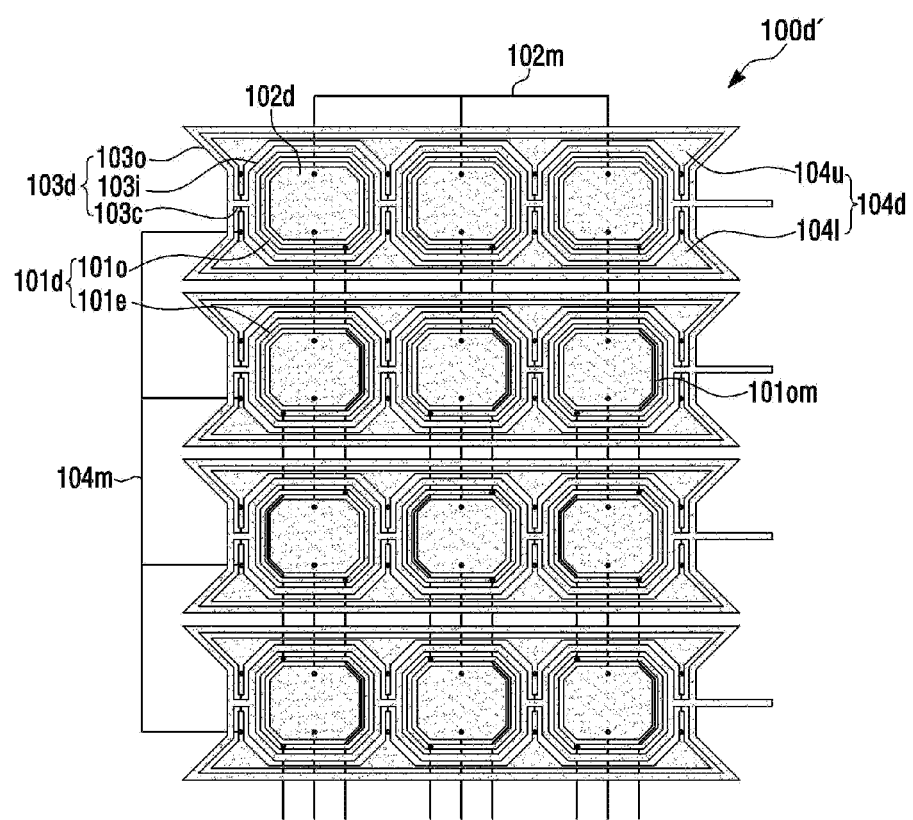

FIG. 33 is a schematic diagram for a sixth embodiment of the touch sensor 100' of the touch input device shown in FIG. 24.

DETAILED DESCRIPTION

The detailed description of the present invention described below refers to the accompanying drawings, which shows by way of example specific embodiments in which the present invention may be practiced. These embodiments are described in sufficient detail to enable any person skilled in the art to practice the invention. It should be understood that the various embodiments of the present invention are different from one another but are not necessarily mutually exclusive. For example, specific shapes, structures, and characteristics described herein may be implemented in one embodiment or another without departing from the spirit and scope of the invention. Additionally, the location or arrangement of individual components within each disclosed embodiment may be changed without departing from the spirit and scope of the invention. Accordingly, the detailed description that follows is not intended to be taken in a limiting sense, and the scope of the invention is limited only by the appended claims, together with all equivalents to what those claims assert, if properly described. Similar reference numbers in the drawings refer to identical or similar functions across various aspects.

The touch input device according to various embodiments of the present document is an electronic device, for example, a smartphone, a tablet personal computer, a vehicle display device, a mobile phone, a video phone, it may include at least one of an e-book reader, a laptop personal computer, a netbook computer, a mobile medical device, a camera, or a wearable device. Here, wearable devices may be accessory-type (e.g., watches, rings, bracelets, anklets, necklaces, glasses, contact lenses, or head-mounted-device (HMD)), fabric- or clothing-integrated (e.g., electronic clothing), etc.), body-attached type (e.g., skin pad or tattoo), or bio implantable type (e.g., implantable circuit).

FIG. 2 is a schematic diagram of a touch input device according to an embodiment of the present invention.

Referring to FIG. 2, the touch input device 1 according to an embodiment of the present invention may include a touch sensor 10, a sensing unit 11, a driving unit 12, and a control unit 13.

The driving unit 12 applies a driving signal (or TX signal) to the touch sensor 10 under the control of the control unit 13. The sensing unit 11 receives the sensing signal (or RX signal) received from the touch sensor 10.

The driving unit 12 may sequentially supply driving signals to a plurality of driving electrodes of the touch sensor 10.

The sensing unit 11 receives a signal output from a plurality of receiving electrodes of the touch sensor 10. Here, the signal may include information on the amount of change in capacitance between adjacent driving electrodes and receiving electrodes, an LGM noise signal, and a display noise signal.

The sensing unit 11 may output a subtraction signal by subtracting two signals among the signals output from the plurality of receiving electrodes. The sensing unit 11 converts the output subtraction signal into analog-to-digital and output it. For this purpose, the sensing unit 11 may include a comparator and an ADC.

The control unit 13 may detect whether the touch is touched and/or the touch position based on the digital signal output from the sensor 11.

In FIG. 2, the sensing unit 11, the driving unit 12, and the control unit 13 are shown separately for convenience of explanation, but the present invention is not limited thereto. For example, at least one or two of the sensing unit 11, the driving unit 12, and the control unit 13 may be implemented as one module, one unit, or one chip. The sensing unit 11 and the driving unit 12 and the control unit 13 may be implemented as one module, one unit, or one chip.

The touch input device 1 shown in FIG. 2 may include a display panel. In this case, the touch sensor 10 may be disposed on the display panel, such as in the OCTA method, or within the display panel, such as in the in-cell method. In some cases, the touch sensor 10 may also be disposed below the display panel.

In one example, the touch sensor 10 can be formed directly on the outer surface (e.g., the upper surface of the upper substrate or the lower surface of the lower substrate) or the inner surface (e.g., the lower surface of the upper substrate or the upper surface of the lower substrate) of the display panel. The touch sensor 10 may be combined with the display panel to form a touch screen.

The touch sensor 10 includes a plurality of electrodes of a certain shape, and certain electrodes include a plurality of first electrodes and a plurality of second electrodes. Here, when a driving signal is applied to the plurality of first electrodes, it can be that the plurality of first electrodes become a plurality of driving electrodes (Tx0, Tx1, Tx2, . . . ), and the plurality of second electrodes become a plurality of receiving electrodes (Rx0, Rx1, Rx2, Rx3, . . . ).

The plurality of driving electrodes (Tx0, Tx1, Tx2, . . . ) and the plurality of receiving electrodes (Rx0, Rx1, Rx2, Rx3, . . . ) may be disposed to intersect each other. Between the plurality of driving electrodes (Tx0, Tx1, Tx2, . . . ) and the plurality of receiving electrodes (Rx0, Rx1, Rx2, Rx3, . . . ), especially at the intersection thereof, a certain mutual capacitance (cm) can be formed.

Each of the driving electrodes (Tx0, Tx1, Tx2, . . . ) extends in the first axis direction, and each of the receiving electrodes (Rx0, Rx1, Rx2, Rx3 . . . ) extends in the second axis direction different from the first axis direction. Here, the second axis direction may be perpendicular to the first axis direction.

Some of the receiving electrodes (Rx0a, Rx1a, Rx2a, Rx3a, . . . ) of the plurality of receiving electrodes (Rx0, Rx1, Rx2, Rx3 . . . ) may be arranged so that a mutual capacitance (cm) can be formed with some of the driving electrodes (Tx0, Tx2, Tx4, Tx6, . . . ) of the plurality of driving electrodes (Tx0, Tx1, Tx2, . . . ). The remaining receiving electrodes (Rx0b, Rx1b, Rx2b, Rx3b, . . . ) of the plurality of receiving electrodes (Rx0, Rx1, Rx2, . . . ) may be arranged so that a mutual capacitance (cm) can be formed with the remaining driving electrodes (Tx1, Tx3, Tx5, Tx7, . . . ) of the plurality of driving electrodes (Tx0, Tx1, Tx2, . . . ).

Some of the receiving electrodes (Rx0a, Rx1a, Rx2a, Rx3a, . . . ) of the plurality of receiving electrodes (Rx0, Rx1, Rx2, Rx3 . . . ) are disposed immediately adjacent to some of the driving electrodes (Tx0, Tx2, Tx4, Tx6, . . . ) of the plurality of driving electrodes (Tx0, Tx1, Tx2, . . . ). It can be that some of the receiving electrodes (Rx0a, Rx1a, Rx2a, Rx3a, . . . ) of the plurality of receiving electrodes (Rx0, Rx1, Rx2, Rx3 . . . ) are disposed, without being immediately adjacent, to be spaced a distance apart in an interval with the remaining driving electrodes (Tx1, Tx3, Tx5, Tx7, . . . ). Here, at least one other electrode may be disposed between some of the receiving electrodes (Rx0a, Rx1a, Rx2a, Rx3a, . . . ) and the remaining driving electrodes (Tx1, Tx3, Tx5, Tx7, . . . ). The at least one other electrode may be some of the driving electrodes (Tx0, Tx2, Tx4, Tx6, . . . ).

The remaining receiving electrodes (Rx0b, Rx1b, Rx2b, Rx3b, . . . ) of the plurality of receiving electrodes (Rx0, Rx1, Rx2, . . . ) are disposed immediately adjacent to the remaining driving electrodes (Tx0, Tx2, Tx4, Tx6, . . . ). It can be that the remaining receiving electrodes (Rx0b, Rx1b, Rx2b, Rx3b, . . . ) of the plurality of receiving electrodes (Rx0, Rx1, Rx2, . . . ) are disposed, without being immediately adjacent, to be spaced a distance apart in an interval with the some of the driving electrodes (Tx0, Tx2, Tx4, Tx6, . . . ). Here, at least one other electrode may be disposed between the remaining receiving electrodes (Rx0b, Rx1b, Rx2b, Rx3b, . . . ) and some of the driving electrodes (Tx0, Tx2, Tx4, Tx6, . . . ). The at least one other electrode may be the remaining driving electrodes (Tx1, Tx3, Tx5, Tx7, . . . ).

When a driving signal is applied to some of the driving electrodes (Tx0, Tx2, Tx4, Tx6, . . . ), a first signal is output from some of the receiving electrodes (Rx0a, Rx1a, Rx2a, Rx3a, . . . ) which form a mutual capacitance (Cm) with, and a second signal is output from the remaining receiving electrodes (Rx0b, Rx1b, Rx2b, Rx3b, . . . ) which do not substantially form a mutual capacitance (Cm) with. The sensing unit 11 may output a signal obtained by subtracting the second signal from the first signal to the control unit 13. The control unit 13 may detect the touch position of the object based on signals from the sensing unit 11. Here, the first signal includes information of the amount of change in mutual capacitance due to the object, display noise (e.g., Zebra noise), variation due to image change, LGM noise in the floating state, and noise by Cathode re-transmission phenomenon (Phenomenon which is the larger the size of the resistance (RELVSS) of the ELVSS layer (i.e., the weaker GND becomes) high-frequency signals are also transmitted to the RX sensor and added to the main signal. Meanwhile, there is almost no information on the amount of change in mutual capacitance due to the object in the second signal. However, the remaining noise information (display noise (e.g., zebra noise), variation due to image change, LGM noise in floating state, noise due to cathode re-transmission phenomenon, etc.) is included. Accordingly, since the sensing unit 11 subtracts the second signal from the first signal, the signal input to the control unit 13 does not contain noise information and may contain only information on the amount of change in mutual capacitance due to the object.

Conversely, when a driving signal is applied to the remaining driving electrodes (Tx1, Tx3, Tx5, Tx7, . . . ), a second signal is output from the remaining receiving electrodes (Rx0b, Rx1b, Rx2b, Rx3b, . . . ) which form a mutual capacitance (Cm). A first signal is output from some of the receiving electrodes (Rx0a, Rx1a, Rx2a, Rx3a, . . . ) which do not substantially form a mutual capacitance (Cm). The sensing unit 11 may output a signal obtained by subtracting the first signal from the output second signal to the control unit 13. The control unit 13 may detect the touch position of the object based on signals from the sensing unit 11. Here, the second signal includes information of the amount of change in mutual capacitance caused by the object. Therefore, a signal obtained by subtracting the first signal from the second signal is input to the control unit 13, and the subtracted signal contains no noise information and only information of the amount of change of mutual capacitance due to the object.

A plurality of driving electrodes (Tx0, Tx1, Tx2, . . . ) and a plurality of receiving electrodes (Rx0, Rx1, Rx2, . . . ) may be disposed together on the same layer (1 layer) or may be disposed in different layers of a double layer (2 layers). In addition, some of the plurality of driving electrodes (Tx0, Tx1, Tx2, . . . ) may be disposed on different layers from the others, and some of the plurality of receiving electrodes (Rx0, Rx1, Rx2, . . . ) may also be disposed on different layers from the others. A plurality of driving electrodes (Tx0, Tx1, Tx2, . . . ) and a plurality of receiving electrodes (Rx0, Rx1, Rx2, . . . ) may have a diamond pattern, circular, oval, or polygonal shape.

A plurality of driving electrodes (Tx0, Tx1, Tx2, . . . ) and a plurality of receiving electrodes (Rx0, Rx1, Rx2, . . . ) may be comprised of a metal mesh, and it can be patterned on the thin film encapsulation (TFE) layer of the display panel.

It will be described with reference to the following drawings, various embodiments of the touch sensor 10 according to an embodiment of the present invention shown in FIG. 2.

Figure 3:
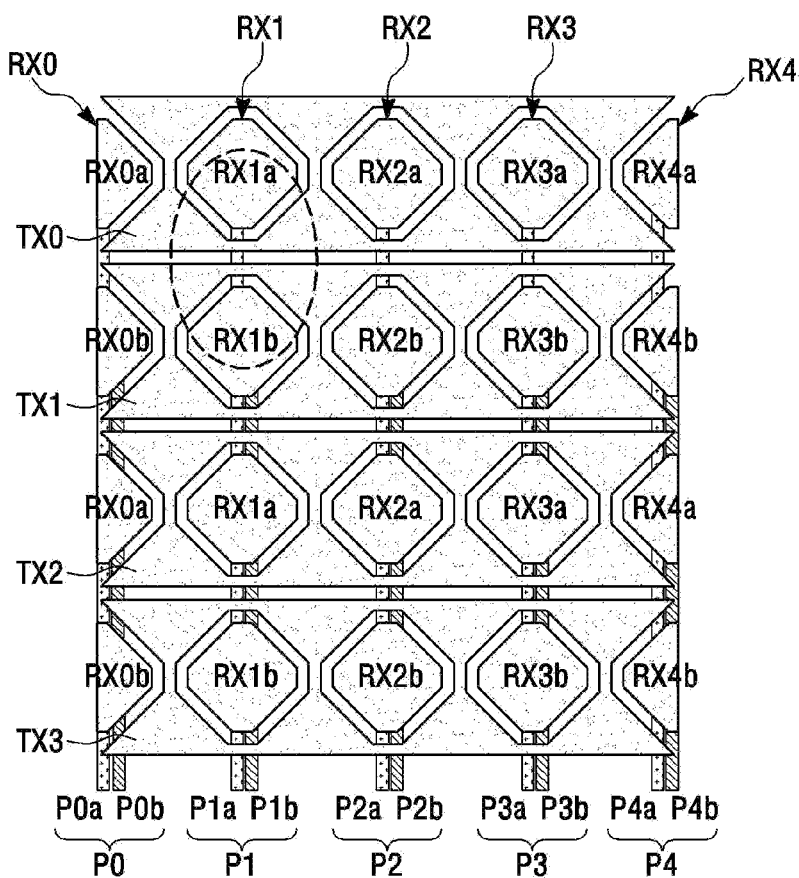
FIG. 3 is a schematic diagram for a partial plan view of an embodiment of the touch sensor 10 shown in FIG. 2.
Figure 4:
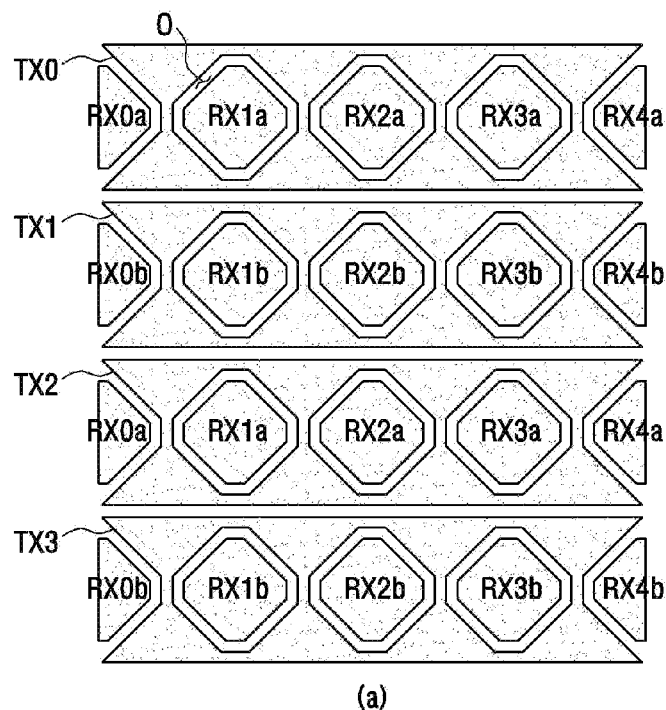
FIG. 4 is a schematic diagram for a plan view showing the touch sensor shown in FIG. 3 separated by layer.
Figure 4:
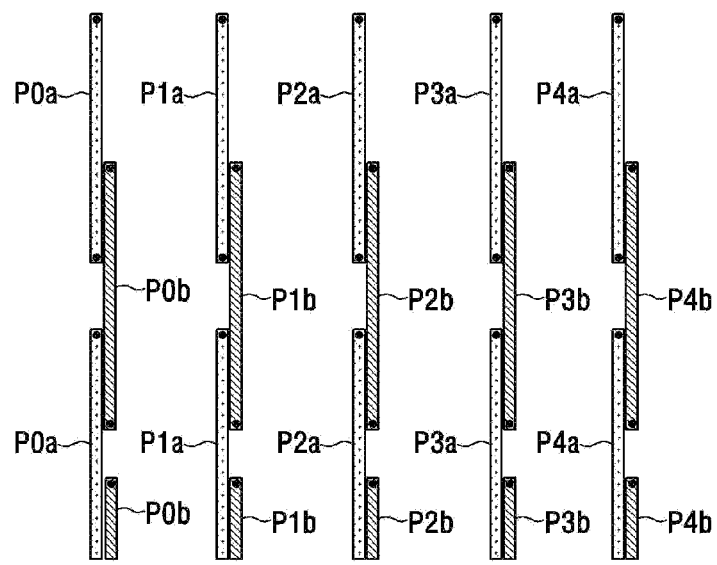
Figure 5:
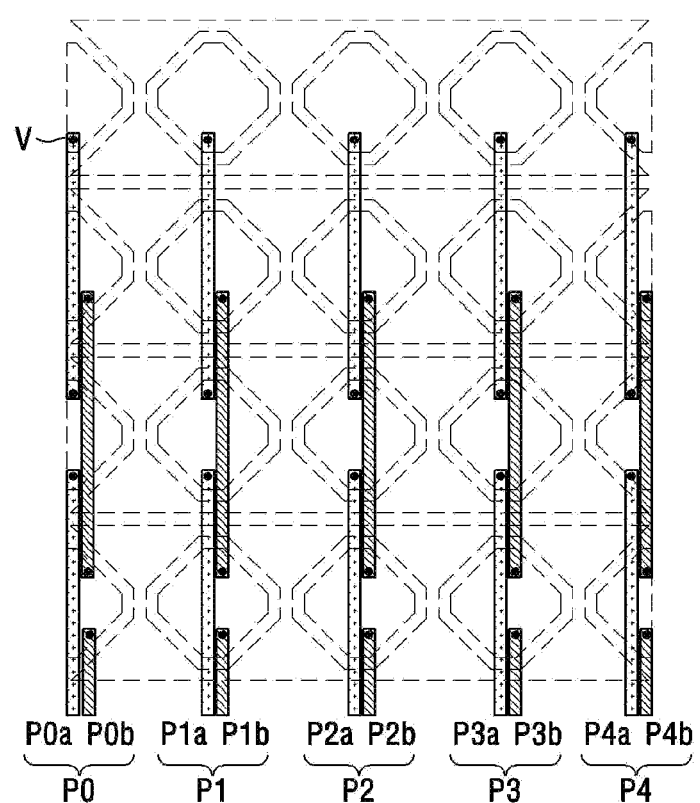
FIG. 5 is a schematic diagram to explain the electrical connection of a plurality of receiving electrodes shown in FIG. 4.

FIG. 3 is a partial plan view of an embodiment of the touch sensor 10 shown in FIG. 2. FIG. 4 is a plan view showing the touch sensor shown in FIG. 3 separated by layer. FIG. 5 is a schematic diagram for explaining the electrical connection of the plurality of receiving electrodes shown in FIG. 4.

Referring to FIGS. 3 to 5, the touch sensor according to an embodiment of the present invention may be disposed on or inside the display panel.

A touch sensor according to an embodiment of the present invention includes a plurality of first electrodes and a plurality of second electrodes. Among the plurality of first electrodes and the plurality of second electrodes, electrodes applied a driving signal can be driving electrodes, and the remaining electrodes can be receiving electrodes. Hereinafter, it is explained that a plurality of first electrodes are a plurality of driving electrodes (TX0, TX1, TX2, TX3, . . . ) and a plurality of second electrodes are a plurality of receiving electrodes (RX0, RX1, RX2, RX3, RX4, . . . ).

A plurality of driving electrodes (TX0, TX1, TX2, TX3, . . . ) include a 0th driving electrode (TX0), a first driving electrode (TX1), a second driving electrode (TX2), and a third driving electrode (TX3). Here, a plurality of driving electrodes (TX0, TX1, TX2, TX3 . . . ) correspond to a plurality of driving electrodes (Tx0, Tx1, Tx2, . . . ) shown in FIG. 2.

A plurality of receiving electrodes (RX0, RX1, RX2, RX3, RX4, . . . ) include 0th receiving electrode (RX0), 1st receiving electrode (RX1), 2nd receiving electrode (RX2), 3rd receiving electrode (RX3), and 4th receiving electrode (RX4). Here, a plurality of receiving electrodes (RX0, RX1, RX2, RX3, RX4, . . . ) correspond to a plurality of receiving electrodes (Rx0, Rx1, Rx2, Rx3, Rx4, . . . ) shown in FIG. 2.

A plurality of driving electrodes (TX0, TX1, TX2, TX3 . . . ) are disposed along the second direction (or vertical direction), and each of the plurality of driving electrodes (TX0, TX1, TX2, TX3, . . . ) extends along a first direction (or horizontal direction) perpendicular to the second direction. A plurality of receiving electrodes (RX0, RX1, RX2, RX3, RX4, . . . ) may be disposed along the second direction. Here, on the contrary, a plurality of driving electrodes (TX0, TX1, TX2, TX3, . . . ) are disposed along the first direction (or horizontal direction), and a plurality of receiving electrodes (RX0, RX1, RX2, RX3, RX4, . . . ) may be disposed along the second direction (or vertical direction).

A certain capacitance may be formed between the plurality of driving electrodes (TX0, TX1, TX2, TX3, . . . ) and the plurality of receiving electrodes (RX0, RX1, RX2, RX3, RX4, . . . ). This capacitance changes when a touch input occurs at or around a corresponding point. Therefore, it may detect a touch and a touch input by detecting an amount of change in capacitance from signals output from the plurality of receiving electrodes (RX0, RX1, RX2, RX3, RX4, . . . ).

Each of the plurality of driving electrodes (TX0, TX1, TX2, TX3 . . . ) may have the shape of a rectangular pattern or a bar pattern extending in the first direction, and each of the plurality of driving electrodes (TX0, TX1, TX2, TX3 . . . ) may have a plurality of openings O disposed along the first direction therein.

One receiving electrode may be disposed within each openings O, and the shape of each openings O corresponds to the shape of one receiving electrode disposed therein. For example, as shown in FIG. 3, the others may have a diamond shape among the plurality of openings O excluding the openings disposed on the left and right edges. The openings disposed at the left and right edges may have a triangular shape. Although not shown in the drawing, all openings O may have a diamond shape. Alternatively, the plurality of openings O may have various shapes such as polygonal, rectangular, circular, or oval.

Each receiving electrode (RX0, RX1, RX2, RX3, RX4, . . . ) has a plurality of receiving electrode patterns (RX0a, RX0b, RX1a, RX1b, RX2a, RX2b, RX3a, RX3b, RX4a, RX4b) and a connection pattern (P0, P1, P2, P3, P4). Here, some of the receiving electrode patterns (RX0a, RX1a, RX2a, RX3a, RX4a) correspond to some of the receiving electrodes (Rx0a, Rx1a, Rx2a, Rx3a, . . . ) shown in FIG. 2 among a plurality of receiving electrode patterns (RX0a, (RX0b, RX1a, RX1b, RX2a, RX2b, RX3a, RX3b, RX4a, RX4b), and the remaining receiving electrode patterns (RX0b, RX1b, RX2b, RX3b, RX4b) may correspond to the remaining receiving electrodes (Rx0b, Rx1b, Rx2b, Rx3b, . . . ) shown in FIG. 2.

As shown in element (a) of FIG. 4, a plurality of driving electrodes (TX0, TX1, TX2, TX3 . . . ) and a plurality of receiving electrode patterns (RX0a, RX0b, RX1a, RX1b, RX2a, RX2b, RX3a, RX3b, RX4a, RX4b) may be disposed together on the first layer. Here, a plurality of driving electrodes (TX0, TX1, TX2, TX3, . . . ) and a plurality of receiving electrode patterns (RX0a, RX0b, RX1a, RX1b, RX2a, RX2b, RX3a, RX3b, RX4a, RX4b) disposed on the first layer may be implemented as a metal mesh. As shown in the element (b) of FIG. 4, a plurality of connection patterns (P0a, P0b, P1a, P1b, P2a, P2b, P3a, P3b, P4a, P4b) can be disposed on the second layer. A second layer is a different layer from the first layer in the element (b) of FIG. 4, and the second layer is electrically insulated from the first layer. Here, the plurality of connection patterns (P0a, P0b, P1a, P1b, P2a, P2b, P3a, P3b, P4a, P4b) may be implemented as a metal mesh. The first layer of the element (a) of FIG. 4 may be disposed on the second layer the element (b) of FIG. 4, and vice versa.

A plurality of receiving electrode patterns included in each receiving electrode may be divided into at least two groups. Each of receiving electrode patterns in another group may be disposed alternately one by one between each receiving electrode patterns of one group. The receiving electrode patterns in one group are electrically separated from the receiving electrode patterns in another group. Here, the receiving electrode pattern within one group may be referred to as a first receiving electrode pattern, and the receiving electrode pattern within another group may be referred to as a second receiving electrode pattern.

A plurality of connection patterns of each receiving electrode includes first connection patterns which electrically connect first receiving electrode patterns in one group and second connection patterns which electrically connect second receiving electrodes in another group.

For example, the 0th receiving electrode RX0 may include a plurality of receiving electrode patterns (RX0a, RX0b) and a plurality of connection patterns P0. The plurality of receiving electrode patterns (RX0a, RX0b) may include a first group of receiving electrode patterns RX0a and a second group of receiving electrode patterns RX0b which are disposed alternately one by one along the second direction. The first group of receiving electrode patterns RX0a and the second group of receiving electrode patterns RX0b may be electrically separated from each other. The 0th connection pattern (P0) may include first connection patterns P0a for electrically connecting the first group of receiving electrode patterns RX0a and second connection patterns P0b for electrically connecting the second group of receiving electrode patterns RX0b.

The first receiving electrode RX1 may include a plurality of receiving electrode patterns (RX1a, RX1b) and a plurality of connection patterns P1. The plurality of receiving electrode patterns (RX1a, RX1b) may include a first group of receiving electrode patterns RX1a and a second group of receiving electrode patterns RX1b which are disposed alternately one by one along the second direction. The first group of receiving electrode patterns RX1a and the second group of receiving electrode patterns RX1b may be electrically separated from each other. The first connection pattern P1 may include the first connection patterns P1a for connecting electrically the receiving electrode patterns RX1a of first group and the second connection patterns P1b for connecting electrically the second group of receiving electrode patterns RX1b.

The second receiving electrode RX2 may include a plurality of receiving electrode patterns (RX2a, RX2b) and a plurality of connection patterns P2. The plurality of receiving electrode patterns (RX2a, RX2b) may include a first group of receiving electrode patterns RX2a and a second group of receiving electrode patterns RX2b which are disposed alternately one by one along the second direction. The first group of receiving electrode patterns RX2a and the second group of receiving electrode patterns RX2b may be electrically separated from each other. A second connection pattern (P2) may include that first connection patterns (P2a)

for electrically connecting the first group of receiving electrode patterns (RX2a) and second connection patterns (P2b) for electrically connecting the second group of receiving electrode patterns (RX2b).

The third receiving electrode RX3 may include a plurality of receiving electrode patterns (RX3a, RX3b) and a plurality of connection patterns P3. The plurality of receiving electrode patterns (RX3a, RX3b) may include a first group of receiving electrode patterns RX3a disposed alternately one by one along the second direction and a second group of receiving electrode patterns RX3b. The first group of receiving electrode patterns RX3a and the second group of receiving electrode patterns RX3b may be electrically separated from each other. The third connection pattern P3 may include that first connection patterns (P3a) for electrically connecting the first group of receiving electrode patterns (RX3a) and second connection patterns (P3b) for electrically connecting the second group of receiving electrode patterns (RX3b).

The fourth receiving electrode RX4 may include a plurality of receiving electrode patterns RX4a and RX4b and a plurality of connection patterns P4. The plurality of receiving electrode patterns RX4a and RX4b may include a first group of receiving electrode patterns RX4a and a second group of receiving electrode patterns RX4b which are disposed alternately one by one along the second direction. The first group of receiving electrode patterns RX4a and the second group of receiving electrode patterns RX4b may be electrically separated from each other. The fourth connection pattern P4 may include the first connection patterns (P4a) for electrically connecting the first group of receiving electrode patterns (RX4a) and second connection patterns (P4b) for electrically connecting the second group of receiving electrode patterns (RX4b).

A plurality of receiving electrode patterns (RX0a, RX0b, RX1a, RX1b, RX2a, RX2b, RX3a, RX3b, RX4a, RX4b) are disposed inside a plurality of openings (O). One receiving electrode pattern is disposed inside one opening (O). The shape of each receiving electrode pattern corresponds to the shape of the corresponding opening.

In an arbitrary receiving electrode (RX1), a portion of the driving electrode TX0 immediately adjacent to the periphery of the receiving electrode pattern RX1a in the first group and a part of the driving electrode TX1 immediately adjacent to the periphery of the receiving electrode pattern RX1b in the second group are disposed together between the receiving electrode pattern (RX1a) in the first group and the receiving electrode pattern (RX1b) in the second group which are disposed adjacent to each other.

An arbitrary driving electrode (TX0) is disposed immediately adjacent to the periphery of the first group of receiving electrode patterns (RX0a, RX1a, RX2a, RX3a, RX4a), and another driving electrodes TX1 is disposed immediately adjacent to the periphery of the other groups of receiving electrode patterns RX0b, RX1b, RX2b, RX3b, RX4b.

Each of the connection patterns (P0a, P0b, P1a, P1b, P2a, P2b, P3a, P3b, P4a, P4b) may have the shape of a bar pattern extending along the second direction and may include at least one conductive via (v). Conductive vias (v) may be disposed at both ends of each connection pattern.

In the 0th receiving electrode (RX0), each of the first connection patterns (P0a) connects electrically two receiving electrode patterns (RX0a) adjacent to each other through a conductive via (v) among the first group of receiving electrode patterns (RX0a), and it is disposed so as to overlap under the second group of receiving electrode patterns (RX0b), which are disposed between the two adjacent receiving electrode patterns (RX0a). Each of the second connection patterns (P0b) electrically connects two receiving electrode patterns (RX0b) adjacent to each other through a conductive via (v) among the second group of receiving electrode patterns (RX0b), and it is disposed so as to overlap under the second group of receiving electrode patterns (RX0b), which are disposed between the two adjacent receiving electrode patterns (RX0a). The first connection patterns (P1a, P2a, P3a, P4a) and the second connection patterns (P1b, P2b, P3b, P4b) of the remaining receiving electrodes (RX1, RX2, RX3, RX4) are disposed in the same manner as described above.

Hereinafter, it is described in detail of operation when a driving signal is applied to at least one of a plurality of driving electrodes (TX0, TX1, TX2, TX3). For convenience of explanation, it is described in detail of the operation of the first receiving electrode RX1 and the operation of the sensing unit 11 of FIG. 2.

When driving signals are applied sequentially or simultaneously to the plurality of driving electrodes (TX0, TX1, TX2, TX3), two sensing signals are output through the first connection pattern (P1). The first signal is a signal output through the first connection pattern (P1a), and the second signal is a signal output through the second connection pattern (P1b). Accordingly, first and second signals of two channels are output for each receiving electrode (RX0, RX1, RX2, RX3, RX4). The first and second signals are output simultaneously, and the first and second signals can be output to the sensing unit 11 of FIG. 2.

Depending on the driving electrode (TX0, TX1, TX2, TX3, . . . ) to which the driving signal is applied, one of the first signal and the second signal may be an active channel signal (or an active receiving signal (ARX)), and the other one may be a dummy channel signal (or a dummy received signal (DRX)). Specifically, when a driving signal is applied to the driving electrodes TX0 and/or TX2 where the first group of receiving electrode patterns RX1a are disposed, the first signal output by the first connection pattern P1a is an active channel signal and the second signal output by the second connection pattern (P1b) can be a dummy channel signal. On the other hand, when a driving signal is applied to the driving electrodes (TX1 or/and TX3) where the second group of receiving electrode patterns (RX1b) are disposed, the second signal output by the second connection pattern (P1b) can be an active channel signal, and the first signal output by the first connection pattern (P1a) can be a dummy channel signal.

For example, as shown in FIG. 3, assuming that an object (dotted line) is close to or in contact with the intersection point of the first driving electrode TX1 and the first receiving electrode RX1. At this time, when a driving signal is applied to the first driving electrode TX1, it can be changed that the capacitance (or mutual active capacitance) formed between the receiving electrode pattern (RX1b) belonging to the second group of the first receiving electrode (RX1) and the first driving electrode (TX1). The second signal including information on the changing amount of capacitance as an active channel signal and the second signal is output by the second connection pattern (P1b).

Meanwhile, it also can be changed that the capacitance (or dummy capacitance) formed between the receiving electrode patterns RX1a belonging to the first group of the first receiving electrode RX1. The first signal including capacitance variation information is a dummy channel signal. The first signal is output by the first connection pattern (P1a).

The sensing unit 11 shown in FIG. 2 subtracts the first signal output by the first connection pattern (P1a) from the second signal output by the second connection pattern (P1b). As a result, The all or most of the cathode retransmission noise signal, LGM noise signal, and display noise signal, which are input to the receiving electrode pattern (RX1b) belonging to the second group and the receiving electrode pattern (RX1a) belonging to the first group may be cancelled out.

Figure 6:
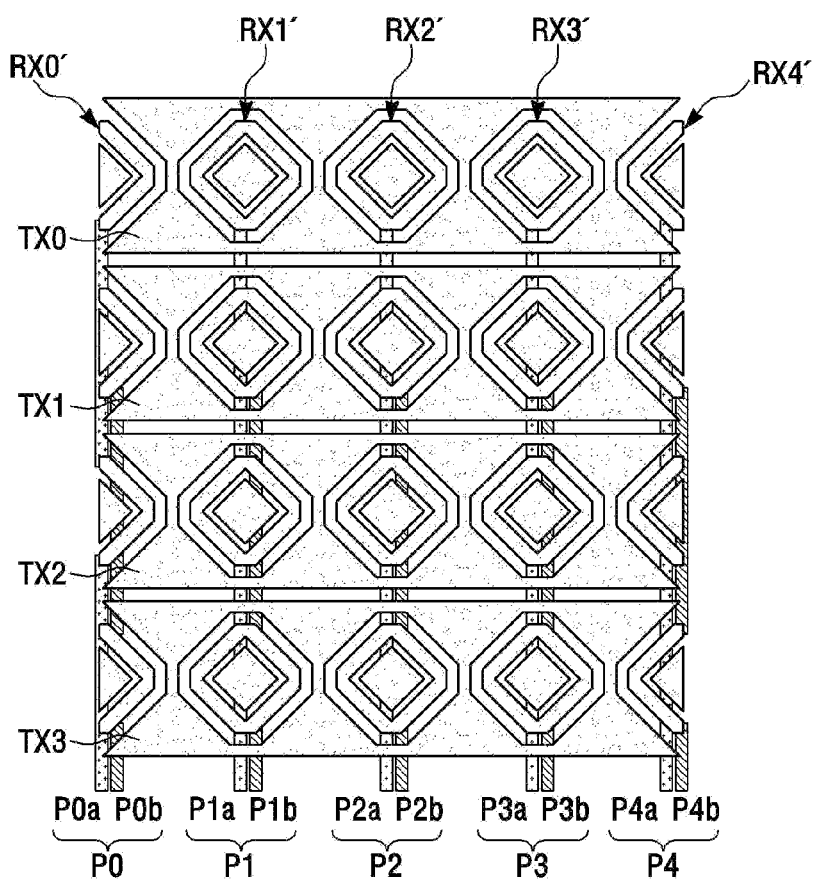
FIG. 6 is a schematic diagram for a plan view of a portion of another embodiment of the touch sensor 10 shown in FIG. 2.
Figure 7:
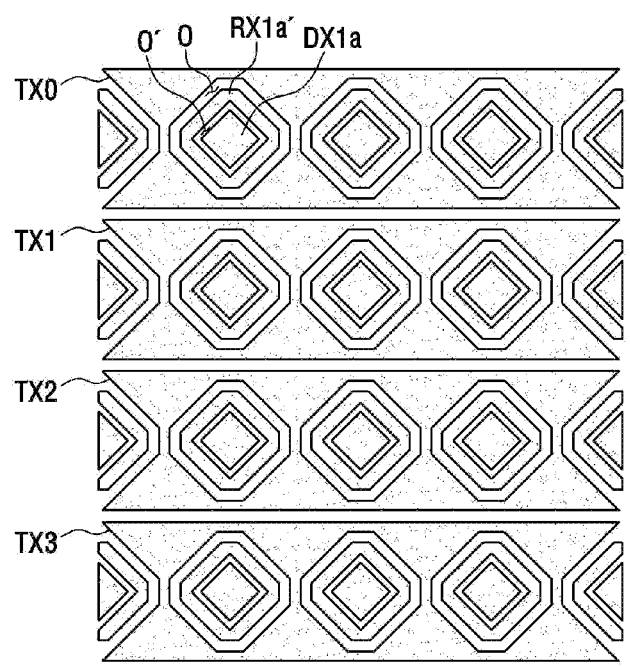
FIG. 7 is a schematic diagram for a plan view showing the touch sensor shown in FIG. 6 separated by layer.
Figure 7:
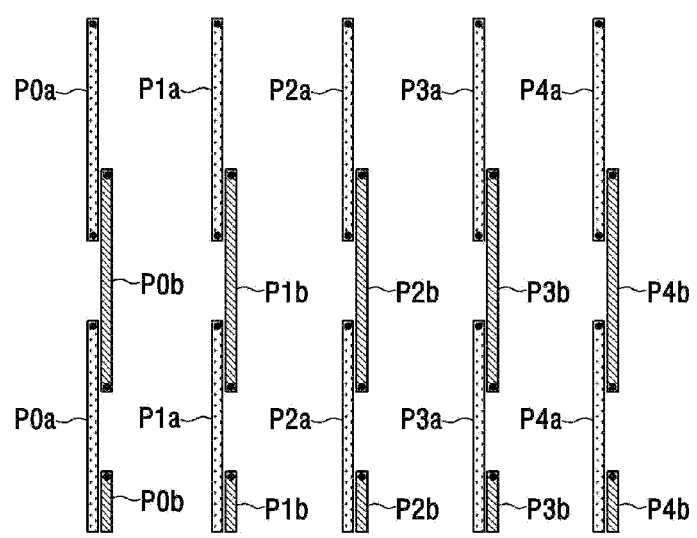
Figure 8:
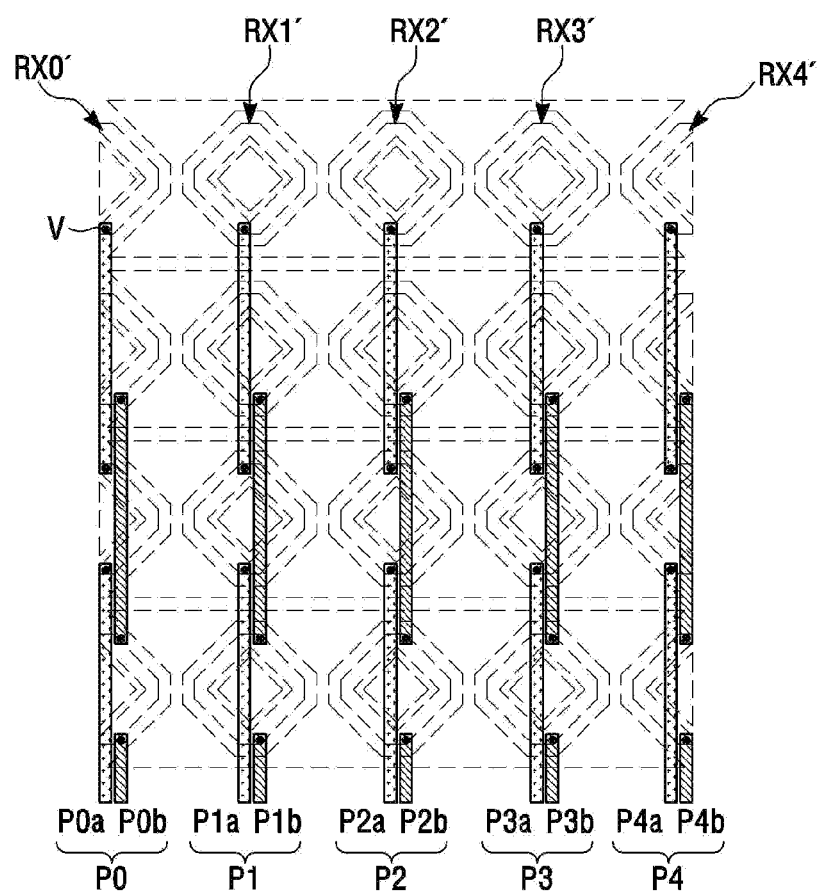
FIG. 8 is a schematic diagram for explaining the electrical connection of a plurality of receiving electrodes shown in FIG. 6.

FIG. 6 is a plan view of a portion of another embodiment of the touch sensor 10 shown in FIG. 2. FIG. 7 is a plan view of the touch sensor shown in FIG. 6 separated by layer. FIG. 8 is a plan view of a plurality of touch sensors shown in FIG. 6. This is a diagram to explain the electrical connection of the receiving electrode.

The touch sensor according to another embodiment of the present invention shown in FIGS. 6 to 8, there is a difference in a plurality of receiving electrodes (RX0', RX1', RX2', RX3' and RX4') compared to the touch sensor according to an embodiment of the present invention shown in FIGS. 3 to 5. In particular, the structures of the plurality of receiving electrode patterns (RX1a') included in each receiving electrode (RX0', RX1', RX2', RX3', RX4') are different. Hereinafter, the structure of the plurality of receiving electrode patterns RX1a' will be described in detail, and the remaining configurations will be replaced with the details described above.

A plurality of receiving electrode patterns (RX1a') included in each receiving electrode (RX0', RX1', RX2', RX3', RX4') has an opening (O') therein, and the plurality of receiving electrode patterns (RX1a) includes a dummy pattern DX1a disposed inside the opening O'. Here, the dummy pattern DX1a may have a shape corresponding to the opening O'.

A dummy pattern (DX1a) is not electrically connected to the connection patterns (P0a, P0b, P1a, P1b, P2a, P2b, P3a, P3b, P4a, P4b). The dummy pattern DX1a remains electrically floating.

The operation of the touch sensor according to another embodiment of the present invention shown in FIGS. 6 to 8 is the same as the operation of the touch sensor according to one embodiment of the present invention shown in FIGS. 3 to 5. Accordingly, the touch input device including a touch sensor according to another embodiment of the present invention shown in FIGS. 6 to 8 also has the advantage of removing various noises which may occur during touch sensing. For example, Cathode retransmission noise signal, display noise and LGM noise, etc.

Figure 9:
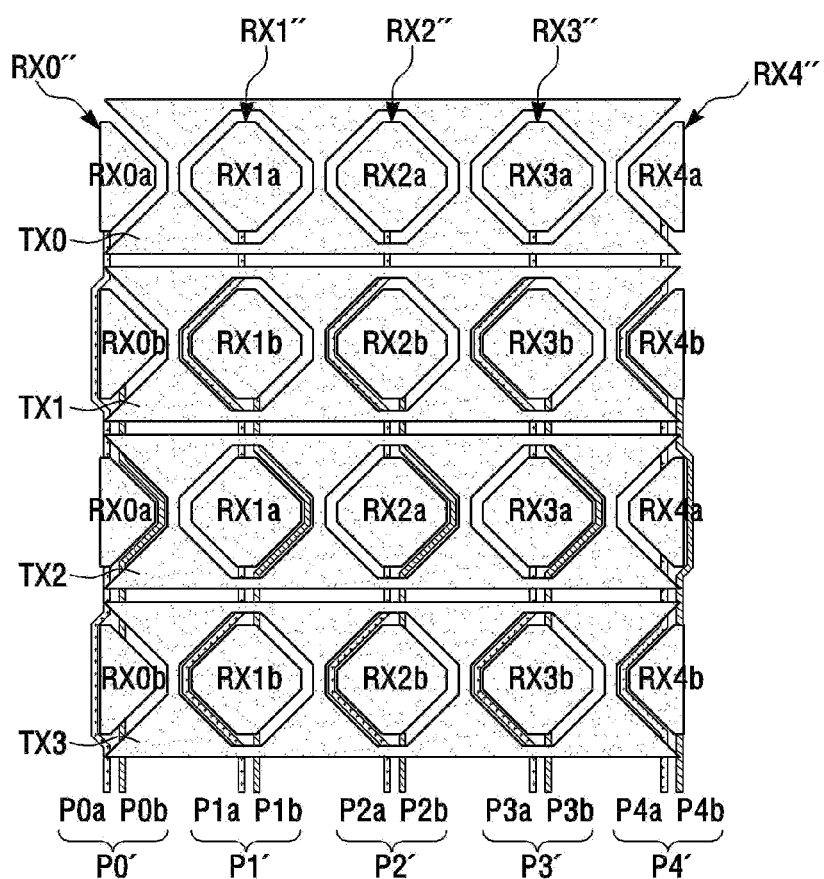
FIG. 9 is a schematic diagram for a plan view of a portion of another embodiment of the touch sensor 10 shown in FIG. 2.
Figure 10:
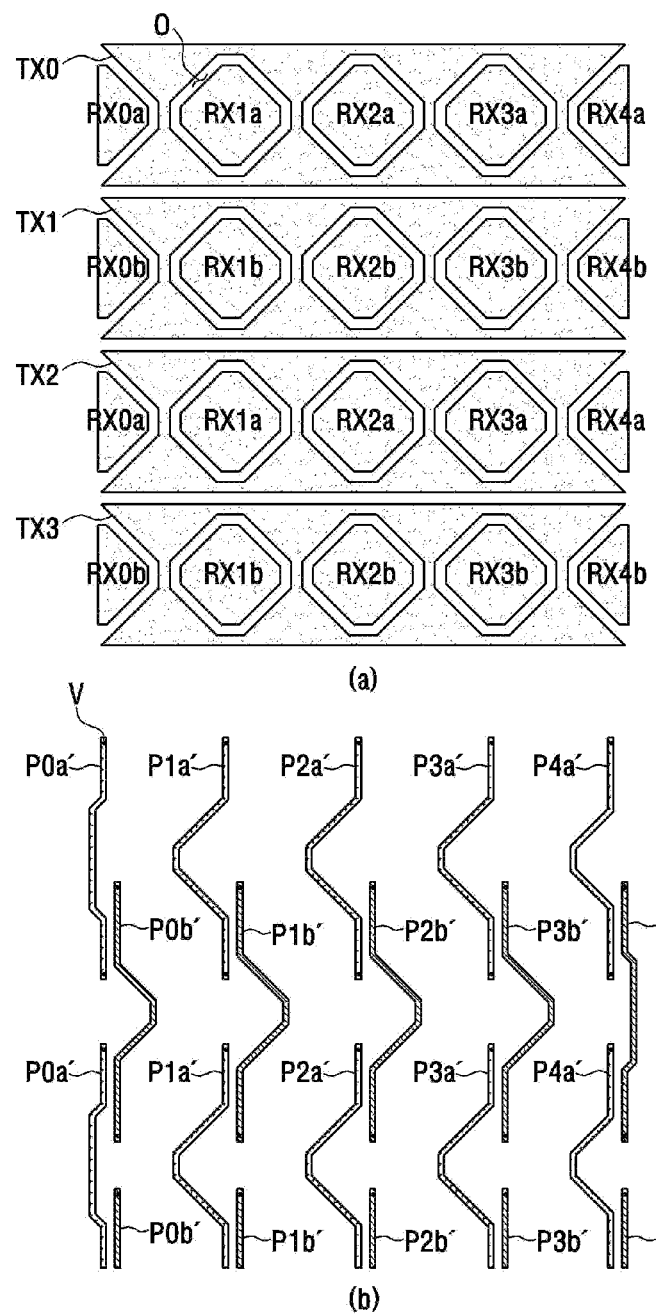
FIG. 10 is a schematic diagram for a plan view showing the touch sensor shown in FIG. 9 separated by layer.

FIG. 9 is a plan view of a portion of another embodiment of the touch sensor 10 shown in FIG. 2. FIG. 10 is a plan view showing the touch sensor shown in FIG. 9 separated by layer.

Compared to the touch sensor according to another embodiment of the present invention shown in FIGS. 3 to 5, according to another embodiment of the present invention shown in FIGS. 9 and 10, the touch sensor has difference in a plurality of receiving electrodes (RX0", RX1", RX2", RX3", RX4"). In particular, the arrangement structure and shape of a plurality of connection patterns (P0', P1', P2', P3, P4') included in each receiving electrode (RX0", RX1", RX2", RX3", RX4") differs. Hereinafter, the arrangement structure and shape of each connection pattern (P0', P1', P2', P3, P4') will be described in detail. The remaining configurations will be replaced with the descriptions described above.

Each connection pattern (P0', P1', P2', P3, P4') includes first connection patterns (P0a', P1a', P2a', P3a', P4a') and second connection patterns (P0b', P1b', P2b', P3b', P4b').

Each of the first connection patterns (P0a', P1a', P2a', P3a', P4a') electrically connects the two receiving electrode patterns (RX0a, RX1a, RX2a, RX3a, RX4a) of the first group, and each of the first connection patterns (P0a', P1a', P2a', P3a', P4a') is disposed so as not to overlap with the second group of receiving electrode patterns (RX0b, RX1b, RX2b, RX3b, RX4b) disposed between the two receiving electrode patterns. For example, at least a portion of each of the first connection patterns (P0a', P1a', P2a', P3a', P4a') cannot be overlapped with the second group of receiving electrode patterns (RX0b, RX1b, RX2b, RX3b, RX4b), and the at least a portion of each of the first connection patterns (P0a', P1a', P2a', P3a', P4a') can be disposed between the second group of receiving electrode patterns (RX0b, RX1b, RX2b, RX3b, RX4b) and driving electrodes (TX0, TX1, TX2, TX3) which are disposed immediately adjacent to the second group of receiving electrode patterns (RX0b, RX1b, RX2b, RX3b, RX4b). Meanwhile, a remaining portion may be disposed to overlap the driving electrodes (TX0, TX1, TX2, TX3).

Each of the second connection patterns (P0b', P1b', P2b', P3b', P4b') electrically connects the two of the second group of receiving electrode patterns (RX0b, RX1b, RX2b, RX3b, RX4b), and each of the second connection patterns (P0b', P1b', P2b', P3b', P4b') is disposed so as not to overlap with the first group of receiving electrode patterns (RX0a, RX1a, RX2a, RX3a, RX4a) disposed between the two receiving electrode patterns. For example, at least a portion of each second connection pattern (P0b', P1b', P2b', P3b', P4b') cannot be overlapped with the first group of receiving electrode patterns (RX0a, RX1a, RX2a, RX3a, RX4a) and the at least a portion of each second connection pattern (P0b', P1b', P2b', P3b', P4b') is disposed between the first group of receiving electrode patterns (RX0a, RX1a, RX2a, RX3a, RX4a) and the driving electrodes (TX0, TX1, TX2, TX3) disposed immediately adjacent to the first group of receiving electrode patterns (RX0a, RX1a, RX2a, RX3a, RX4a). Meanwhile, the remaining portion may be disposed to overlap the driving electrodes (TX0, TX1, TX2, TX3).

According to another embodiment of the present invention, the touch sensor is compared with the touch sensor according to an embodiment of the present invention shown in FIGS. 3 to 5, there is advantage in that a capacitance value between the first connection pattern and the second group of receiving electrode patterns or a capacitance value of between the second connection pattern and the first group of receiving electrode patterns may be reduced.

Meanwhile, although not shown in separate drawings, the dummy pattern DX1a shown in FIGS. 7 and 8 may also be applied to a touch sensor according to another embodiment of the present invention.

Figure 11:
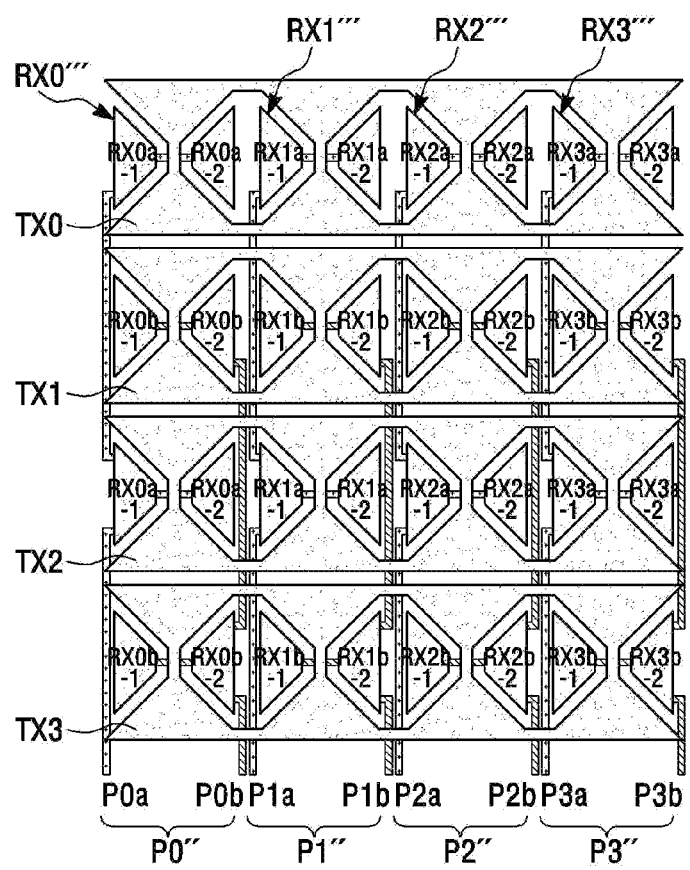
FIG. 11 is a schematic diagram for a plan view of a portion of another embodiment of the touch sensor 10 shown in FIG. 2.
Figure 12:
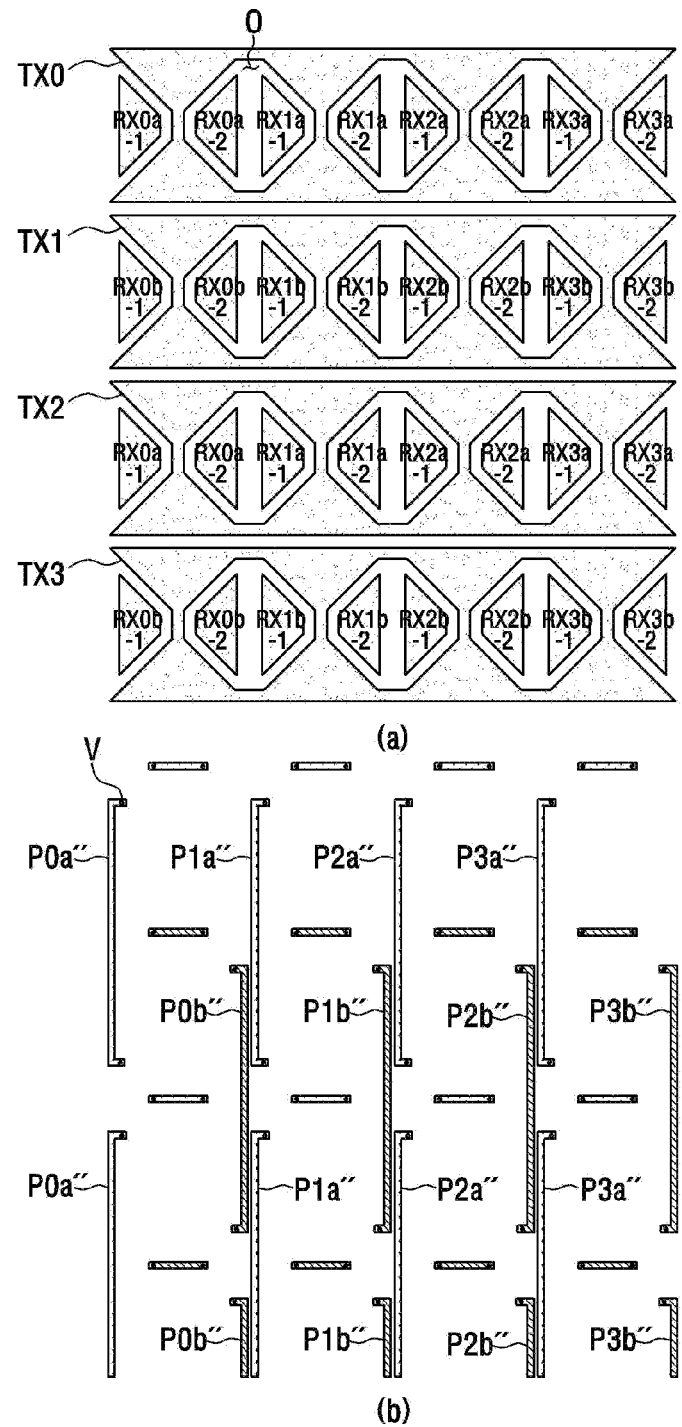
FIG. 12 is a schematic diagram for a plan view of the touch sensor shown in FIG. 11 separated by layer.

FIG. 11 is a plan view of a portion of another embodiment of the touch sensor 10 shown in FIG. 2. FIG. 12 is a plan view of the touch sensor shown in FIG. 11 separated by layer.

The touch sensor according to another embodiment of the present invention shown in FIGS. 11 and 12, compared to the touch sensor according to another embodiment of the present invention shown in FIGS. 3 to 5, there are differences in a plurality of receiving electrodes (RX0''', RX1''', RX2''', RX3'''). In particular, a plurality of receiving electrode patterns (RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, RX3b-2) included in each receiving electrode (RX0''', RX1''', RX2''', RX3''') and the structure and arrangement of the plurality of connection patterns (P0'', P1'', P2'', P3'') differ in the structure and arrangement shape. Hereinafter, the structure and arrangement of the receiving electrode patterns (RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, RX3b-2) and connection patterns (P0'', P1'', P2'', P3'') are described in detail, and the remaining configurations will be replaced with the details described above.

A plurality of receiving electrode patterns (RX0a-1, RX0a-2, RX0b-1, RX0b-2, RX1a-1, RX1a-2, RX1b-1, RX1b-2, RX2a-1, RX2a-2, RX2b-1, RX2b-2, RX3a-1, RX3a-2, RX3b-1, RX3b-2) of each receiving electrode (RX0''', RX1''', RX2''', RX3''') includes the first group of receiving electrode patterns (RX0a-1, RX0a-2, RX1a-1, RX1a-2, RX2a-1, RX2a-2, RX3a-1, RX3a-2), and the second group of receiving electrode patterns (RX0b-1, RX0b-2, RX1b-1, RX1b-2, RX2b-1, RX2b-2, RX3b-1, RX3b-2) alternately arranged one by one along the second direction. The first group of receiving electrode patterns (RX0a-1, RX0a-2, RX1a-1, RX1a-2, RX2a-1, RX2a-2, RX3a-1, RX3a-2) and the second group of receiving electrode patterns (RX0b-1, RX0b-2, RX1b-1, RX1b-2, RX2b-1, RX2b-2, RX3b-1, RX3b-2) can be electrically isolated from each other.

Each of the first group of receiving electrode patterns (RX0a-1, RX0a-2, RX1a-1, RX1a-2, RX2a-1, RX2a-2, RX3a-1, RX3a-2) has a first receiving electrode pattern (RX0a-1, RX1a-1, RX2a-1, RX3a-1) and a second receiving electrode pattern (RX0a-2, RX1a-2, RX2a-2, RX3a-2). The first receiving electrode patterns (RX0a-1, RX1a-1, RX2a-1, RX3a-1) and the second receiving electrode patterns (RX0a-2, RX1a-2, RX2a-2, RX3a-2) are disposed within each two adjacent openings O in the first direction along the corresponding driving electrodes TX0 and TX2.

One first or second receiving electrode pattern is disposed in the openings located at both edges of the plurality of openings O of each driving electrode (TX0, TX1, TX2, TX3), and a second receiving electrode pattern of the first group of receiving electrode pattern of any one of the plurality of receiving electrodes (RX0''', RX1''', RX2''', RX3''') and the first receiving electrode pattern of the first group of receiving electrodes of the other receiving electrode among the plurality of receiving electrodes RX0''', RX1''', RX2''', RX3''' are disposed in the remaining openings together but spaced apart from each other.

Each connection pattern (P0'', P1'', P2'', P3'') includes a first connection pattern (P0a'', P1a'', P2a'', P3a'') for electrically connecting the first group of receiving electrode patterns (RX0a-1, RX0a-2, RX1a-1, RX1a-2, RX2a-1, RX2a-2, RX3a-1, RX3a-2) and second connection pattern (P0b'', P1b'', P2b'', P3b'') for electrically connecting the second group of receiving electrode patterns (RX0b-1, RX0b-2, RX1b-1, RX1b-2, RX2b-1, RX2b-2, RX3b-1, RX3b-2).

Each of the first connection patterns (P0a'', P1a'', P2a'', P3a'') and the second connection patterns (P0b'', P1b'', P2b'', P3b'') is configured to connect two receiving electrode patterns adjacent to each other in the shortest distance. For example, each of the first connection patterns (P0a'', P1a'', P2a'', P3a'') and the second connection patterns (P0b'', P1b'', P2b'', P3b'') have one end which may be connected to one side of the lower part of one of the two adjacent receiving electrode patterns one of any one group and the other end may be connected to one side of one upper part of the other of the two adjacent receiving electrode patterns. Except for the one end and the other end, a remaining portion has a shape extending along the second direction. The remaining portion does not overlap with the other group of receiving electrode patterns disposed between the one receiving electrode pattern and the other receiving electrode pattern, and the remaining portion is disposed so that the largest cross-sectional area overlaps the opening (O) of the driving electrode.

In addition, each of the first connection patterns (P0a'', P1a'', P2a'', P3a'') further includes the first receiving electrode pattern of the first group of receiving electrode patterns and for electrically connecting the second receiving electrode pattern. Each of the second connection patterns (P0b'', P1b'', P2b'', P3b'') further includes a first receiving electrode pattern of second group of receiving electrode patterns and a receiving connection pattern for electrically connecting the second receiving electrode pattern.

A touch sensor according to another embodiment of the present invention has advantages compared to the touch sensor according to an embodiment of the present invention shown in FIGS. 3 to 5, the capacitance value can be reduced and between the first connection pattern and the second group of receiving electrode patterns or between the second connection pattern and the first group of receiving electrode patterns and the resistance value of each connection pattern also can be reduced.

FIG. 13 is a schematic diagram of a touch input device according to another embodiment of the present invention.

The touch input device shown in FIG. 13 has the following differences compared to the touch input device shown in FIG. 2. Specifically, the touch sensor 10' of the touch input device shown in FIG. 13 includes a predetermined shape of electrodes, and the predetermined electrodes include a plurality of first electrodes and a plurality of second electrodes. In the touch sensor 10 shown in FIG. 2, a plurality of first electrodes become a plurality of driving electrodes (Tx0, Tx1, Tx2, ...) and a plurality of second electrodes become a plurality of receiving electrodes (Rx0, Rx1, Rx2, ...). However, in the touch sensor 10' shown in FIG. 13, the plurality of first electrodes become a plurality of receiving electrodes (Rx0, Rx1, Rx2, ...), and the plurality of second electrodes become a plurality of driving electrodes (Tx0, Tx1, Tx2, ...).

In other words, the touch sensor 10' shown in FIG. 13 compared to the touch sensor 10 shown in FIG. 2, a plurality of driving electrodes (Tx0, Tx1, Tx2, ...) are changed to a plurality of receiving electrodes (Rx0, Rx1, Rx2, ...), and a plurality of receiving electrodes (Rx0, Rx1, Rx2, ...) are changed to a plurality of driving electrodes (Tx0, Tx1, Tx2, ...).

It can be determined according to control of the control unit 13 whether the plurality of first electrodes can be a plurality of driving electrodes as shown in FIG. 2 or a plurality of receiving electrodes as shown in FIG. 13. In detail, when the control unit 13 applies a driving signal to the plurality of first electrodes, a plurality of first electrodes can become a plurality of driving electrodes, On the other hand, when a driving signal is applied to a plurality of second electrodes, the plurality of second electrodes can become the plurality of receiving electrodes.

A plurality of driving electrodes (Tx0, Tx1, Tx2, ...) and a plurality of receiving electrodes (Rx0, Rx1, Rx2, ...) may be disposed to intersect each other. Each of the driving electrodes (Tx0, Tx1, Tx2, ...) extends in the second axis direction, and each of the receiving electrodes (Rx0, Rx1, Rx2, ...) extends in the first axis direction different from the first axis direction. Here, the first axis direction may be perpendicular to the second axis direction. Some of the driving electrodes (Tx0a, Tx1a, Tx2a, Tx3a, ...) among the plurality of driving electrodes (Tx0, Tx1, Tx2, ...) can be disposed so that a mutual capacitance (Cm) can be formed with some of the receiving electrodes (Rx0, Rx2, Rx4, Rx6, ...) among the plurality of receiving electrodes (Rx0, Rx1, Rx2, ...). The remaining driving electrodes (Tx0b, Tx1b, Tx2b, Tx3b, ...) among the plurality of driving electrodes (Tx0, Tx1, Tx2, ...) can be disposed so that a mutual capacitance (Cm) can be formed with the remaining receiving electrodes (Rx1, Rx3, Rx5, Rx7, ...) among the plurality of receiving electrodes (Rx0, Rx1, Rx2, ...).

Some of the driving electrodes (Tx0a, Tx1a, Tx2a, Tx3a, ...) among the plurality of driving electrodes (Tx0, Tx1, Tx2, ...) may be disposed immediately adjacent to some of the receiving electrodes (Rx0, Rx2, Rx4, Rx6, ...) among the plurality of receiving electrodes (Rx0, Rx1, Rx2, ...). The some of the driving electrodes (Tx0a, Tx1a, Tx2a, Tx3a, ...) among the plurality of driving electrodes (Tx0, Tx1, Tx2, ...) may be disposed to be spaced a distance apart by an interval from the remaining receiving electrodes (Rx1, Rx3, Rx5, Rx7, ...) rather than immediately adjacent to each other.

Here, at least one other electrode may be disposed between some of the driving electrodes (Tx0a, Tx1a, Tx2a, Tx3a, ...) and the remaining receiving electrodes (Rx1, Rx3, Rx5, Rx7, ...). The at least one other electrode may be some of the receiving electrodes (Rx0, Rx2, Rx4, Rx6, ...).

Remaining driving electrodes (Tx0b, Tx1b, Tx2b, Tx3b, ...) among the plurality of driving electrodes (Tx0, Tx1, Tx2, ...) may be disposed immediately adjacent to the remaining receiving electrodes (Rx1, Rx3, Rx5, Rx7, ...) of the plurality of receiving electrodes (Rx0, Rx1, Rx2, ...). The remaining driving electrodes (Tx0b, Tx1b, Tx2b, Tx3b, ...) among the plurality of driving electrodes (Tx0, Tx1, Tx2, ...) may be disposed to be spaced a distance apart by an interval from some of the receiving electrodes (Rx0, Rx2, Rx4, Rx6, ...) rather than directly adjacent to them.

Here, at least one other electrode may be disposed between the remaining driving electrodes (Tx0b, Tx1b, Tx2b, Tx3b, ...) and some of the receiving electrodes (Rx0, Rx2, Rx4, Rx6, ...). The at least one other electrode may be the remaining receiving electrodes (Rx1, Rx3, Rx5, Rx7, ...).

A driving signal applied to the remaining driving electrodes (Tx0b, Tx1b, Tx2b, Tx3b, ...) may be an inverted driving signal in which only the phase is reversed by 180 degrees in the driving signal applied to some of the driving electrodes (Tx0a, Tx1a, Tx2a, Tx3a, ...). For example, in case of the two driving electrodes (Tx0a, Tx0b) of the 0th driving electrodes (Tx0), the driving signal applied to Tx0b is an inverted driving signal obtained by inverting the driving signal applied to Tx0a.

The touch input device shown in FIG. 13 is capable of multi-driving in which all driving electrodes (Tx0, Tx1, Tx2, Tx3, ...) of the touch sensor 10' apply driving signals simultaneously. Therefore, even with such multi-driving, the touch input device shown in FIG. 13 has an advantage which flicker problems do not occur on the display panel. In addition, since multi-driving of all driving electrodes (Tx0, Tx1, Tx2, Tx3, ...) it is possible that the driving time for performing mutual sensing can be reduced. Furthermore, the turn-on time of the analog front end (AFE) can be reduced, thereby further reducing power consumption.

Prior to explaining below how the effects of the touch input device shown in FIG. 13 occur, it will be described with reference to FIG. 14 that problems which may occur when multi-operation is performed on the touch input device shown in FIG. 2, The element a of FIG. 14 is a graph showing multi-driving for each of the four driving electrodes in the touch input device shown in FIG. 2, and element b of FIG. 14 is a graph showing multi-driving in the element a of FIG. 14. This is an example of a driving signal (or driving code) applied to four driving electrodes (Tx0, Tx1, Tx2, Tx3) which are driven simultaneously.

As shown in the element a of FIG. 14, when the drive signals shown in the element b of FIG. 14 are applied simultaneously with the four driving electrodes (Tx0, Tx1, Tx2, Tx3) among the twenty driving electrodes (Tx0 to Tx19) during an arbitrary time period (0 to T1), the drive sum of the drive signals is '2'. At this time, if the driving voltage applied to each driving electrode, for example, if it is 10[V], the total driving voltage of 20[V], corresponding to 2*10[V] may affect the display panel causing a flicker may occur on the display screen. Furthermore, as the number of simultaneously driven electrodes, becomes greater than four, the total drive sum of the driving signals increases. Therefore, the overall driving voltage becomes larger, eventually, flickering on the display screen may become severe.

On the other hand, in the touch input device shown in FIG. 13, even if the control unit 13 can control simultaneously to apply a driving signal to four or more of the plurality of driving electrodes (Tx0, Tx1, Tx2, ...) or to all driving electrodes, it is an advantage that the flicker problem in the display panel described above does not occur. This will be described in detail with reference to FIG. 15.

The element a of FIG. 15 shows a graph for showing that all driving electrodes are multi-driven in the touch input device shown in FIG. 13. This is an example showing that the element b of FIG. 15 shows the driving signal (or driving code) applied to all driving electrodes (Tx0, Tx1, Tx2, Tx3, ...) which are driven simultaneously during the multi-driving in element a of FIG. 15.

As shown in the element a of FIG. 15, when the driving signals shown in the element b of FIG. 15 are simultaneously applied to all driving electrodes (Tx0, Tx1, Tx2, ...) of the touch sensor 10' during a certain time period (0 to T1), the overall sum of the drive signals is always '0'. It is because the size of a driving signal applied simultaneously to some of the driving electrodes (Tx0a, Tx1a, Tx2a, Tx3a, ...) and the driving signal applied simultaneously to the remaining driving electrodes (Tx0b, Tx1b, Tx2b, Tx3b, ...) are the same, but only the phase of a signal is reversed by 180 degrees.

In this way, because the total drive sum of the driving signals becomes 0, there is no effect on the display panel. Therefore, it is an advantage that flicker does not occur on the display screen when the display panel is driven. In addition, as shown in the element a of FIG. 15, the touch input device shown in FIG. 13 having that the control unit 13 controls so that all or four or more of the plurality of driving electrodes (Tx0, Tx1, Tx2, ...) can be driven simultaneously, therefore the touch input device shown in FIG. 13, can reduce a mutual driving time to ⅕ compared to the graph in the element a of FIG. 14. Furthermore, the touch input device shown in FIG. 13 can reduce the turn-on time of the analog front end (AFE), thereby reducing the power consumption of the touch input device.

Additionally, in the touch input device shown in FIG. 13, the control unit 13 may detect the position of the object using received signals output from a plurality of receiving electrodes (Rx0, Rx1, Rx2, ...). The location of an object can be detected using differential signals obtained by differential sensing the received signals. Here, the control unit 13 can restore the received signals output from the plurality of receiving electrodes (Rx0, Rx1, Rx2, . . . ) by integrating and encoding the differential signals. This will be described in detail later with reference to FIG. 16.

FIG. 16 is a schematic diagram for explaining that a process by the control unit 13 of the touch input device shown in FIG. 13 processes signals received from the touch sensor 10'.

In FIG. 16, it is assumed that the change in mutual capacitance (Delta cm/diff) between the 0th driving electrode (Tx0) and a plurality of receiving electrodes (Rx0, Rx1, Rx2, Rx3, Rx5, Rx6, Rx7) is expressed as 'Delta cm example', and In FIG. 16, it is assumed that a certain amount of change in mutual capacitance corresponding to d1, d2, d3, and d4 occurs in each of the second to fifth receiving electrodes (Rx2, Rx3, Rx4, Rx5).

The control unit 13 shown in FIG. 13 controls a certain driving signal to apply the 0th driving electrode (Tx0). Here, the driving signal applied to the 0ath driving electrode (Tx0a) and the driving signal applied to the 0bth driving electrode (Tx0b) are inverted driving signals which are only 180 degrees out of phase with each other.

Then, the control unit 13 receives received signals from the plurality of receiving electrodes (Rx0, Rx1, Rx2, Rx3, Rx5, Rx6, Rx7) (difference example in case of single-ended reception). Specifically, the control unit 13 receives a signal having a mutual capacitance change value of 'd1' from the second receiving electrode (Rx2), and the control unit 13 may receive a signal having a mutual capacitance change value of 'd3' from the fourth receiving electrode Rx4. On the other hand, the control unit 13 receives a signal having a mutual capacitance change value of '−d2' from the third receiving electrode (Rx3), and the control unit 13 may receive a signal having a mutual capacitance change value of 'd4' from the fifth receiving electrode Rx5.

Next, the control unit 13 outputs differential signals (diff example upon differential reception) from signals received from the plurality of receiving electrodes (Rx0, Rx1, Rx2, Rx3, Rx5, Rx6, Rx7). Specifically, the control unit 13 outputs a differential signal having a mutual capacitance change value of 'd1' obtained by subtracting the received signal from the first receiving electrode (Rx1) from the received signal of the second receiving electrode (Rx2). Next, the control unit 13 may output a differential signal having a mutual capacitance change value of '−(d2+d1)' by subtracting the received signal from the second receiving electrode (Rx2) from the received signal of the third receiving electrode (Rx3). In addition, the control unit 13 outputs a signal having a mutual capacitance change value of '(d3+d2)' is output by subtracting the received signal from the third receiving electrode (Rx3) from the received signal from the fourth receiving electrode (Rx4). Next, the control unit 13 may output a differential signal having a mutual capacitance change value of '−(d4+d3)' by subtracting the received signal from the fourth receiving electrode (Rx4) from the received signal from the fifth receiving electrode (Rx5).

Next, the control unit 13 can restore the received signals from the plurality of receiving electrodes (Rx0, Rx1, Rx2, Rx3, Rx5, Rx6, Rx7) by integrating and encoding the differential signals. Specifically, the control unit 13 can obtain mutual capacitance change values which are the same as 'diff example upon single-ended reception' by integrating the differential signals. In addition, the control unit 13 performs sign processing to change the negative (−) sign of some of the restored received signals to a positive (+) sign. Next, the control unit 13 may obtain mutual capacitance change values which are the same as the 'Delta cm example' value. Here, the control unit 13 may further include an integrator for integrating the received differential signals and a code processor for code processing.

During the signal processing of the above-described control unit 13, in the process of outputting the above-described differential signals, it may be removed that display noise (e.g., Zebra noise), variation due to image change, LGM noise in the floating state, and cathode retransmission noise, etc.

FIG. 17 is a schematic diagram for explaining baseline settings in the control unit 13 of the touch input device shown in FIG. 13.

In FIG. 17, it is defined as 'cm' that the mutual capacitance value between the 0th driving electrode (Tx0) and the plurality of receiving electrodes (Rx0, Rx1, Rx2, Rx3, Rx5, Rx6, Rx7).

The control unit 13 shown in FIG. 13 controls a certain driving signal to apply to the 0th driving electrode (Tx0). Here, a driving signal applied to the 0th driving electrode (Tx0a) and a driving signal applied to the 0bth driving electrode (Tx0b) are an inverted driving signal which is 180 degrees out of phase with each other.

When the control unit 13 shown in FIG. 13 receives receiving signals from a plurality of receiving electrodes (Rx0, Rx1, Rx2, Rx3, Rx5, Rx6, Rx7), the baseline in single-ended reception is all constant in cm. Here, it is a negative (−) value that the 0b driving electrode (Tx0b) is formed mutual capacitance with the sign of the baseline signals received from the first receiving electrode (Rx1), the third receiving electrode (Rx3), the fifth receiving electrode (Rx5), and the seventh receiving electrode (Rx7).

Meanwhile, when the control unit 13 shown in FIG. 13 outputs differential signals from the received signals from the plurality of receiving electrodes (Rx0, Rx1, Rx2, Rx3, Rx5, Rx6, Rx7), the baseline (Baseline in case of differential reception) is increased by two times compared to the case of 'baseline upon single-ended reception'. Accordingly, the control unit 13 may further include a baseline adjustment unit for lowering the baseline by ½ times the baseline of 'baseline upon single-ended reception'.

FIG. 18 is a partial plan view of an embodiment of the touch sensor 10' shown in FIG. 13.

An embodiment of the touch sensor 10' shown in FIG. 18 has the same structure of a plurality of electrodes as an embodiment of the touch sensor 10 shown in FIG. 3. However, it is difference that the driving signal is applied to the receiving signals of the driving electrodes (TX0, TX1, TX2, TX3, TX4) and the received signal output from the receiving electrodes (RX0, RX1, RX2, RX3) are configured in the opposite manner.

Referring to FIG. 18, the control unit 13 shown in FIG. 13 controls connection patterns (P0, P1, P2, P3, P4) of a plurality of driving electrodes (TX0, TX1, TX2, TX3, TX4, . . . ). can be controlled to apply certain driving signals at the same time. Here, the driving signal applied to the second connection pattern (P0b) of each connection pattern (P0) is an inverted drive signal whose phase is reversed by 180 degrees of the driving signal applied to the first connection pattern (P0a).

As explained with reference to FIG. 16, the control unit 13 shown in FIG. 13 receives received signals having information on the amount of change in mutual capacitance from a plurality of receiving electrodes (RX0, RX1, RX2, RX3, . . . ). Next, the control unit 13 can output differential signals from the received signals. Next the control unit 13 can receive, the received signals received from a plurality of receiving electrodes (RX0, RX1, RX2, RX3, . . . ), and the control unit 13 can restore by integrating the differential signals, and the control unit 13 can determine the touch position of the object based on information on the change in mutual capacitance obtained by processing the restored codes of the received signals.

FIG. 19 is a partial plan view of another embodiment of the touch sensor 10' shown in FIG. 13.

Another embodiment of the touch sensor 10' shown in FIG. 19 has the same structure of the plurality of electrodes as an embodiment of the touch sensor 10 shown in FIG. 6. However, it is difference that structure in reverse for the driving electrodes to be applied a driving signal and receiving electrodes to output a received signal.

Referring to FIG. 19, the control unit 13 shown in FIG. 13 controls connection patterns (P0, P1, P2, P3, P4, . . . ) to be controlled to apply certain driving signals at the same time. Here, the drive signal applied to the second connection pattern (P0*b*) of each connection pattern (P0) is a drive signal whose phase is reversed by 180 degrees from the drive signal applied to the first connection pattern (P0*a*).

As explained with reference to FIG. 16, the control unit 13 shown in FIG. 13 receives received signals having information on the amount of change in mutual capacitance from a plurality of receiving electrodes (RX0, RX1, RX2, RX3, . . . ), and the control unit 13 can output differential signals from the received signals. Then, the control unit 13 can restore the received signals received from the plurality of receiving electrodes (RX0, RX1, RX2, RX3, . . . ) by integrating the differential signals, and the control unit 13 can process the signs of the restored received signals. Then, the control unit 13 can determine the touch location of an object based on information on the change in mutual capacitance.

FIG. 20 is a partial plan view of another embodiment of the touch sensor 10' shown in FIG. 13.

Another embodiment of the touch sensor 10' shown in FIG. 20 has the same structure of the plurality of electrodes as another embodiment of the touch sensor 10 shown in FIG. 9. However, it is different a structure in reverse that a driving signal is applied to the driving electrodes and a received signal is output to the receiving electrodes.

Referring to FIG. 20, the control unit 13 shown in FIG. 13 can control using connection patterns (P0', P1', P2', P3', P4', . . . ) of a plurality of driving electrodes (TX0", TX1", TX2", TX3", TX4", . . . ) to be applied certain driving signals at the same time. Here, the drive signal to be applied to the second connection pattern P0*b* of each connection pattern P0' is an inverted drive signal whose phase is reversed by 180 degrees from the drive signal to be applied to the first connection pattern P0*a*.

As explained with reference to FIG. 16, the control unit 13 shown in FIG. 13 receives received signals having information on the amount of change in mutual capacitance from a plurality of receiving electrodes (RX0, RX1, RX2, RX3, . . . ), and the control unit 13 can output differential signals from the received signals. In addition, the control unit 13 can restore the received signals received from the plurality of receiving electrodes (RX0, RX1, RX2, RX3, . . . ) by integrating the differential signals, and the control unit 13 can determine the touch position of the object based on information on the change in mutual capacitance obtained by processing the restored codes of the received signals.

FIG. 21 is a partial plan view of another embodiment of the touch sensor 10' shown in FIG. 13.

Another embodiment of the touch sensor 10' shown in FIG. 21 has the same structure of the plurality of electrodes as another embodiment of the touch sensor 10 shown in FIG. 11, However, it is different a structure in reverse that a driving signal is applied to the driving electrodes and a received signal is output to the receiving electrodes.

Referring to FIG. 21, the control unit 13 shown in FIG. 13 can control using connection patterns (P0', P1', P2', P3', P4', . . . ) of a plurality of driving electrodes (TX0", TX1", TX2", TX3", TX4", . . . ) to be controlled to apply certain driving signals at the same time. Here, the drive signal to be applied to the second connection pattern P0*b* of each connection pattern P0" is an inverted drive signal whose phase is reversed by 180 degrees from the drive signal to be applied to the first connection pattern P0*a*.

As explained by FIG. 16, the control unit 13 shown in FIG. 13 receives received signals having information on the amount of change in mutual capacitance from a plurality of receiving electrodes (RX0, RX1, RX2, RX3, . . . ) and the control unit 13 can output differential signals from the received signals. In addition, the control unit 13 can restore the received signals received from the plurality of receiving electrodes (RX0, RX1, RX2, RX3, . . . ) by integrating the differential signals, and the control unit 13 can determine the touch position of the object based on information on the change in mutual capacitance obtained by processing the restored codes of the received signals.

FIG. 22 is a schematic block diagram of a touch input device according to another embodiment of the present invention.

Another embodiment of the present invention includes a touch sensor 100 and a control unit 300.

The control unit 300 controls the touch sensor 100.

The control unit 300 applies a driving signal (or Tx signal) to the driving electrode (or Tx electrode) of the touch sensor 100. The control unit 300 can receive a sensing signal (or Rx signal) from the receiving electrode (or Rx electrode) of the touch sensor 100).

The control unit 300 may sequentially supply driving signals to a plurality of driving electrodes of the touch sensor 100 or the control unit 300 may simultaneously supply predetermined driving signals to at least two driving electrodes among the plurality of driving electrodes. The former is called a sequential driving method, and the latter is also called a multi-driving method.

The control unit 300 receives sensing signals output from a plurality of receiving electrodes of the touch sensor 100. Here, the sensing signal may include information on the amount of change in capacitance between each receiving electrode and the driving electrode adjacent thereto, an LGM noise signal, and a display noise signal.

The control unit 300 may convert the sensing signal output from the plurality of receiving electrodes into analog-to-digital and output a digital sensing signal.

The control unit 300 may output a differential signal of two signals among the sensing signals output from the plurality of receiving electrodes, and the control unit 300 can output by converting the output signal to analog to digital. For this purpose, the control unit 300 may include a comparator and an ADC. This control unit 300 can detect whether a touch is made and/or a touch position based on an output digital signal.

In FIG. 22, the control unit 300 may be implemented as one module, unit, or chip. However, it is not limited to this, and the control unit 300 may be divided. as a sensing unit which receives a sensing signal from the receiving electrode of the touch sensor 100, a driving unit which applies a driving signal to the driving electrode of the touch sensor 100, and a control unit which controls the sensing unit and the driving unit. Alternatively, at least two of the sensing unit, driving unit, and control unit may be implemented as one module, unit, or chip.

Figure 1:
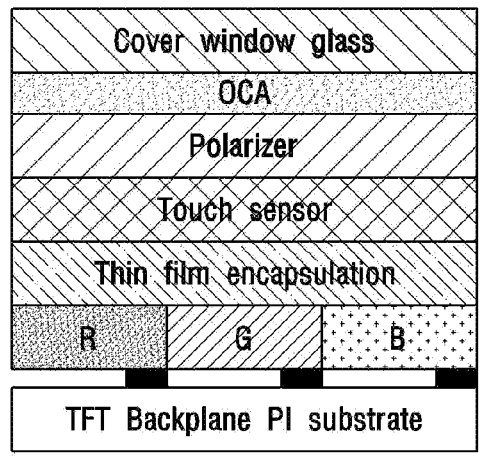
FIG. 1 is a schematic diagram showing a conventional OCTA-type stacked structure.

Although not separately shown, the touch input device shown in FIG. 22 may include a display panel (not shown). Like as the OCTA method shown in FIG. 1, the touch sensor 100 may be disposed on a cell of the display panel. It may also be disposed within a cell of the display panel such as an in-cell method. In some cases, the touch sensor 100 may be disposed below the display panel. For example, the touch sensor 100 may be disposed on the outer surface of the upper substrate and/or lower substrate of the display panel (e.g., the upper surface of the upper substrate or the lower surface of the lower substrate). The touch sensor 100 may be formed directly on the inner surface (e.g., the lower surface of the upper substrate or the upper surface of the lower substrate). The touch sensor 100 may be combined with the display panel to form a touch screen panel (TSP).

A plurality of scan lines (or gate lines) and a plurality of data lines may be disposed on the display panel. A subpixel may be disposed in an area where a scan line and a data line intersect.

The display panel may include an active area, where a plurality of subpixels are disposed, and may include an inactive area where is disposed outside the active area. The active area may configure a display screen of a touch input device. The display screen may have a rectangular shape where the vertical length is longer than the horizontal length.

The touch input device shown in FIG. 22 may include a gate driving circuit for driving various signal lines disposed on the display panel, a data driving circuit, and a display control unit for driving the display panel.

A gate driving circuit is controlled by a display control unit. The gate driving circuit can control the driving timing of multiple subpixels by sequentially outputting display scan signals to multiple scan lines disposed on the display panel.

The data driving circuit may receive an image data from the display control unit and convert the image data into an analog data voltage. The data driving circuit outputs the data voltage (Vdata) to each data line in accordance with the timing when the scan signal is applied by the scan line. The data driving circuit can control each subpixel to express brightness according to image data.

The display control unit supplies various control signals to the gate driving circuit. and the data driving circuit and the display control unit can control the operations of the gate driving circuit and the data driving circuit. The display control unit may be disposed separately from the control unit 300 shown in FIG. 22 or the display control unit may be configured integrally with the control unit 300.

The touch sensor 100 includes a plurality of electrodes (or a plurality of sensors) of a certain shape. certain electrodes include a plurality of first electrodes and a plurality of second electrodes. Here, when a driving signal is applied to a plurality of first electrodes, the plurality of first electrodes may become a plurality of driving electrodes. The plurality of second electrodes may become a plurality of receiving electrodes.

A plurality of driving electrodes (Tx0, Tx1, Tx2, Tx3 . . . Tx16, Tx17, Tx18, Tx19) and a plurality of receiving electrodes (Rx0, Rx1, Rx2, Rx3 . . . Rx35, Rx36, Rx37) may be disposed to intersect each other. It may be formed certain mutual capacitance (cm) which in particular, at their intersection between a plurality of driving electrodes (Tx0, Tx1, Tx2, Tx3 . . . Tx16, Tx17, Tx18, Tx19) and a plurality of receiving electrodes (Rx0, Rx1, Rx2, Rx3 . . . Rx35, Rx36, Rx37).

Each driving electrode (Tx0, Tx1, Tx2, Tx3 . . . Tx16, Tx17, Tx18, Tx19) is disposed in the first axis direction Each receiving electrode (Rx0, Rx1, Rx2, Rx3 . . . Rx35, Rx36, Rx37) may be disposed in a second axis direction different from the first axis direction. Here, the second axis direction may be perpendicular to the first axis direction.

Each driving electrode (Tx0, Tx1, Tx2, Tx3 . . . Tx16, Tx17, Tx18, Tx19) includes a pair of electrode portions. This will be described in detail with reference to FIG. 23.

FIG. 23 is an enlarged view of A portion shown in FIG. 22.

Referring to FIG. 23, each of the plurality of driving electrodes (Tx0, Tx1, Tx2) includes first driving electrode units (Tx0a, Tx1a, Tx2a) and second driving electrode units (Tx0b, Tx1b, Tx2b).

The first driving electrode units (Tx0a, Tx1a, Tx2a) are disposed to form a mutual capacitance (cm) with some of the receiving electrodes (Rx0, Rx2) among the plurality of receiving electrodes (Rx0, Rx1, Rx2, Rx3). The first driving electrode units (Tx0a, Tx1a, Tx2a) may be disposed so that little or no mutual capacitance (cm) to be formed with the remaining receiving electrodes (Rx1, Rx3). Here, it may mean that almost no mutual capacitance (cm) to be formed, which means relatively small mutual capacitance value compared to the mutual capacitance (cm) with some of the receiving electrodes (Rx0, Rx2).

The second driving electrode units (Tx0b, Tx1b, Tx2b) are arranged so that a mutual capacitance (cm) can be formed with the remaining receiving electrodes (Rx1, Rx3) among the plurality of receiving electrodes (Rx0, Rx1, Rx2, Rx3). The second driving electrode units (Tx0b, Tx1b, Tx2b) can be disposed so that little or no mutual capacitance (cm) to be formed with some of the receiving electrodes (Rx0, Rx2). Here, it may mean that almost no mutual capacitance (cm) to be formed may mean a relatively small mutual capacitance value compared to the mutual capacitance (cm) with the remaining receiving electrodes (Rx1, Rx3).

The first driving electrode units (Tx0a, Tx1a, Tx2a) may be disposed to be immediately adjacent to some of the receiving electrodes (Rx0, Rx2) among the plurality of receiving electrodes (Rx0, Rx1, Rx2, Rx3). The first driving electrode units (Tx0a, Tx1a, Tx2a) can be disposed to be spaced a distance apart by an interval from the remaining receiving electrodes (Rx1, Rx3) rather than being directly adjacent to each other.

Here, at least one other electrode may be formed between the first driving electrode units (Tx0a, Tx1a, Tx2a) and the remaining receiving electrodes (Rx1, Rx3). The other electrode may be at least one partial receiving electrode (Rx0, Rx2).

The second driving electrode units (Tx0b, Tx1b, Tx2b) can be disposed immediately adjacent to the remaining receiving electrodes (Rx1, Rx3) among the plurality of receiving electrodes (Rx0, Rx1, Rx2, Rx3). The second driving electrode units (Tx0b, Tx1b, Tx2b) cannot be disposed immediately adjacent to some of the receiving electrodes (Rx0, Rx2). The second driving electrode units (Tx0b, Tx1b, Tx2b) can be disposed to be spaced a distance apart by an interval. Here, at least one other electrode may be disposed between the second driving electrode units (Tx0b, Tx1b, Tx2b) and some of the receiving electrodes (Rx0, Rx2). The at least one other electrode may be at least one remaining receiving electrode (Rx1, Rx3).

In each driving electrode (Tx0, Tx1, Tx2), the second driving signal to be applied to the second driving electrode units (Tx0b, Tx1b, Tx2b) may have only a phase shift by 180 degrees for the first driving signal to be applied to the first driving electrode units (Tx0a, Tx1a, Tx2a). Therefore, when a certain driving signal is applied to each driving electrode (Tx0, Tx1, Tx2), the certain driving signal is applied to the first driving electrode portion (Tx0a, Tx1a, Tx2a) of each driving electrode (Tx0, Tx1, Tx2), and an inverted drive signal, whose phase is reversed by 180 degrees from the predetermined drive signal, may be applied to the second drive electrode units (Tx0b, Tx1b, Tx2b).

When the control unit applies a multi-driving signal 300 to at least two of the plurality of driving electrodes (Tx0, Tx1, Tx2), a signal (or sensing signal) is output from each receiving electrode (Rx0, Rx1, Rx2, Rx3). The output signal may include a difference value for capacitance change (first capacitance information) with any one of the first driving electrodes immediately adjacent to the corresponding receiving electrode. and capacitance change (second capacitance information) with respect to another electrode not to be immediately adjacent to the corresponding receiving electrode among the first driving electrode units and the second driving electrode units).

The control unit 300 may detect whether the object is touched and/or the touch location based on the output signal. Here, the output signal is removed about information on the amount of change in mutual capacitance due to the object, display noise (e.g., zebra noise), amount of change due to image change, LGM noise in floating state, Cathode re-transmission phenomenon (Phenomenon which is the larger the size of the resistance (RELVSS) of the ELVSS layer (i.e., the weaker GND becomes) high-frequency signals are also transmitted to the RX sensor and added to the main signal). Therefore, the output signal may mostly include only information of the amount of change in mutual capacitance caused by the object.

It may be disposed that a plurality of driving electrodes (Tx0, Tx1, Tx2) and a plurality of receiving electrodes (Rx0, Rx1, Rx2, Rx3) are on the same layer (1 layer) together or on each different double layers (2 layers). In addition, some of the plurality of driving electrodes (Tx0, Tx1, Tx2) may be disposed on different layers from the others, and some of the plurality of receiving electrodes (Rx0, Rx1, Rx2, Rx3) may be disposed on different layers from the others. The plurality of driving electrodes (Tx0, Tx1, Tx2) and the plurality of receiving electrodes (Rx0, Rx1, Rx2, Rx3) may have a diamond pattern, circular shape, oval shape, or polygonal shape.

It may be that a plurality of driving electrodes (Tx0, Tx1, Tx2) and a plurality of receiving electrodes (Rx0, Rx1, Rx2, Rx3) are composed of metal mesh and patterned on the thin film encapsulation (TFE) layer of the display panel.

The touch sensor 100 shown in FIGS. 22 and 23 can prevent flicker from occurring when the display panel is driven. The flicker may become more noticeable as the voltage of the driving signal simultaneously applied to the driving electrode of the touch sensor 100 increases. In particular, according to a multi-driving method in which driving signals are applied simultaneously to several driving electrodes, the occurrence of the flicker may become more noticeable as the total sum of the driving signals applied simultaneously during a certain period of time increases.

However, the touch sensor 100 shown in FIGS. 22 and 23 has a pair of first and second driving electrode units for each driving electrode. A first driving signal applied to the first driving electrode unit and a second driving signal applied to the second driving electrode unit are 180 degrees in phase with each other. Therefore, since the sum of driving signals applied simultaneously during a certain period of time is always 0 (zero), there is an advantage that the occurrence of flicker is reduced or almost no flicker occurs.

FIG. 24 is a schematic block diagram of a touch input device according to another embodiment of the present invention.

The touch input device according to another embodiment of the present invention shown in FIG. 24 is different from the touch input device shown in FIG. 22 in the touch sensor 100'. A touch input device including the touch sensor 100' and the control unit 300, can detect the position of an object such as a finger located on the screen. The touch input device can also output a drive signal to drive the stylus pen, and the touch input device can detect the position of the stylus pen on the by detecting a signal emitted from the stylus pen.

The touch sensor 100' includes a plurality of touch driving electrodes (FTx0, FTx1, . . . , FTx8, FTx9), a plurality of pen driving electrodes (STx0, STx1, . . . , STx8, STx9), a plurality of touch receiving electrodes (FRx0, FRx1, . . . , FRx4, FRx5), and multiple pen receiving electrodes (SRx0, SRx1, . . . , SRx4, SRx5). Here, the plurality of touch driving electrodes (FTx0, FTx1, . . . , FTx8, FTx9) correspond to the plurality of driving electrodes (Tx1, Tx2, . . . , Tx38, Tx39) of FIG. 22, and the plurality of touch receiving electrodes (FRx0, FRx1, . . . , FRx4, FRx5) correspond to a plurality of receiving electrodes (Rx0, Rx1, Rx2, Rx3 . . . Rx35, Rx36, Rx37).

Each touch drive electrode (FTx0, FTx1, . . . , FTx8, FTx9) is an electrode to which a touch drive signal is applied, in order to sense objects such as fingers or conductive members.

Each pen driving electrode (STx0, STx1, . . . , STx8, STx9) is disposed adjacent to the touch driving electrodes (FTx0, FTx1, . . . , FTx8, FTx9), and is disposed to the touch driving electrodes (FTx0, FTx1, . . . , FTx8, FTx9) by an interval. Each pen driving electrode (STx0, STx1, . . . , STx8, STx9) may be disposed in the same direction as the scan line of the display panel (not shown). Each pen driving electrode (STx0, STx1, . . . , STx8, STx9) may receive a pen driving signal for driving the stylus pen or may receive or sense a pen signal from the stylus pen. The pen driving electrodes (STx0, STx1, . . . , STx8, STx9) may also be called first pen driving/receiving electrodes.

Each end of the plurality of pen driving electrodes (STx0, STx1, . . . , STx8, STx9) is electrically connected to each other by a conductive pattern. Here, the conductive pattern may be metal mesh or silver trace.

Each touch receiving electrode (FRx0, FRx1, . . . , FRx4, FRx5) is disposed in a direction different from the direction in which each touch driving electrode (FTx0, FTx1, . . . , FTx8, FTx9) is disposed. Each touch receiving electrode (FRx0, FRx1, . . . , FRx4, FRx5) is an electrode which outputs a touch sensing signal to sense an object such as a finger or a conductive member.

Each pen receiving electrode (SRx0, SRx1, . . . , SRx4, SRx5) is disposed adjacent to the touch receiving electrode (FRx0, FRx1, . . . , FRx4, FRx5), and is disposed at a distance by an interval from the touch receiving electrodes (FRx0, FRx1, . . . , FRx4, FRx5). Each pen receiving electrode (SRx0, SRx1, . . . , SRx4, SRx5) may be disposed in a different direction from the pen driving electrodes (STx0, STx1, . . . , STx8, STx9). Each pen receiving electrode (SRx0, SRx1, . . . , SRx4, SRx5) may receive a pen driving signal for driving the stylus pen or may detect a pen signal from the stylus pen. The pen receiving electrodes (SRx0, SRx1, . . . , SRx4, SRx5) may also be called second pen driving/receiving electrodes.

Each end of the plurality of pen receiving electrodes (SRx0, SRx1, . . . , SRx4, SRx5) is electrically connected to each other by a conductive pattern. Here, the conductive pattern may be metal mesh or silver trace.

A plurality of touch receiving electrodes (FRx0, FRx1, . . . , FRx4, FRx5) and a plurality of pen receiving electrodes (SRx0, SRx1, . . . , SRx4, SRx5) are disposed on a plurality of touch driving electrodes (FTx0, FTx1, . . . , FTx8, FTx9) and a plurality of pen driving electrodes (STx0, STx1, . . . , STx8, STx9), may be disposed by an interval, on a plurality of touch driving electrodes (FTx0, FTx1, . . . , FTx8, FTx9). In addition, a plurality of touch receiving electrodes (FRx0, FRx1, . . . , FRx4, FRx5) and a plurality of pen receiving electrodes (SRx0, SRx1, . . . , SRx4, SRx5) may be spaced a distance apart in an interval with a plurality of touch driving electrodes (FTx0, FTx1, . . . , FTx8, FTx9) and a plurality of pen driving electrodes (STx0, STx1, . . . , STx8, STx9).

The number of touch driving electrodes (FTx0, FTx1, . . . , FTx8, FTx9) and the number of touch receiving electrodes (FRx0, FRx1, . . . , FRx4, FRx5) may be increased or decreased depending on the size of the screen of the touch input device or the relative length of the long axis and short axis.

A plurality of touch driving electrodes (FTx0, FTx1, . . . , FTx8, FTx9) and a plurality of touch receiving electrodes (FRx0, FRx1, . . . , FRx4, FRx5) can sense the touch of objects such as fingers and conductive members basically. To this end, a plurality of touch driving electrodes (FTx0, FTx1, . . . , FTx8, FTx9) operate as touch driving electrodes to which a touch driving signal is applied, and the plurality of touch receiving electrodes (FRx0, FRx1, . . . , FRx4, FRx5) operate as touch sensing electrodes (or touch receiving electrodes) which receive a touch sensing signal. It also can work an opposite method.

Each of the plurality of touch driving electrodes (FTx0, FTx1, . . . , FTx8, FTx9) includes a pair of first driving electrode units (FTx0a, FTx1a, . . . , FTx9a) and a pair of second driving electrode units (FTx0b, FTx1b, . . . , FTx9b).

The first driving electrode units (FTx0a, FTx1a, . . . , FTx9a) and the second driving electrode units (FTx0b, FTx1b, . . . , FTx9b) may be alternately disposed one by one in one direction.

The first driving electrode units (FTx0a, FTx1a, . . . , FTx9a) may form a mutual capacitance and may dispose immediately adjacent each other with some of the receiving electrodes (FRx0, FRx2, FRx4) among the plurality of receiving driving electrodes (FRx0, FRx1, . . . , FRx4, FRx5). The first driving electrode units (FTx0a, FTx1a, . . . , FTx9a) may form almost no mutual capacitance with remaining receiving electrodes (FRx1, FRx3, FRx5) which are not disposed immediately adjacent to each other.

The second driving electrode units (FTx0b, FTx1b, . . . , FTx9b) may form a mutual capacitance and may dispose immediately adjacent each other with some of the receiving electrodes (FRx0, FRx2, FRx4) among the plurality of receiving driving electrodes (FRx0, FRx1, . . . , FRx4, FRx5). The second driving electrode units (FTx0b, FTx1b, . . . , FTx9b) may form almost no mutual capacitance with remaining receiving electrodes (FRx1, FRx3, FRx5) which are not disposed immediately adjacent to each other.

A first driving signal and a second driving signal may be applied simultaneously or sequentially to a pair of first and second driving electrode units of each touch driving electrode respectively. Here, the first driving signal and the second driving signal may be pulsing signals or sine signals whose phases are shifted by 180 degrees.

In the touch sensor 100' of the touch input device shown in FIG. 24, each of the plurality of touch driving electrodes includes a pair of first and second driving electrode units, and the control unit 300 controls the first and second driving electrodes. Since the first and second driving signals, which are 180 degrees out of phase, are controlled to be applied at the same time, there is an advantage in that the occurrence of flicker in the display panel can be significantly reduced or prevented, as described above in FIGS. 22 and 23.

Meanwhile, the touch sensor 100' of the touch input device shown in FIG. 24 is used to drive and sense the stylus pen. Therefore, a plurality of touch driving electrodes (FTx0, FTx1, . . . , FTx8, FTx9), a plurality of pen driving electrodes (STx0, STx1, . . . , STx8, STx9), a plurality of touch receiving electrodes (FRx0, FRx1, . . . , FRx4, FRx5), and a plurality of pen receiving electrodes (SRx0, SRx1, . . . , SRx4, SRx5) can be used in various combinations. Various combinations are shown in Table 1 below.

In Table 1 below, it refers that '1' represents a plurality of touch driving electrodes (FTx0, FTx1, . . . , FTx8, FTx9), and '2' represents a plurality of pen driving electrodes (STx0, STx1, . . . , STx8, STx9), '3' represents a plurality of touch receiving electrodes (FRx0, FRx1, . . . , FRx4, FRx5), and '4' represents a plurality of pen receiving electrodes (SRx0, SRx1, . . . , SRx4, SRx5).

TABLE 1

| | Finger Touch Operation | | Stylus Operation Driving | | Sensing | | Uplink signal size | | Downlink signal size | | Additional stylus channel | |
|---|---|---|---|---|---|---|---|---|---|---|---|---|
| No. | Driving Tx | Sensing Rx | Long Axis | Short Axis | X Axis | Y Axis | Long Axis | Short Axis | X Axis | Y Axis | Driving | Sensing |
| 1 | 1 | 3 | 2 | | 1 | 3 | Large | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |

TABLE 1-continued

| | Finger Touch Operation | | Stylus Operation Driving | | Stylus Operation Sensing | | Uplink signal size | | Downlink signal size | | Additional stylus channel | |
|---|---|---|---|---|---|---|---|---|---|---|---|---|
| No. | Driving Tx | Sensing Rx | Long Axis | Short Axis | X Axis | Y Axis | Long Axis | Short Axis | X Axis | Y Axis | Driving | Sensing |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 | 3 | 1 | 3 | Small | | Small | Small | No | No |
| 14 | 1 | 3 | 1 | 3 | 1 | 4 | Small | | Small | Large | No | Yes |
| 15 | 1 | 3 | 1 | 3 | 2 | 3 | Small | | Large | Small | No | Yes |
| 16 | 1 | 3 | 1 | 3 | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to Table 1 above, in various combinations (No. 1 to No. 32), a plurality of touch driving electrodes (FTx0, FTx1, . . . , FTx8, FTx9) and a plurality of touch receiving electrodes (FRx0, FRx1, . . . , FRx4, FRx5) senses the touch of an object such as a finger.

A plurality of touch driving electrodes (FTx0, FTx1, . . . , FTx8, FTx9), a plurality of pen driving electrodes (STx0, STx1, . . . , STx8, STx9), a plurality of touch receiving electrodes (FRx0, FRx1, . . . , FRx4, FRx5), and one or two of the plurality of pen receiving electrodes (SRx0, SRx1, . . . , SRx4, SRx5) may operate as a stylus driving electrode for driving the stylus pen.

A plurality of touch driving electrodes (FTx0, FTx1, . . . , FTx8, FTx9), a plurality of pen driving electrodes (STx0, STx1, . . . , STx8, STx9), a plurality of touch receiving electrodes (FRx0, FRx1, . . . , FRx4, FRx5), and a pattern of one or two of the plurality of pen receiving electrodes (SRx0, SRx1, . . . , SRx4, SRx5) can be used to form a current loop for driving the stylus pen. The X-axis driving may be one of a plurality of touch driving electrodes (FTx0, FTx1, . . . , FTx8, FTx9) and a plurality of pen driving electrodes (STx0, STx1, . . . , STx8, STx9), Y-axis driving may be any one of a plurality of touch receiving electrodes (FRx0, FRx1, . . . , FRx4, FRx5) and a plurality of pen receiving electrodes (SRx0, SRx1, . . . , SRx4, SRx5). The stylus pen can be driven by X-axis driving, Y-axis driving or by both.

A plurality of touch driving electrodes (FTx0, FTx1, . . . , FTx8, FTx9), a plurality of pen driving electrodes (STx0, STx1, . . . , STx8, STx9), a plurality of touch receiving electrodes (FRx0, FRx1, . . . , FRx4, FRx5), and two of the plurality of pen receiving electrodes (SRx0, SRx1, . . . , SRx4, SRx5) may operate as sensing electrodes that sense the stylus pen signal emitted from the stylus pen. In order to sense a stylus pen signal, both X-axis sensing and Y-axis sensing are required, it can use two patterns which are a plurality of touch driving electrodes (FTx0, FTx1, . . . , FTx8, FTx9) and a plurality of pen driving electrodes (STx0, STx1, . . . , STx8, STx9) among a plurality of touch receiving electrodes (FRx0, FRx1, . . . , FRx4, FRx5), and a plurality of pen receiving electrodes (SRx0, SRx1, . . . , SRx4, SRx5).

X-axis sensing can be any type of electrode among the plurality of touch driving electrodes (FTx0, FTx1, . . . , FTx8, FTx9) and the plurality of pen driving electrodes (STx0, STx1, . . . , STx8, STx9). Y-axis sensing can be any one type of electrode among a plurality of touch receiving electrodes (FRx0, FRx1, . . . , FRx4, FRx5) and a plurality of pen receiving electrodes (SRx0, SRx1, . . . , SRx4, SRx5). In Table 1 above, 'uplink signal size' refers to the size of the driving signal for driving the stylus pen. 'Downlink signal size' refers to the size of the stylus pen signal received from the stylus pen. 'Additional stylus channel' refers to whether an additional channel should be configured for the stylus pen in addition to touch sensing.

FIG. 25 is a first embodiment of the touch input device shown in FIG. 24.

Referring to FIG. 25, the touch input device according to the first embodiment includes a touch sensor 100a and a control unit 300.

The touch sensor 100a includes a plurality of first to fourth patterns (101a, 102a, 103a, 104a).

The first patterns 101a are disposed in multiple numbers along first and second directions perpendicular to each other. Here, the first direction may be the long axis direction of the screen of the touch input device, and the second direction may be the short axis direction of the screen of the touch input device.

The first plurality of patterns 101a includes a plurality of first pattern portions 101o and a plurality of second pattern portions 101e.

One first pattern portion 101o and one second pattern portion 101e are disposed alternately along the first direction.

A plurality of first pattern portions 101o disposed along a first direction are electrically connected to each other by a plurality of conductive patterns, and the plurality of second pattern portions 101e disposed along the first direction are also electrically connected to each other by a plurality of conductive patterns.

Meanwhile, the plurality of first pattern portions 101o disposed along the second direction are not electrically connected to each other. Additionally, the plurality of second pattern portions 101e disposed along the second direction are not electrically connected to each other.

Each of the first pattern portion 101o and the second pattern portion 101e includes the upper pattern part and the lower pattern part and the connection pattern part connecting the upper pattern part and the lower pattern part. Here, the upper pattern portion may have an inverted triangle shape with an empty interior, and the lower pattern portion may have an empty triangular shape. The connection pattern portion may have a rectangular shape with an empty interior, and the upper pattern part, lower pattern part. The connection pattern part can be comprised as a whole.

Each of the first pattern portions 101o and the second pattern portions 101e may have an opening inside which at least one second pattern 102a is disposed. The shape of the opening may correspond to the shape of each of the first pattern portion 101o and the second pattern portion 101e.

One first pattern portion 101o has a structure that surrounds at least part or all of one second pattern 102a, and the one first pattern portion 101o is electrically insulated from each other. One second pattern portion 101e also has a structure that surrounds at least part or all of one second pattern 102a, and the one second pattern portion 101e is electrically insulated from each other.

The plurality of first patterns 101a disposed along the first direction form an electrical path in the first direction. The plurality of first patterns 101a disposed along the first direction have two channels (or terminals). One channel is a plurality of first pattern portions 101o disposed along a first direction, and the plurality of first pattern portions 101o are electrically connected by conductive patterns. The remaining channel is a plurality of second pattern portions 101e disposed along the first direction are electrically connected by conductive patterns. Each the two channels may be electrically connected to the control unit 300.

At least one second pattern 102a is disposed inside each of the first pattern parts 101o and the second pattern parts 101e.

The plurality of second patterns 102a disposed along the first direction are electrically connected to each other by a plurality of conductive patterns. Two second patterns 102a adjacent to each other along the first direction may be electrically connected by one conductive pattern.

Among the plurality of second patterns 102a disposed along the first direction, the second pattern disposed on one edge may be electrically connected to the control unit 300, and the second pattern 102a disposed on the other edge is electrically connected to the second patterns disposed along the second direction by the conductive pattern 102m.

The first pattern 101a and the second pattern 102a may be disposed on the same layer. The first pattern 101a and the second pattern 102a can be formed on the same layer using a metal mesh.

The third pattern 103a has a shape extending along the second direction (or minor axis).

The third pattern 103a may include a plurality of diamond pattern parts and a connection pattern part connecting two adjacent diamond pattern parts among the plurality of diamond pattern parts.

The third pattern 103a may have an opening inside which the fourth pattern 104a is disposed.

The third pattern 103a may have a structure that surrounds at least part or all of the fourth pattern 104a. The third pattern 103a is disposed at a distance by an interval from the fourth pattern 104a. The third pattern 103a and from the fourth pattern 104a are electrically insulated from each other.

The fourth pattern 104a is disposed adjacent to the third pattern 103a, has a shape extending along the second direction, and is disposed inside the third pattern 103a.

The fourth pattern 104a may include a plurality of diamond pattern parts and a connection pattern part connecting two adjacent diamond pattern parts among the plurality of diamond pattern parts.

A plurality of these third patterns 103a and fourth patterns 104a are disposed along the first direction.

One end of the plurality of third patterns 103a may be electrically connected to the control unit 300, and the other ends may be electrically open.

One end of the plurality of fourth patterns 104a may be electrically open as shown in FIG. 25 or may be connected to the control unit 300 differently from FIG. 25. Other ends of the plurality of fourth patterns 104a are electrically connected to each other by the conductive pattern 104m. Here, other terminals electrically connected to each other may be grounded. When the other ends of the plurality of fourth patterns 104a are electrically connected to each other, the capacitance for each fourth pattern 104a is added and the total impedance is reduced. Therefore, this may have a similar effect as if the other ends of the plurality of fourth patterns 104a are grounded.

The third pattern 103a and the fourth pattern 104a may be disposed on the same layer. The third pattern 103a and the fourth pattern 104a can be formed on the same layer using a metal mesh. Here, the first pattern 101a and the second pattern 102a may be disposed on the first layer, and the third pattern 103a and the fourth pattern 104a may be disposed on a second layer different from the first layer.

The control unit 300 is electrically connected to the touch sensor 100a and controls the touch sensor 100a. The control unit 300 and the touch sensor 100a may be electrically connected to each other by a conductive pattern.

By the control unit 300, it can be that a plurality of first patterns 101a can be a plurality of touch driving electrodes FTx0 to FTx9 shown in FIG. 24, and a plurality of third patterns 103a can be a plurality of touch receiving electrodes FRx0 to FRx5 shown in FIG. 24. In addition, a plurality of second patterns 102a can be a plurality of pen driving electrodes STx0 to STx9 shown in FIG. 24, and a plurality of fourth patterns 104a are a plurality of pen receiving electrodes SRx0 to SRx5 shown in FIG. 24.

The control unit 300 may include a plurality of driving circuits and sensing circuits.

The plurality of driving circuit units may include a driving circuit unit for touch driving and a driving circuit unit for stylus driving.

The plurality of sensing circuits may include a sensing circuit for touch sensing and a sensing circuit for stylus sensing. Here, some of the plurality of sensing circuit units may perform touch sensing and stylus sensing.

The control unit 300 may control the touch sensor 100a to operate in any one of a touch driving/sensing mode, a pen driving mode, and a stylus sensing mode.

The control unit 300 may electrically connect multiple driving/sensing circuit units to the touch sensor 100a according to each mode. To this end, the control unit 300 may include a plurality of switches for electrically connecting a plurality of driving/sensing circuit units and the touch sensor 100a.

FIG. 26 to 28 are drawings for explanation of using the touch sensor 100a shown in FIG. 25 as No. 1 in Table 1 above.

FIG. 26 is a diagram illustrating a case where the touch input device shown in FIG. 25 operates in touch driving/sensing mode (or 2D sensing mode), and FIG. 27 is a diagram illustrating a case where the touch input device shown in FIG. 25 operates in pen driving mode (or stylus driving mode, or stylus uplink mode). FIG. 28 is a diagram illustrating a case where the touch input device shown in FIG. 25 operates in stylus sensing mode (or stylus downlink mode).

Referring to FIG. 26, in touch driving/sensing mode, the control unit 300 can electrically connect driving circuit units 310 and 310' for touch driving to the plurality of first patterns 101a of the touch sensor 100a. The first patterns 101a disposed along the first direction have first pattern portions 101o and second pattern portions 101e. The control unit 300 electrically connects the first pattern parts 101o disposed along the first direction to the first driving circuit part 310, and the second pattern parts 101e disposed along the first direction may be electrically connected to the second driving circuit part 310'. Here, the second driving circuit unit 310' can output by inverting only the phase of the driving signal output from the first driving circuit unit 310 by 180 degrees.

The control unit 300 may electrically connect the sensing circuit units 330 for touch sensing to the plurality of third patterns 103a of the touch sensor 100a.

The control unit 300 can apply a first driving signal to the first pattern parts 101o disposed along the first direction, and the control unit 300 can apply a second driving signal (an inverted signal of the first driving signal) to the second pattern portions 101e. A sensing signal received from a plurality of third patterns 103a may be received. The sensing circuit unit 330 of the control unit 300 may output capacitance variation information included in the input sensing signal as a certain voltage value. The control unit 300 may process the output voltage value to detect whether the touch is touched and/or the touch position.

The sensing signal output from each third pattern 103a includes a difference value of the first capacitance variation between the third pattern 103a and the first pattern portion 101o, and second capacitance variation between the third pattern 103a and the second pattern portion 101e. Accordingly, display noise and LGM noise are canceled in the output sensing signal and the occurrence of flicker in the display panel can be significantly reduced or prevented as described above with reference to FIGS. 22 and 23.

Meanwhile, to prevent capacitive coupling between the first pattern 101a and the second pattern 102a, the control unit 300 may control the reference potential to be applied to the plurality of second patterns 102.

Referring to FIG. 27, in the pen driving mode, the control unit 300 may electrically connect the driving circuit unit 340 for driving the stylus pen to the second patterns 102a disposed along the first direction.

The control unit 300 can control the pen driving signal output to each driving circuit unit 340 and 340' connected to the second patterns 102a disposed along the first direction. For example, the control unit 300 controls the first driving circuit unit 340 to output a pulse signal of a frequency, the second driving circuit unit 340' to output no pulse signal, and the third driving circuit unit 340" to output a pulse signal which is opposite to the pulse signal output from the first driving circuit unit 340. In this case, a current loop is formed with at least one second pattern 102a electrically connected to the first driving circuit 340 and at least one second pattern electrically connected to the third driving circuit 340". A magnetic field is generated by the formed current loop, and a nearby stylus pen may be resonated and be driven by the magnetic field.

The control unit 300 may control pulse signals opposing each other to be output to any two or more driving circuit units among the plurality of driving circuit parts 340, 340', and 340" electrically connected to the plurality of second patterns 102a. Accordingly, the control unit 300 can change and set the size or location of the current loop in various ways. For example, when the control unit 300 detects the position of a nearby stylus pen, it can be controlled so that opposing pulse signals are output from the two driving circuit units electrically connected to the second patterns around the position of the stylus pen. If the position of the stylus pen is not detected, pulse signals that conflict with each other may be output from two driving circuit units electrically connected to the second patterns disposed on the outermost sides of the plurality of second patterns 102a.

Referring to FIG. 28, in stylus sensing mode, the control unit 300 may electrically connect the sensing circuit units 350 and 350' for stylus sensing respectively to a plurality of first patterns 101a and a plurality of third patterns 103a of the touch sensor 100a. Here, the first patterns 101a among the plurality of first patterns 101a disposed along the first direction are composed of two channels, therefore, the first sensing circuit unit 350 may be electrically connected to the two channels in parallel. The second sensing circuit unit 350' may be electrically connected to each of the third patterns 103a.

In the stylus sensing mode, when the stylus pen approaches a random position on the touch sensor 100a, the stylus pen is selected from among the plurality of second patterns 102a and the plurality of fourth patterns 104a by the pen signal output from the stylus pen. An induced current is generated in some of the second patterns 102a and some of the fourth patterns 104a located nearby. This is due to the fact that the plurality of second patterns 102a and the plurality of fourth patterns 104a form a current loop.

A portion of the induced current, generated in the plurality of second patterns 102a, flows over and generates an induced voltage by capacitive coupling between the second pattern 102a and the first pattern 101a to the first pattern 101a. Additionally, induced voltage is generated because the portion of the induced current generated in the plurality of fourth patterns 104a flows into the third pattern 103a due to capacitive coupling between the fourth pattern 104a and the third pattern 103a.

The control unit 300 can detect the position of the stylus pen by detecting the induced voltage generated in the first pattern 101a and the third pattern 103a by the first and second sensing units 350 and 350'.

FIG. 26 to 28 show that the touch position of an object is sensed using the touch sensor 100a of FIG. 25 and the stylus pen is driven and sensed in the method No. 1 of Table 1 above, but the touch sensor 100a of FIG. 25 can be used in any of the methods No. 2 to No. 32 in Table 1 above.

FIG. 29 is a second embodiment of the touch sensor 100' of the touch input device shown in FIG. 24.

Referring to FIG. 29, the touch sensor 100b includes a plurality of first to fourth patterns (101b, 102b, 103b, 104b). The plurality of first to fourth patterns (101b, 102b, 103b, 104b) are disposed together on the same layer, unlike the touch sensor 100a shown in FIG. 25.

For reference, in the touch sensor 100a shown in FIG. 25, the first and second patterns 101a and 102a are disposed together on the first layer, and the third and fourth patterns 103a and 104a are disposed together on a second layer that is different from the first layer.

Since the first and second patterns 101b and 102b have the same structure and arrangement as the first and second patterns 101a and 102a of the touch sensor 100a shown in FIG. 25, detail explanations shall be replaced with the above-mentioned. Hereinafter, the third and fourth plurality of patterns 103b and 104b will be described in detail.

The third pattern 103b is disposed in multiple numbers along the first and second directions. Each first pattern 101b is disposed between the plurality of third patterns 103b disposed along the second direction. The third pattern 103b may be disposed one on each side, with the connection pattern portion of the first pattern 101b at the center.

The third pattern 103b has a rectangular, polygonal, circular, or oval shape. The third pattern 103b has an opening in which a fourth pattern 104b is disposed. The third pattern 103b may have a closed curve shape with the opening formed therein. The third pattern 103b may be disposed to surround at least part or all of one fourth pattern 104b.

The plurality of third patterns 103b disposed along the second direction are electrically connected to each other through conductive patterns. Two third patterns adjacent to each other along the second direction may be electrically connected by one conductive pattern. Meanwhile, the plurality of third patterns 103b disposed along the first direction are not electrically connected to each other. A plurality of third patterns disposed along another second direction adjacent to the first direction are also electrically connected by the conductive patterns.

Each of the plurality of fourth patterns 104b is disposed inside one third pattern 103b. One fourth pattern 104b is surrounded by one third pattern 103b. The shape of the fourth pattern 104b may correspond to the shape of the opening of the third pattern portion 103b. The fourth pattern 104b may have a rectangular, polygonal, circular, or oval shape. The fourth pattern 104b may have a plate shape without an interior opening.

The plurality of fourth patterns 104b disposed along the second direction are electrically connected to each other by conductive patterns. Two fourth patterns adjacent to each other along the second direction may be electrically connected by one conductive pattern. Among the plurality of fourth patterns 104b disposed along the second direction, the fourth pattern disposed at one edge may be electrically connected to the control unit 300 shown in FIG. 25, and the fourth pattern disposed at the other edge The fourth pattern 104b is electrically connected to a plurality of fourth patterns disposed along the first direction by the conductive pattern 104m. Through this, it can be configured to be the same as the electrical connection path of the fourth pattern 104a shown in FIG. 25.

The touch sensor 100b shown in FIG. 29 can replace the touch sensor 100a shown in FIG. 25. Accordingly, the touch sensor 100b shown in FIG. 29 also senses the touch position of the object using various methods described in Table 1 above, and the touch sensor 100b can drive and sense a stylus pen. Specifically, the touch sensor 100a shown in FIGS. 26 to 28 can be replaced with the touch sensor 100b shown in FIG. 29. The touch input device having the touch sensor 100b and the control unit 300 can equally perform the touch driving/sensing mode of FIG. 26, the pen driving mode of FIG. 27, and the stylus sensing mode of FIG. 28 described above. Furthermore, the touch sensor 100b of FIG. 29 can be used in any of the methods No. 2 to No. 32 in Table 1 above.

FIG. 30 is a third embodiment of the touch sensor 100' of the touch input device shown in FIG. 24 and is a modified example of the touch sensor 100b shown in FIG. 29.

The structure and shape of the first to fourth patterns 101b, 102b, 103b, and 104b of the touch sensor 100b' shown in FIG. 30 are similar to the first to fourth patterns (101b, 102b, 103b, 104b) of the touch sensor 100b shown in FIG. 29. Accordingly, the description of the structure and shape of the first to fourth patterns (101b, 102b, 103b, 104b) is replaced with the information described above.

The difference between the touch sensor 100b' shown in FIG. 30 and the touch sensor 100b shown in FIG. 29 is that two first pattern portions 101o and a conductive pattern 101om adjacent to each other in the first direction of the first pattern 101b for electrically connecting two second pattern portions 101e adjacent to each other.

The conductive pattern 101om is disposed bypassing the third and fourth patterns 103b and 104b without intersecting them. Additionally, the conductive pattern 101om may be disposed to intersect the conductive patterns for electrically connecting the two adjacent third and fourth patterns 103b and 104b along the second direction.

In the touch sensor 100b of FIG. 29, a conductive pattern electrically connects two adjacent first pattern portions 101o and two adjacent second pattern portions 101e in the first direction. Since the conductive pattern has a shape that extends straight in the first direction except for both ends, the conductive pattern has an overlapping part with the third and fourth patterns 103b and 104b. A certain capacitance may be formed between the conductive pattern and the third and fourth patterns 103b and 104b in the overlapping portion. The predetermined capacitance may affect touch sensing or stylus sensing sensitivity and may also affect operating frequency bandwidth.

On the other hand, the conductive pattern 101om of FIG. 30 does not overlap with the third and fourth patterns 103b and 104b and is disposed bypassing the third pattern 103b. Therefore, the above-mentioned capacitance is not formed. and there is an advantage which can reduce the impact on touch sensing or stylus sensing sensitivity and reduce the influence of operating frequency bandwidth.

Meanwhile, since the conductive pattern of FIG. 29 is shorter than the conductive pattern 101om of FIG. 30, there is an advantage that the resistance of the conductive pattern of FIG. 29 is smaller than that of the conductive pattern 101om of FIG. 30.

FIG. 31 is a fourth embodiment of the touch sensor 100' of the touch input device shown in FIG. 24.

Referring to FIG. 31, the touch sensor 100c includes a plurality of first to fourth patterns (101c, 102c, 103c, 104c). The plurality of first to fourth patterns (101c, 102c, 103c, 104c) are disposed together on the same layer as the touch sensors 100b and 100b' shown in FIGS. 29 and 30.

Since the plurality of third and fourth patterns 103c and 104c have the same structure and arrangement as the plurality of third and fourth patterns 103b and 104b of the touch sensor 100b shown in FIG. 29 detailed description is provided above. Instead, the first and second patterns 101c and 102c will be described in detail below.

Each of the plurality of second patterns 102c is disposed to surround at least part or all of one third pattern 103c. One second pattern 102b has an opening in which a third pattern 103c is disposed.

Each of the plurality of first patterns 101c is disposed to surround at least part or all of one second pattern 102c. One first pattern 101c has an opening in which one second pattern 102c is disposed.

One second pattern (102c) inside one first pattern (101c), one third pattern (103c) inside one second pattern (102c), one fourth pattern 104c is disposed inside one third pattern 103c.

The first pattern 101c may have a shape corresponding to the second pattern 102c, and the third pattern 103c may have a shape corresponding to the third pattern 104c. Alternatively, the first to fourth patterns (101c, 102c, 103c, 104c) may have shapes that correspond to each other.

The first and second patterns 101c and 102c may have a rectangular shape but are not limited thereto and may have a polygonal, circular, or oval shape.

The first pattern 101c includes first pattern parts 101o disposed at odd numbers along the first direction and second pattern parts 101e disposed at even numbers along the first direction.

The first pattern parts 101o disposed along the first direction are electrically connected to each other by the conductive pattern 101om, and the second pattern parts 101e disposed along the first direction are electrically connected to each other by the conductive pattern. connected.

The conductive pattern 101om for electrically connecting the two first pattern parts 101o disposed along the first direction to each other, and the conductive pattern 101om is disposed adjacent to one side of the second pattern portion 101e disposed between the two first pattern portions 101o.

In addition, the conductive pattern electrically connects the two second pattern portions 101e disposed along the first direction to each other, and the conductive pattern is disposed adjacent to the other side of the first pattern portion disposed between the two second pattern portions 101e.

By arranging the conductive pattern 101om, the touch sensor 100c shown in FIG. 31 can minimize resistance by minimizing the length of the conductive pattern 101om, since the conductive pattern (101om) does not overlap with other patterns, there is an advantage in minimizing capacitance. In other words, the touch sensor 100c shown in FIG. 31 has all of the advantages of the advantage of minimizing the resistance of the touch sensor 100b of FIG. 29 and minimizing the capacitance of the touch sensor 100b' of FIG. 30.

The plurality of second patterns 102c disposed along the first direction are electrically connected to each other by a plurality of conductive patterns. Two second patterns adjacent to each other along the first direction may be electrically connected by one conductive pattern. Among the plurality of second patterns 102c disposed along the first direction, the second pattern disposed on one edge may be electrically connected to the control unit 300 shown in FIG. 25, and the second pattern 102c disposed on the other edge is electrically connected to a plurality of second patterns disposed along the second direction through the conductive pattern 102m. In this way, it may be configured to be the same as the electrical connection path of the second pattern 102a shown in FIG. 25.

The touch sensor 100c shown in FIG. 31 can replace the touch sensor 100a shown in FIG. 25. Accordingly, the touch sensor 100c shown in FIG. 31 also can be sensed the touch position of an object and can be driven and sensed the stylus pen in various ways listed in Table 1 above. Specifically, the touch sensor 100a shown in FIGS. 26 to 28 can be replaced with the touch sensor 100c shown in FIG. 31. The touch input device having such a touch sensor 100c and the control unit 300 can equally perform the touch driving/sensing mode of FIG. 26, the pen driving mode of FIG. 27, and the stylus sensing mode of FIG. 28 described above. Furthermore, the touch sensor 100c of FIG. 31 can be used in any of the methods No. 2 to No. 32 in Table 1 above.

FIG. 32 is a fifth embodiment of the touch sensor 100' of the touch input device shown in FIG. 24.

Referring to FIG. 32, the touch sensor 100d includes a plurality of first to fourth patterns (101d, 102d, 103d, 104d). A plurality of first to fourth patterns (101d, 102d, 103d, 104d) are disposed together on the same layer.

The first patterns 101d are disposed in multiple numbers along the first and second directions perpendicular to each other. Here, the first direction may be the long axis direction of the screen of the touch input device, and the second direction may be the short axis direction of the screen of the touch input device.

The first pattern 101d includes a first pattern portion 101o and a second pattern portion 101e. The plurality of first patterns 101d includes a plurality of first pattern parts 101o and a plurality of second pattern parts 101e, and one first pattern part 101o and one second pattern part 101e are alternately disposed along the first direction.

A plurality of first pattern portions 101o disposed along the first direction are electrically connected to each other by a conductive pattern, and a plurality of second pattern portions 101e disposed along the first direction are also electrically connected to each other by a conductive pattern. Here, the plurality of first pattern portions 101o disposed along the second direction are not electrically connected to each other. Additionally, the plurality of second pattern portions 101e disposed along the second direction are not electrically connected to each other.

Each of the first pattern portion 101o and the second pattern portion 101e may have a rectangular shape. In the case of a rectangular shape, it may be a polygon with at least four sides.

Although not shown in the drawings, each of the first pattern portion 101o and the second pattern portion 101e may have an oval or circular shape.

Each of the first pattern portion 101o and the second pattern portion 101e may have an opening in which at least one second pattern 102d is disposed. The shape of the opening may correspond to the shape of each of the first pattern portion 101o and the second pattern portion 101e.

One first pattern portion 101o has a structure which surrounds at least part or all of one second pattern 102d in order to be electrically insulated from each other. One second pattern portion 101e also has a structure surrounding at least part or all of one second pattern 102d in order to be electrically insulated from each other.

The plurality of first patterns 101d disposed along the first direction form an electrical path such as the first pattern 101 shown in FIG. 24. The plurality of first patterns 101d disposed along the first direction have two input/output channels (or terminals). One channel is a channel in which a plurality of first pattern portions 101o disposed along a first direction are electrically connected by conductive patterns, the remaining channel is a channel in which a plurality of second pattern portions 101e disposed along the first direction are electrically connected by conductive patterns. The two channels may be electrically connected to the control unit 300 shown in FIG. 25.

At least one second pattern 102d is disposed inside each of the first pattern parts 101o and the second pattern parts 101e.

A plurality of second patterns 102d disposed along the first direction are electrically connected to each other by a plurality of conductive patterns. Two second patterns adjacent to each other along the first direction may be electrically connected by one conductive pattern. Among the plurality of second patterns 102d disposed along the first direction, the second pattern disposed at one edge may be electrically connected to the control unit shown in FIG. 25, and the second pattern 102d disposed on the other edge is electrically connected to a plurality of second patterns disposed along the second direction through the conductive pattern 102m. Through this, it can be configured to be the same as the electrical connection path of the second pattern 102a shown in FIG. 25.

Each of the plurality of third patterns 103d has a shape extending along the second direction (or minor axis). One third pattern 103d surrounds a plurality of first patterns disposed along the second direction.

Among the plurality of third patterns 103d, each of the third patterns 103d located at odd numbers in the first direction has a plurality of first pattern portions 101o disposed along the second direction. One first pattern portion 101o is disposed in each opening.

Each third pattern 103d may include a third external pattern 103o, a plurality of third internal patterns 103i, and a plurality of third connection patterns 103c.

The third external pattern 103o has a shape corresponding to the outer shape of the third pattern 103d and may have the shape of a closed curve extending along the second direction. A plurality of third internal patterns 103i and a plurality of third connection patterns 103c are disposed inside one third external pattern 103o.

A plurality of third internal patterns 103i are disposed along the second direction within one third external pattern 103o. One third internal pattern 103i has a rectangular or oval shape and has an opening inside which one first pattern part 101o (or one second pattern part 101e) is disposed. The shape of the opening may correspond to the external shape of the third internal pattern 103i.

The plurality of third connection patterns 103c electrically connect between the plurality of third internal patterns 103i disposed along the second direction, and electrically connect between the third internal pattern and the first external pattern 103o located on both edges of the plurality of third internal patterns 103i disposed along the second direction.

Each of the plurality of fourth patterns 104d has a shape extending along the second direction and is disposed adjacent to the third pattern 103d.

Other ends of the plurality of fourth patterns 104d are electrically connected to each other by the conductive pattern 104m.

Each fourth pattern 104d is disposed within one third pattern 103d. More specifically, the fourth pattern 104d may be disposed in the opening (or inner opening), and the fourth pattern 104d is defined by the third external pattern 103o of the third pattern 103d, a plurality of third internal patterns 103i, and a plurality of third connection patterns 103c.

The fourth pattern 104d may include a fourth upper pattern 104u and a fourth lower pattern 104l. A space is formed between the third external pattern 103o and the plurality of third internal patterns 103i. The space is divided into two openings by a plurality of third connection patterns 103c. The fourth upper pattern 104u is disposed in the upper opening of the two openings, the fourth lower pattern 104l may be disposed in the lower opening of the two openings. The shapes of the fourth upper pattern 104u and the fourth lower pattern 104l may correspond to the shapes of the upper and lower openings, respectively.

The fourth upper pattern 104u and the fourth lower pattern 104l may be electrically connected to each other by a conductive pattern that extends along the first direction and intersects the third connection pattern 103c.

The touch sensor 100d shown in FIG. 32 can replace the touch sensor 100a shown in FIG. 25. Accordingly, the touch sensor 100d shown in FIG. 32 can also sense the touch position of an object and drive and sense the stylus pen using various methods described in Table 1 above. Specifically, the touch sensor 100a shown in FIGS. 26 to 29 can be replaced with the touch sensor 100d shown in FIG. 32. A touch input device having such a touch sensor 100d and a control unit 300 can perform the same operation for the touch driving/sensing mode of FIG. 26, the pen driving mode of FIG. 27, and the stylus sensing mode of FIG. 28 described above. Furthermore, the touch sensor 100d of FIG. 32 can be used in any one of No. 2 to No. 32 in Table 1 above.

FIG. 33 is a sixth embodiment of the touch sensor 100' of the touch input device shown in FIG. 24.

The structure and shape of the first to fourth patterns (101d, 102d, 103d, 104d) of the touch sensor 100d' shown in FIG. 33 are the same as the first to fourth patterns (101d, 102d, 103d, 104d) of the touch sensor 100d shown in FIG. 32. Fourth patterns (101d, 102d, 103d, 104d). Accordingly, the description of the structure and shape of the first to fourth patterns (101d, 102d, 103d, 104d) is replaced with the information described above.

The difference between the touch sensor 100d' shown in FIG. 33 and the touch sensor 100d shown in FIG. 32 is that a conductive pattern 101om electrically connecting two first pattern parts 101o adjacent to each other in the first direction of the first pattern 101d, and a conductive pattern that electrically connects two adjacent second pattern portions 101e.

The conductive pattern 101om is disposed in a detour without intersecting the second pattern 102d.

Because the touch sensor 100d of FIG. 32 has a shape extending straight in the first direction, it has a portion that overlaps with the second pattern 102d that a conductive pattern 101om electrically connecting two first pattern parts 101o adjacent to each other in the first direction of the first pattern 101d, and the conductive pattern electrically connecting the two adjacent second pattern portions 101e. A certain capacitance may be formed in the overlapping portion between the conductive pattern and the second pattern 102d. The predetermined capacitance may affect touch sensing or stylus sensing sensitivity and may also affect operating frequency bandwidth.

On the other hand, the conductive pattern 101om of FIG. 33 does not overlap the second pattern 102d, but is disposed to bypass the second pattern 102d, therefore, since the above-mentioned capacitance is not formed, it has the advantage of reducing affects touch sensing or stylus sensing sensitivity, and effect of operating frequency bandwidth.

Meanwhile, since the conductive pattern of FIG. 32 is shorter in length than the conductive pattern (101om) of FIG. 33, it has the advantage that the resistance of the conductive pattern of FIG. 32 is smaller than the resistance of the conductive pattern (101om) of FIG. 33.

The features, structures, effects, etc. described in the embodiments above are included in one embodiment of the present invention but are not necessarily limited to only one embodiment. Furthermore, the features, structures, effects, etc. illustrated in each embodiment can be combined or modified and implemented in other embodiments by a person with ordinary knowledge in the field to which the embodiments belong. Therefore, contents related to such combinations and modifications should be construed as being included in the scope of the present invention.

In addition, although the above description focuses on the embodiment, this is only an example and does not limit the present invention, and those of ordinary skill in the field to which the present invention pertains will recognize that various modifications and applications not exemplified above are possible without departing from the essential characteristics of the present embodiment. For example, each component specifically shown in the embodiment can be modified and implemented, and these variations and differences in application should be construed as being included in the scope of the present invention as defined in the appended claims.

EXPLANATION OF SYMBOLS

1: Touch input device
10, 10', 100, 100', 100a, 100b, 100c, 100d: Touch sensor
13, 300: control unit

What is claimed is:

1. A touch input device comprising:
a touch sensor; and
a control unit which controls the touch sensor,
wherein the touch sensor comprises a plurality of first electrodes and a plurality of second electrodes,
wherein each of the first electrodes are disposed along a first direction,
wherein each of the second electrodes are configured to:
be disposed along a second direction different from the first direction, and
include a 2a electrode pattern disposed immediately adjacent to the first electrode and a 2b electrode pattern disposed not immediately adjacent to the first electrode but spaced apart by a distance,
wherein at least two of the 2a electrode patterns of the second electrode and at least two of the 2b electrode patterns of the second electrode are alternately disposed one by one along the second direction,
wherein the control unit is configured to control such that:
different driving signals to be applied simultaneously to at least two second electrodes among the plurality of second electrodes;
a driving signal to be applied to the 2b electrode pattern; and
the driving signal is a signal of a phase which is reversed by 180 degrees from a driving signal applied to the 2a electrode pattern, and
wherein the control unit is configured to detect a touch position of an object located on the touch sensor based on signals received from the plurality of first electrodes.

2. The touch input device of claim 1,
wherein the control unit is configured to:
output differential signals subtracted from two received signals among the received signals, and
detect the touch position of the object based on the differential signals.

3. The touch input device of claim 2,
wherein the control unit comprises:
an integrator which restores the received signals by integrating the differential signals; and
a processing unit which converts sign of electrostatic capacity change value from negative (−) to positive (+) among the restored received signals.

4. The touch input device of claim 2,
wherein the control unit comprises a baseline adjustment unit to reduce baseline of the differential signals by half.

5. The touch input device of claim 1,
wherein the control unit is configured to control different driving signals to be input simultaneously for all of the plurality of second electrodes.

6. The touch input device of claim 1,
wherein at least a portion of another first electrode disposed adjacent to the first electrode is disposed between the 2b electrode pattern and the first electrode.

7. The touch input device of claim 1,
wherein each of the plurality of first electrodes has a shape extending in a first direction and has a plurality of openings disposed along the first direction,
wherein the 2a electrode patterns of the plurality of second electrodes are disposed within a plurality of openings of odd-numbered first electrodes along the second direction, and
wherein the 2b electrode patterns of the plurality of second electrodes are disposed within a plurality of openings of first electrodes located at even numbers along the second direction, and
further comprising:
first connection patterns electrically connecting the 2a electrode patterns disposed along the second direction; and
second connection patterns electrically connecting the 2b electrode patterns disposed along the second direction.

8. The touch input device of claim 7,
wherein the touch sensor further comprises:
an opening formed in each of the 2a and 2b electrode patterns, and
a dummy pattern disposed within the opening of each of the 2a and 2b electrode patterns.

9. The touch input device of claim 7,
wherein the first connection pattern is disposed so as not to overlap the 2b electrode pattern disposed between two 2a electrode patterns connected by the first connection pattern.

10. The touch input device of claim 1,
wherein each of the plurality of first electrodes has a shape extending in a first direction and has a plurality of openings disposed along the first direction,
wherein the 2a electrode patterns of the plurality of second electrodes are disposed in the plurality of openings of the first electrodes located at odd numbers along the second direction,
wherein the 2b electrode patterns of the plurality of second electrodes are disposed in the plurality of openings of the first electrodes located at even numbers along the second direction,
wherein a portion of the 2a electrode pattern is disposed in one of the two adjacent openings of the odd-numbered first electrode and remainder is disposed in another one of the two openings,
wherein a portion of the 2b electrode pattern is disposed in one of the two adjacent openings of the even-numbered first electrode and remainder is disposed in another one of the two openings, and wherein the touch input device further comprises:
first connection patterns electrically connecting the 2a receiving electrode patterns disposed along the second direction; and
second connection patterns electrically connecting the 2b electrode patterns disposed along the second direction.

11. A touch input device comprising:
a touch sensor; and
a control unit which controls the touch sensor,
wherein the touch sensor comprises a plurality of first electrodes and a plurality of second electrodes,
wherein each of the first electrodes are disposed along a first direction,
wherein each of the second electrodes are configured to:
be disposed along a second direction different from the first direction, and
include a 2a electrode pattern forming a mutual capacitance with the first electrode, and a 2b electrode pattern which does not form mutual capacitance with the first electrode,
wherein at least two of the 2a electrode patterns of the second electrode and at least two of the 2b electrode pattern of the second electrodes are alternately disposed one by one along the second direction,
wherein the control unit is configured to control such that:
different driving signals to be applied simultaneously to at least two second electrodes among the plurality of second electrodes;
a driving signal to be applied to the 2b electrode pattern; and
the driving signal is a signal of a phase which is reversed by 180 degrees from a driving signal applied to the 2a electrode pattern, and
wherein the control unit is configured to detect a touch position of an object located on the touch sensor based on signals received from the plurality of first electrodes.

12. The touch input device of claim 11,
wherein the control unit is configured to:
output differential signals subtracted from two received signals among the received signals, and
detect the touch position of the object based on the differential signals.

13. The touch input device of claim 12,
wherein the control unit comprises:
an integrator which restores the received signals by integrating the differential signals; and
a processing unit which converts sign of electrostatic capacity change value from negative (−) to positive (+), among the restored received signals.

14. The touch input device of claim 12,
wherein the control unit comprises a baseline adjustment unit to reduce baseline of the differential signals by half.

15. The touch input device of claim 11,
wherein the control unit is configured to control different driving signals to be input simultaneously for all of the plurality of second electrodes.

16. The touch input device of claim 11,
wherein at least a portion of another first electrode disposed adjacent to the first electrode is disposed between the 2b electrode pattern and the first electrode.

17. The touch input device of claim 11,
wherein each of the plurality of first electrodes has a shape extending in a first direction and has a plurality of openings disposed along the first direction,
wherein the 2a electrode patterns of the plurality of second electrodes are disposed within a plurality of openings of odd-numbered first electrodes along the second direction, and
wherein the 2b electrode patterns of the plurality of second electrodes are disposed within a plurality of openings of first electrodes located at even numbers along the second direction, and
further comprising:
first connection patterns electrically connecting the 2a electrode patterns disposed along the second direction; and
second connection patterns electrically connecting the 2b electrode patterns disposed along the second direction.

18. The touch input device of claim 17,
wherein the touch sensor further comprises:
an opening formed in each of the 2a and 2b electrode patterns, and
a dummy pattern disposed within the opening of each of the 2a and 2b electrode patterns.

19. The touch input device of claim 17,
wherein the first connection pattern is disposed so as not to overlap the 2b electrode pattern disposed between two 2a electrode patterns connected by the first connection pattern.

20. The touch input device of claim 11,
wherein each of the plurality of first electrodes has a shape extending in a first direction and has a plurality of openings disposed along the first direction,
wherein the 2a electrode patterns of the plurality of second electrodes are disposed in the plurality of openings of the first electrodes located at odd numbers along the second direction,
wherein the 2b electrode patterns of the plurality of second electrodes are disposed in the plurality of openings of the first electrodes located at even numbers along the second direction,
wherein a portion of the 2a electrode pattern is disposed in one of the two adjacent openings of the odd-numbered first electrode and remainder is disposed in another one of the two openings,
wherein a portion of the 2b electrode pattern is disposed in one of the two adjacent openings of the even-numbered first electrode and remainder is disposed in another one of the two openings, and
wherein the touch input device further comprises:
first connection patterns electrically connecting the 2a receiving electrode patterns disposed along the second direction; and
second connection patterns electrically connecting the 2b electrode patterns disposed along the second direction.

* * * * *